US008718377B2

(12) United States Patent
Suzuki et al.

(10) Patent No.: US 8,718,377 B2
(45) Date of Patent: May 6, 2014

(54) IMAGE ANALYSIS APPARATUS, IMAGE ANALYSIS METHOD, IMAGE ANALYSIS PROGRAM AND RECORDING MEDIUM

(75) Inventors: Takashi Suzuki, Suita (JP); Nariaki Matsuura, Suita (JP); Kazuaki Nakane, Suita (JP); Marcio Fuzeto Gameiro, São Carlos (BR)

(73) Assignee: Osaka University, Osaka (JP)

( * ) Notice: Subject to any disclaimer, the term of this patent is extended or adjusted under 35 U.S.C. 154(b) by 357 days.

(21) Appl. No.: 13/145,091

(22) PCT Filed: Jan. 13, 2010

(86) PCT No.: PCT/JP2010/000135
§ 371 (c)(1),
(2), (4) Date: Jul. 18, 2011

(87) PCT Pub. No.: WO2010/087112
PCT Pub. Date: Aug. 5, 2010

(65) Prior Publication Data
US 2011/0274340 A1  Nov. 10, 2011

(30) Foreign Application Priority Data

Jan. 27, 2009  (JP) ................................ 2009-015725

(51) Int. Cl.
*G06K 9/00* (2006.01)
*G06K 9/66* (2006.01)
(52) U.S. Cl.
USPC .......................................... 382/192; 382/128
(58) Field of Classification Search
USPC .................. 382/128–134, 192–194
See application file for complete search history.

(56) References Cited

U.S. PATENT DOCUMENTS

| 5,627,907 A | * | 5/1997 | Gur et al. ...................... 382/132 |
| 5,949,907 A | | 9/1999 | Raz |
| 2007/0160295 A1 | * | 7/2007 | Wang et al. ................... 382/199 |

FOREIGN PATENT DOCUMENTS

| JP | 2000-501859 | 2/2000 |
| JP | 2008-216066 | 9/2008 |

OTHER PUBLICATIONS

International Search Report, PCTJP2010/00135, mailed May 11, 2010.
Hasebe, K., et al., "Use of AutoPap System (Automat Cytological Diagnosis Device) in Rescreening for Quality Control: Results of Field Test," The Journal of Japanese Society of Clinical Cytology, vol. 37, suppl. 1, p. 99, 19, 1998, full translation.

(Continued)

*Primary Examiner* — Alex Liew
(74) *Attorney, Agent, or Firm* — Kagan Binder, PLLC

(57) ABSTRACT

A cancer determination apparatus (1) includes a Betti number calculation section (42) for calculating, in a captured image (i) in which a tissue is captured and (ii) which has been binarized by use of a prescribed reference value as a threshold, (I) the number of connected components and (II) the number of spaces, each of the connected components being an aggregate of at least one component which is defined by connecting an outer edge(s) of the at least one component which is a graphic having a closed outer edge, each of the spaces being surrounded by an outer edge(s) of the at least one component, a comparison value calculation section (43) for calculating a comparison value indicating a difference between the number of connected components and the number of spaces, and a determination section (44) for determining, by comparing the comparison value thus calculated with a predetermined reference value, whether or not an image of a cancer tissue is included in the captured image.

11 Claims, 36 Drawing Sheets

(56) References Cited

OTHER PUBLICATIONS

Otaka, K., et al., "Attempt to Control Quality of Uterine Cervix Cytological Diagnostic Sample by Use of AutoPap 300QC System," The Journal of Japanese Society of Clinical Cytology, vol. 37, suppl. 1, p. 99, 20, 1998, full translation.

Otsuka, S., et al., "Use of Focal Point (Former AutoPap) (Automatic Gynecologic Cytological Diagnosis Screening Supporting Device) in Ordinary Examination," The Journal of Japanese Society of Clinical Cytology, vol. 43, suppl. 2, p. 362, S2-2-1, 2004, full translation.

Iwasaki, Y., et al., "Second Report on AutoPap (Automat Cytological Diagnosis Supporting Device)," The Journal of Japanese Society of Clinical Cytology, Vo. 38, suppl. 2, p. 495, 230, 1999, full translation.

Kawatani, E., et al., "Use of an AutoPap System (Current Focal Point) Evaluation with Thin-Layer Smear," The Journal of Japanese Society of Clinical Cytology, vol. 43, suppl. 1, p. 239, 208, 2004, full translation.

Tanaka, N., et al., Automated cytologic screening system (CYBEST model 4): an integrated image cytometry system, Applied Optics, vol. 26, No. 16, Aug. 15, 1987.

Takahashi, T., et al., "Three-dimensional Structure of Atypical Gastric Epithelial Nest Difference between Formation of Atypical Gland and Adenocarcinoma/Metaplastic Gastric Mucosa," Stomach and Intestine, vol. 18(7): pp. 775-782, 1983, partial translation.

Takahashi, T., et al., "Atypical Architecture of . . . " Stomach and Intestine, vol. 18, No. 6, pp. 633-639, 1983, abstract.

Computational Homology Project (CHomP) homepage <http://www.chomp.rutgers.edu/>.

Togo, S., et al., Histopathological Study on Adenoma and Carcinoma of the Large Intestine: Morpometrical Analysis of Structural Atypism, The Journal of the Jikei University School, vol. 96, pp. 927-940, 1981, partial translation.

Shimizu, H., "Three-dimensional Structure of Sinusoids of Normal Human Liver and Hepatocellular Carcinoma," Medical Imaging Technology, vol. 15, No. 5, pp. 597-602, Sep. 1997, partial translation.

Mochizuki, T., et al., "Extractive Methods of Ultrasonic Tissue Images Using Topological Analysis," The Technical Report of IEICE US92-63 (Oct. 1992), pp. 29-36, the Institute of Electronics, Information and Communication Engineers, full translation.

Matsuura, N., et al., "Computer Diagnosis of Cancer Tissue by Use of Computer Employing Homological Concept," The Proceedings of the 2009 Meeting of the Union of Research Activity Groups, the Japan Society for Industrial and Applied Mathematics, full translation.

Nakane, K., et al., "Image Diagnosis for Large Intestinal Cancer by Use of Algorithm Employing Combinatorial Logic Invariants," Proceedings of JAMIT Annual Meeting 2010, full translation.

Nakane, K., "Early and Rapid diagnosis for cancer," Presentation at Hanover Messe, 2011.

\* cited by examiner

F I G. 7
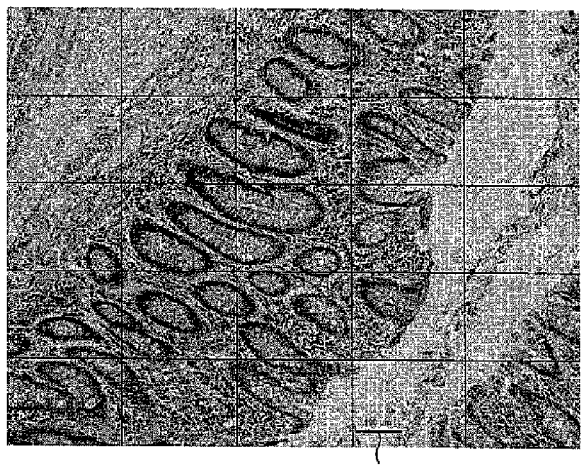
(a)
71
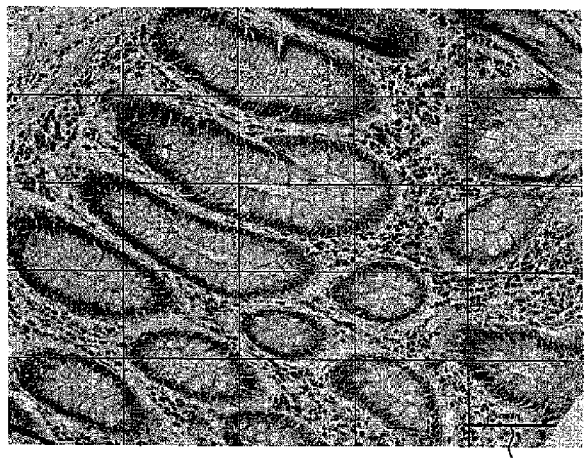
(b)
72
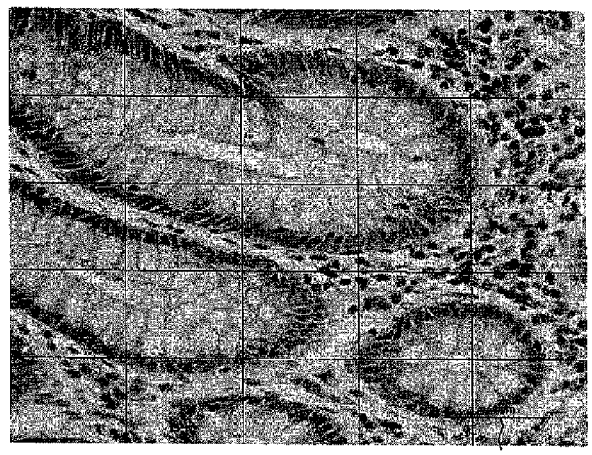
(c)
73

F I G. 8
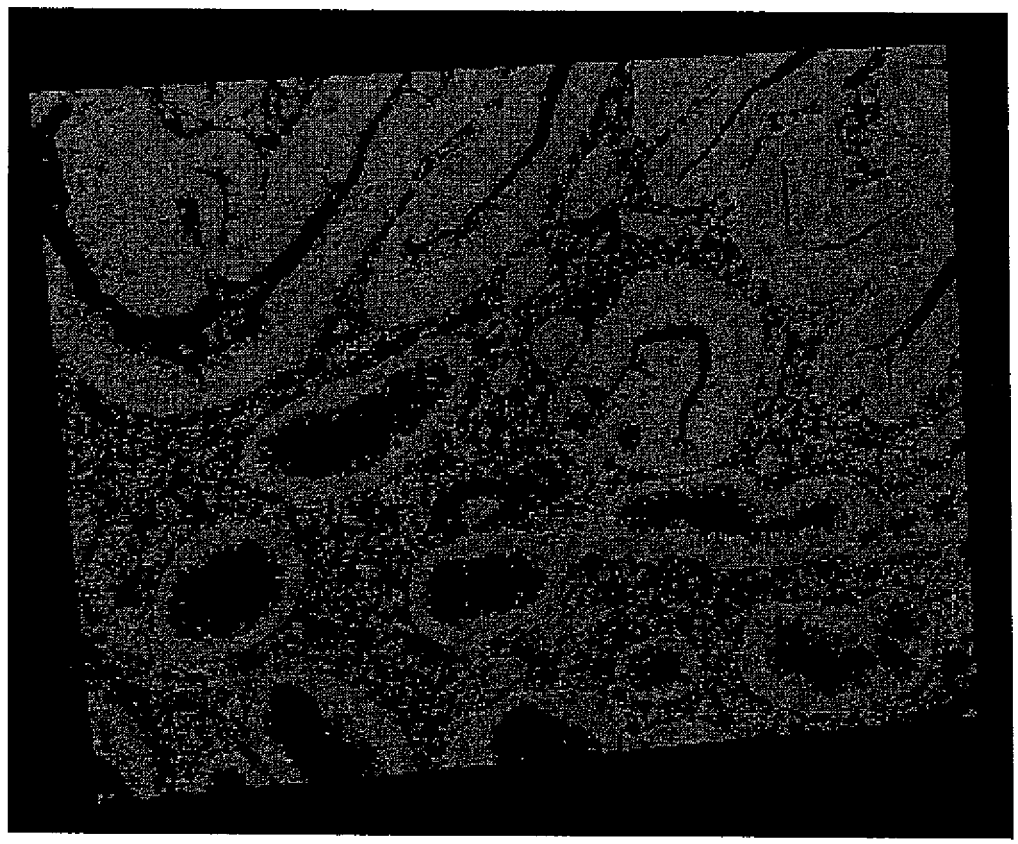

FIG. 11

| | THE NUMBER OF CONNECTED COMPONENTS | THE NUMBER OF HOLES | VALUE OF RATIO |
|---|---|---|---|
| FIRST GROUP | | | |
| 7001 | 1973 | 1623 | 0.822605 |
| 7002 | 1043 | 1214 | 1.16395 |
| 7004 | 1000 | 1448 | 1.448 |
| 7005 | 528 | 755 | 1.429924 |
| 7012 | 2228 | 598 | 0.268402 |
| 7013 | 761 | 449 | 0.590013 |
| 7014 | 255 | 133 | 0.521569 |
| 7018 | 500 | 327 | 0.654 |
| SECOND GROUP | | | |
| 7006 | 1159 | 6110 | 5.271786 |
| 7007 | 1194 | 3297 | 2.761307 |
| 7008 | 590 | 2243 | 3.801695 |
| 7010 | 1204 | 3368 | 2.797342 |
| 7011 | 474 | 1255 | 2.647679 |
| 7025 | 664 | 1902 | 2.864458 |
| 7028 | 2337 | 3167 | 1.355156 |
| THIRD GROUP | | | |
| 7009 | 2840 | 3492 | 1.229577 |
| 7019 | 2304 | 2117 | 0.918837 |
| 7022 | 2269 | 3131 | 1.379903 |
| 7026 | 2848 | 2592 | 0.910112 |
| 7032 | 2635 | 1845 | 0.70019 |

| 70 | 76 | 33 | 77 | 42 |
|---|---|---|---|---|
| 61 | 149 | 101 | 83 | 54 |
| 78 | 101 | 188 | 95 | 82 |
| 124 | 104 | 227 | 125 | 93 |
| 114 | 41 | 174 | 192 | 188 |

(b)

| 3975 | 3875 | 3400 | 1750 | 2225 |
|---|---|---|---|---|
| 6200 | 2975 | 2200 | 1025 | 1650 |
| 5350 | 3825 | 575 | 425 | 1500 |
| 5700 | 4050 | 450 | 1750 | 1600 |
| 4625 | 6100 | 1925 | 850 | 325 |

(c)

| 2.271 | 2.039 | 4.121 | 0.909 | 2.119 |
|---|---|---|---|---|
| 4.066 | 0.799 | 0.871 | 0.494 | 1.222 |
| 2.744 | 1.515 | 0.122 | 0.179 | 0.732 |
| 1.839 | 1.558 | 0.079 | 0.56 | 0.688 |
| 1.623 | 5.951 | 0.443 | 0.177 | 0.069 |

F I G. 1 4
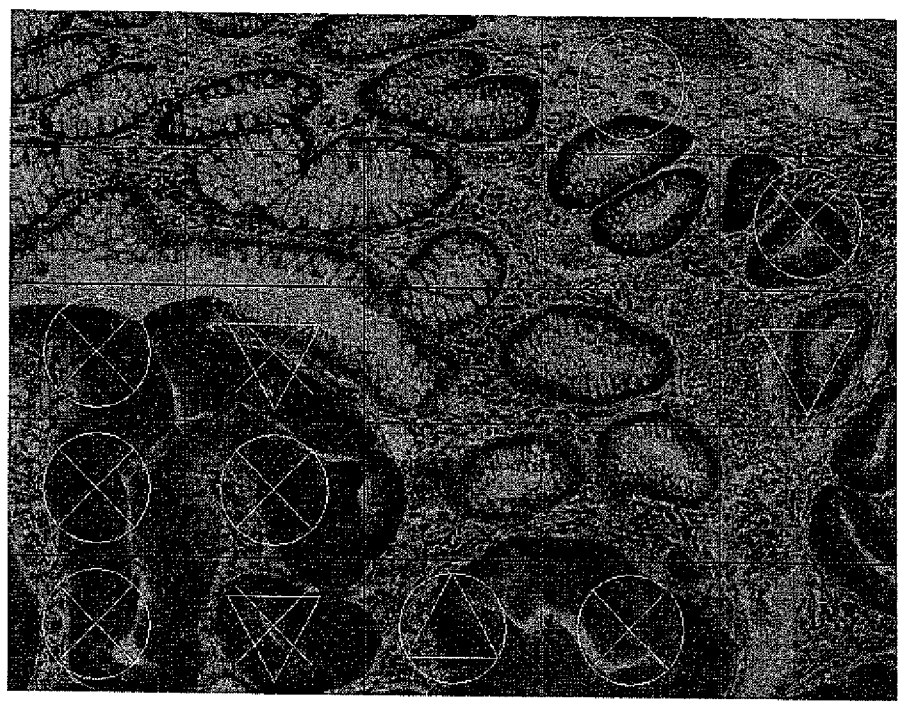

| 112 | 95 | 116 | 145 | 162 |
|---|---|---|---|---|
| 108 | 70 | 126 | 167 | 75 |
| 46 | 41 | 108 | 176 | 127 |
| 77 | 54 | 11 | 93 | 121 |
| 66 | 42 | 82 | 24 | 73 |

(b)

| 700 | 1050 | 1375 | 2525 | 900 |
|---|---|---|---|---|
| 675 | 350 | 750 | 1475 | 2850 |
| 2925 | 1950 | 800 | 1125 | 1850 |
| 3750 | 4150 | 1275 | 1150 | 1350 |
| 2675 | 2475 | 2550 | 5175 | 1175 |

(c)

| 0.25 | 0.442 | 0.474 | 0.697 | 0.222 |
|---|---|---|---|---|
| 0.25 | 0.2 | 0.238 | 0.353 | 1.52 |
| 2.543 | 1.902 | 0.296 | 0.256 | 0.583 |
| 1.948 | 3.074 | 0.451 | 0.495 | 0.446 |
| 1.621 | 2.357 | 1.244 | 8.625 | 0.644 |

| 149 | 182 | 200 | 198 | 206 |
|---|---|---|---|---|
| 161 | 157 | 183 | 194 | 208 |
| 123 | 178 | 181 | 188 | 222 |
| 127 | 153 | 171 | 200 | 194 |
| 107 | 147 | 123 | 164 | 179 |

(b)

| 0 | 25 | 50 | 0 | 0 |
|---|---|---|---|---|
| 0 | 0 | 25 | 75 | 25 |
| 50 | 25 | 0 | 25 | 75 |
| 0 | 0 | 25 | 0 | 50 |
| 50 | 0 | 25 | 25 | 25 |

(c)

| 0 | 0.005 | 0.01 | 0 | 0 |
|---|---|---|---|---|
| 0 | 0 | 0.005 | 0.015 | 0.005 |
| 0.016 | 0.006 | 0 | 0.005 | 0.014 |
| 0 | 0 | 0.006 | 0 | 0.01 |
| 0.19 | 0 | 0.008 | 0.006 | 0.006 |

F I G. 2 1
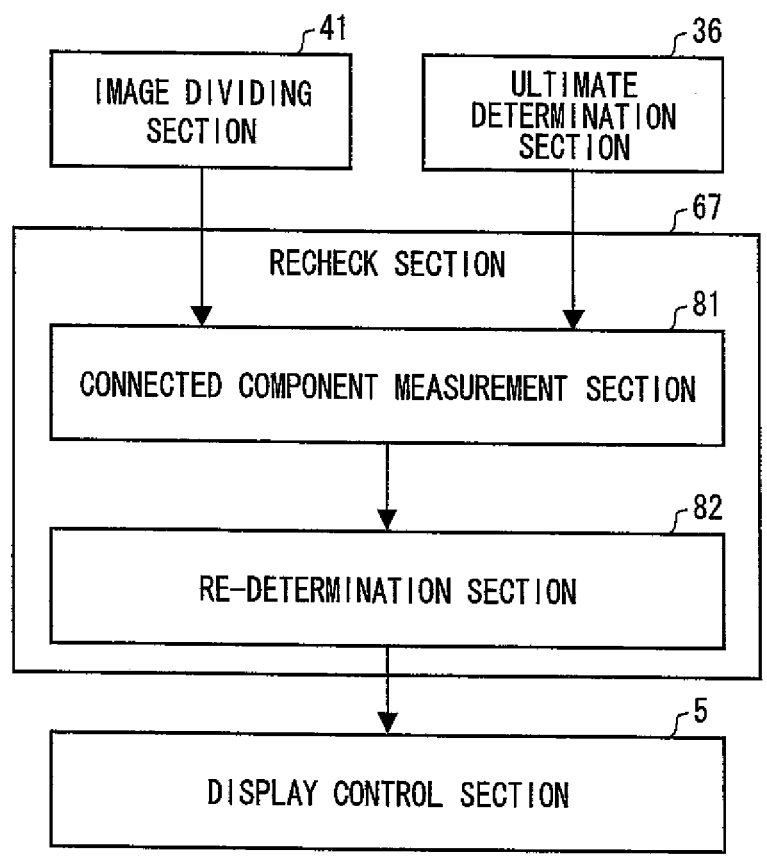

| IMAGE NUMBER | SAMPLE NUMBER | BINARIZATION REFERENCE VALUE | IMAGE PARAMETER | SAMPLE PARAMETER |
|---|---|---|---|---|
| 1 | 1 | 114 | 137 | 0.832 |
| 2 | 1 | 112 | 135 | 0.830 |
| 3 | 1 | 110 | 132 | 0.833 |
| 4 | 1 | 112 | 135 | 0.830 |
|   |   |   |   |   |
| 5 | 2 | 104 | 126 | 0.825 |
| 6 | 2 | 91 | 110 | 0.827 |
| 7 | 2 | 99 | 119 | 0.832 |
| 8 | 2 | 95 | 114 | 0.833 |
|   |   |   |   |   |
| 9 | 3 | 98 | 128 | 0.766 |
| 10 | 3 | 106 | 138 | 0.768 |
| 11 | 3 | 105 | 136 | 0.772 |
| 12 | 3 | 101 | 131 | 0.771 |
| 13 | 3 | 98 | 127 | 0.772 |

F I G. 2 4
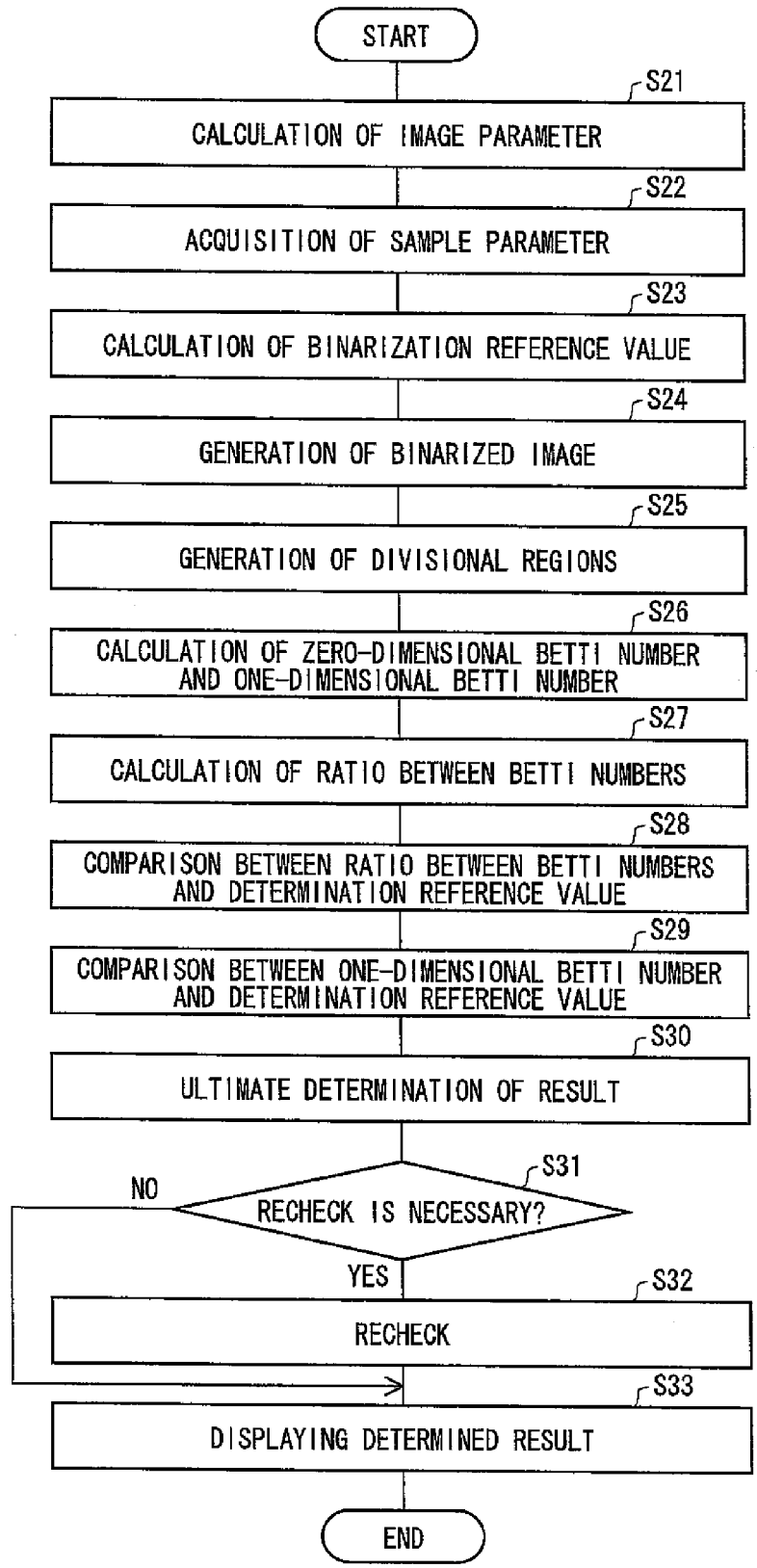

F I G. 2 5
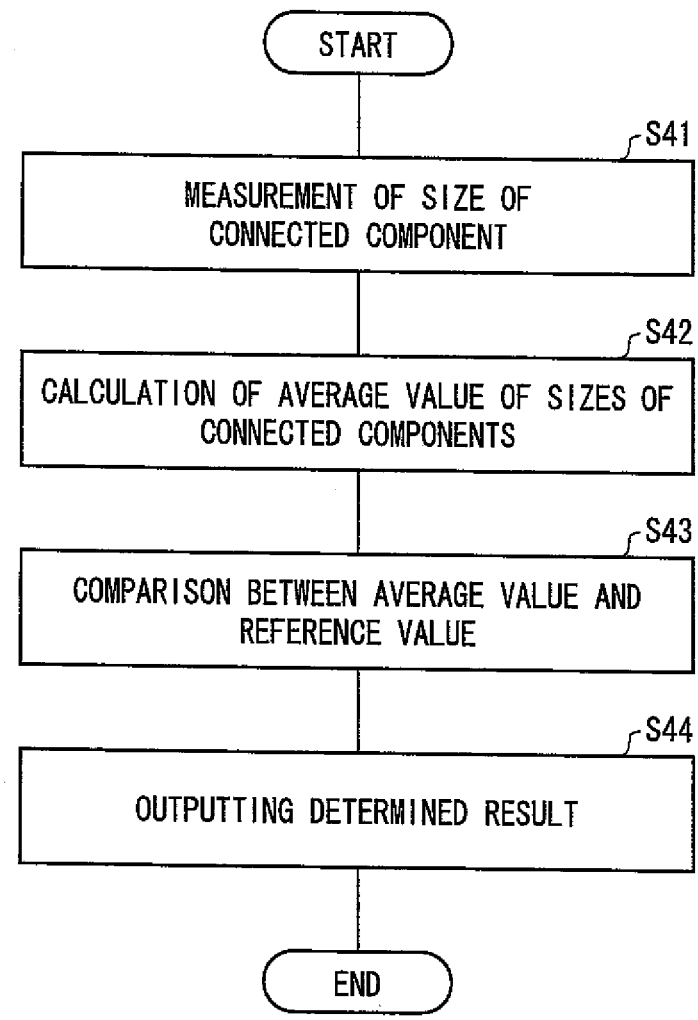

FIG. 26
NORMAL
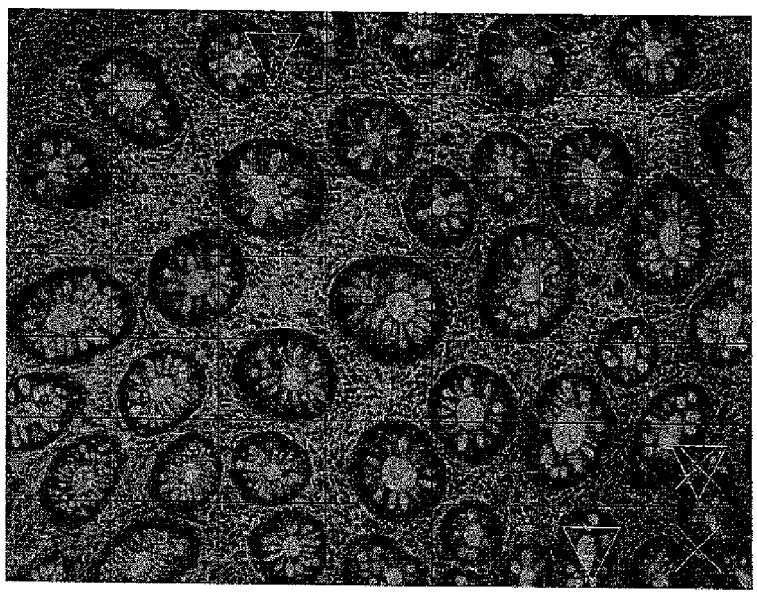
[THE NUMBER OF HOLES]
| 1372 | 1176 | 2058 | 1323 | 1960 | 1813 | 1470 |
|------|------|------|------|------|------|------|
| 1225 | 833  | 1274 | 1372 | 1029 | 637  | 1078 |
| 588  | 784  | 1715 | 735  | 1666 | 1470 | 1225 |
| 980  | 1323 | 490  | 1176 | 1421 | 784  | 1470 |
| 784  | 784  | 1176 | 833  | 882  | 833  | 882  |
| 637  | 833  | 686  | 1127 | 1274 | 1715 | 2352 |
| 784  | 980  | 1372 | 1421 | 1127 | 2156 | 1862 |
[THE NUMBER OF HOLES/THE NUMBER OF CONNECTED COMPONENTS]
| 0.33 | 0.3  | 0.67 | 0.44 | 0.83 | 0.74 | 0.86 |
|------|------|------|------|------|------|------|
| 0.3  | 0.18 | 0.3  | 0.6  | 0.28 | 0.19 | 0.38 |
| 0.12 | 0.16 | 0.97 | 0.16 | 0.76 | 0.53 | 0.63 |
| 0.4  | 0.42 | 0.12 | 0.6  | 0.55 | 0.21 | 0.79 |
| 0.28 | 0.25 | 0.44 | 0.17 | 0.26 | 0.35 | 0.39 |
| 0.19 | 0.27 | 0.21 | 0.39 | 0.41 | 1.21 | 1.92 |
| 0.2  | 0.26 | 0.38 | 0.39 | 0.49 | 1.33 | 2.38 |
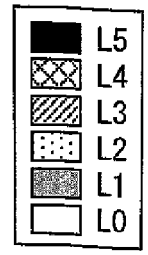
L5
L4
L3
L2
L1
L0

FIG. 27
SLIGHTLY ATYPICAL TISSUE
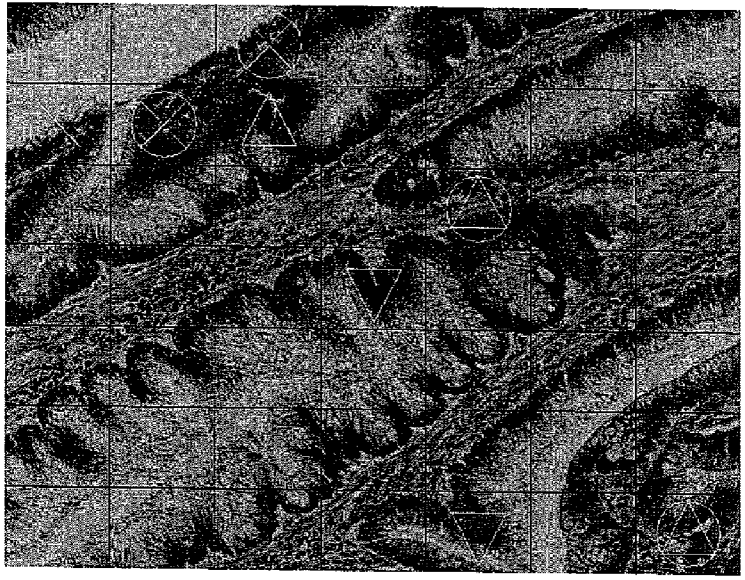
[THE NUMBER OF HOLES]
| 147 | 196 | 2646 | 245 | 245 | 441 | 196 |
|---|---|---|---|---|---|---|
| 931 | 2548 | 1666 | 735 | 1078 | 980 | 1274 |
| 784 | 686 | 490 | 1715 | 2401 | 1764 | 196 |
| 735 | 980 | 1470 | 2009 | 1323 | 1274 | 1421 |
| 1029 | 1225 | 0 | 147 | 686 | 882 | 882 |
| 784 | 49 | 294 | 1225 | 1274 | 1078 | 1372 |
| 0 | 833 | 784 | 1029 | 2205 | 1568 | 2989 |
[THE NUMBER OF HOLES/THE NUMBER OF CONNECTED COMPONENTS]
| 0.21 | 1 | 3.38 | 0.14 | 0.12 | 0.23 | 0.4 |
|---|---|---|---|---|---|---|
| 2.71 | 1.86 | 1.42 | 0.32 | 0.52 | 0.87 | 0.51 |
| 0.3 | 0.37 | 0.15 | 0.66 | 1.48 | 0.68 | 0.06 |
| 0.63 | 0.28 | 0.58 | 0.85 | 0.54 | 0.43 | 0.52 |
| 0.29 | 0.66 | 0 | 0.04 | 0.21 | 0.33 | 0.35 |
| 0.84 | 0.07 | 0.13 | 0.61 | 0.41 | 0.59 | 0.54 |
| 0 | 0.57 | 0.24 | 0.24 | 1.36 | 0.53 | 1.69 |
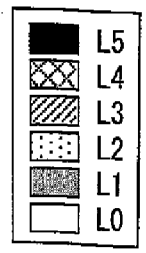

FIG. 28
HIGHLY ATYPICAL TISSUE
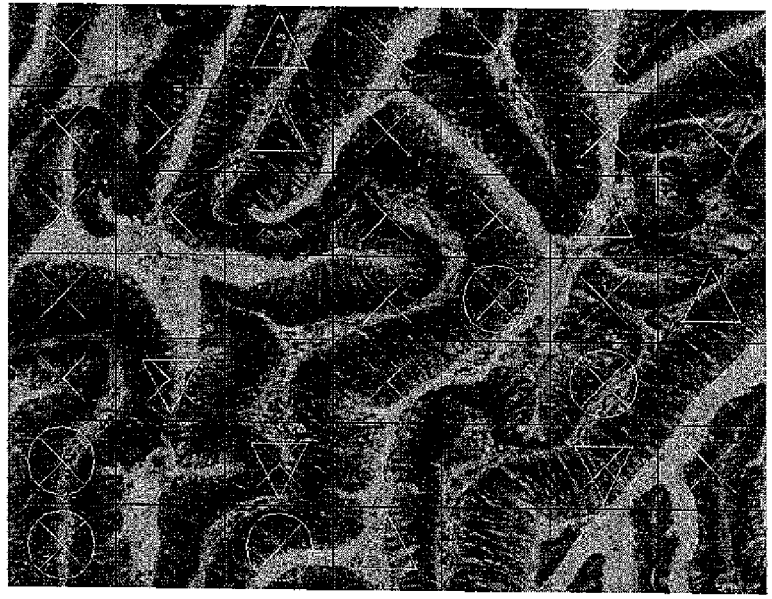
[THE NUMBER OF HOLES]
| 1029 | 833 | 1274 | 1911 | 1225 | 1862 | 882 |
|---|---|---|---|---|---|---|
| 882 | 1225 | 1470 | 1421 | 1078 | 1519 | 1274 |
| 1029 | 1421 | 931 | 1078 | 1470 | 1078 | 1225 |
| 735 | 539 | 588 | 1421 | 2401 | 1568 | 1617 |
| 1519 | 2009 | 1470 | 1862 | 980 | 2842 | 1813 |
| 2597 | 1225 | 2156 | 1127 | 833 | 2352 | 1470 |
| 2597 | 1323 | 2548 | 1666 | 1127 | 539 | 539 |
[THE NUMBER OF HOLES/THE NUMBER OF CONNECTED COMPONENTS]
| 2.33 | 0.77 | 1.63 | 3.55 | 2.78 | 4.75 | 3.6 |
|---|---|---|---|---|---|---|
| 1.8 | 3.13 | 1.43 | 2.07 | 1.1 | 7.75 | 2.36 |
| 2.63 | 2.42 | 2.38 | 1.83 | 4.29 | 1.69 | 1.09 |
| 3 | 1.38 | 0.92 | 2.9 | 3.27 | 2.13 | 1.43 |
| 2.21 | 3.15 | 1.2 | 1.81 | 0.61 | 2.76 | 3.7 |
| 2.04 | 1.32 | 3.67 | 1.35 | 0.49 | 3.2 | 3 |
| 3.53 | 1.35 | 3.25 | 1.7 | 0.59 | 0.69 | 0.38 |
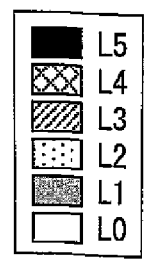

FIG. 29
CANCER TISSUE
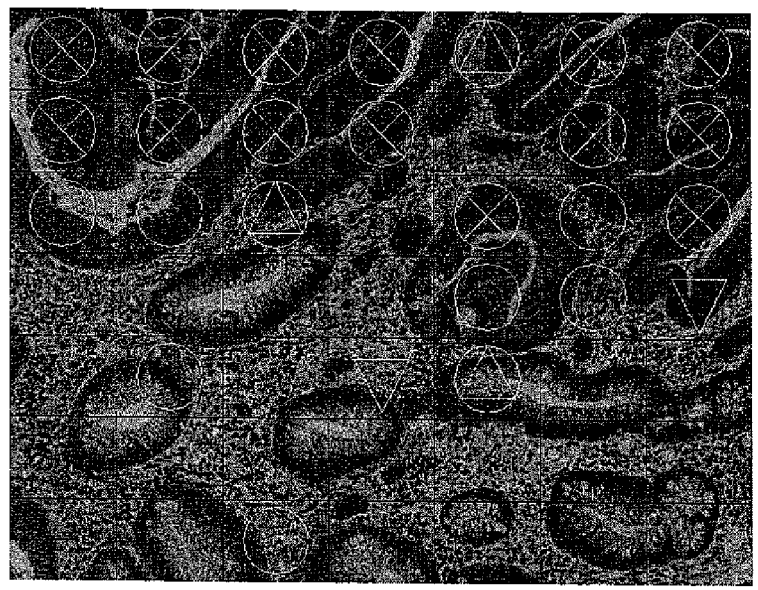
[THE NUMBER OF HOLES]
| 11172 | 5243 | 7742 | 5782 | 4116 | 3479 | 2744 |
|---|---|---|---|---|---|---|
| 8918 | 5733 | 5635 | 5194 | 1862 | 6370 | 2989 |
| 2695 | 4508 | 5243 | 1862 | 6321 | 3626 | 3626 |
| 490 | 1764 | 1715 | 882 | 3381 | 3528 | 2303 |
| 931 | 2548 | 931 | 2254 | 2597 | 980 | 1274 |
| 1029 | 1225 | 686 | 1127 | 392 | 1372 | 882 |
| 882 | 931 | 2646 | 1323 | 1421 | 1029 | 343 |
[THE NUMBER OF HOLES/THE NUMBER OF CONNECTED COMPONENTS]
| 8.44 | 2.89 | 6.58 | 4.37 | 1.68 | 3.74 | 1.93 |
|---|---|---|---|---|---|---|
| 4.04 | 3.77 | 2.45 | 2.47 | 0.55 | 4.81 | 4.69 |
| 0.76 | 1.31 | 1.53 | 0.46 | 3.39 | 1.3 | 5.69 |
| 0.07 | 0.44 | 0.78 | 0.17 | 1.33 | 1.11 | 0.78 |
| 0.17 | 0.6 | 0.18 | 0.78 | 1.56 | 0.26 | 0.37 |
| 0.21 | 0.27 | 0.17 | 0.27 | 0.07 | 0.49 | 0.21 |
| 0.15 | 0.25 | 0.47 | 0.54 | 0.38 | 0.33 | 0.09 |
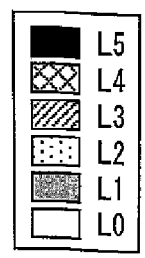
L5
L4
L3
L2
L1
L0

F I G. 3 0
CANCER TISSUE 1 (WELL-DIFFERENTIATED)
[THE NUMBER OF HOLES]
| 637 | 3675 | 5341 | 3185 | 1372 | 4753 | 3234 |
|---|---|---|---|---|---|---|
| 343 | 637 | 3381 | 4361 | 6174 | 1029 | 3332 |
| 1127 | 1029 | 784 | 9457 | 6419 | 1029 | 2450 |
| 2303 | 882 | 490 | 3822 | 6517 | 4998 | 7693 |
| 1225 | 1568 | 245 | 1078 | 4900 | 8232 | 5243 |
| 2695 | 1225 | 1323 | 931 | 5782 | 6713 | 5047 |
| 2205 | 441 | 2303 | 931 | 2401 | 3626 | 4704 |
[THE NUMBER OF HOLES/THE NUMBER OF CONNECTED COMPONENTS]
| 0.18 | 1.7 | 6.06 | 2.17 | 0.54 | 3.73 | 2.13 |
|---|---|---|---|---|---|---|
| 0.08 | 0.17 | 1.86 | 2.54 | 3.5 | 0.18 | 2.19 |
| 0.34 | 0.23 | 0.17 | 10.72 | 3.85 | 0.23 | 1.19 |
| 1.04 | 0.21 | 0.11 | 1.24 | 4.75 | 2.83 | 9.24 |
| 0.35 | 0.5 | 0.05 | 0.29 | 4 | 8.4 | 2.89 |
| 1.31 | 0.56 | 0.3 | 0.22 | 2.88 | 5.27 | 2.86 |
| 0.78 | 0.13 | 1.07 | 0.2 | 0.62 | 1.3 | 1.57 |
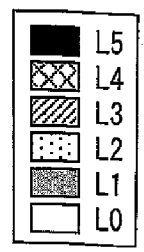

FIG. 31
CANCER TISSUE 2 (WELL-DIFFERENTIATED)
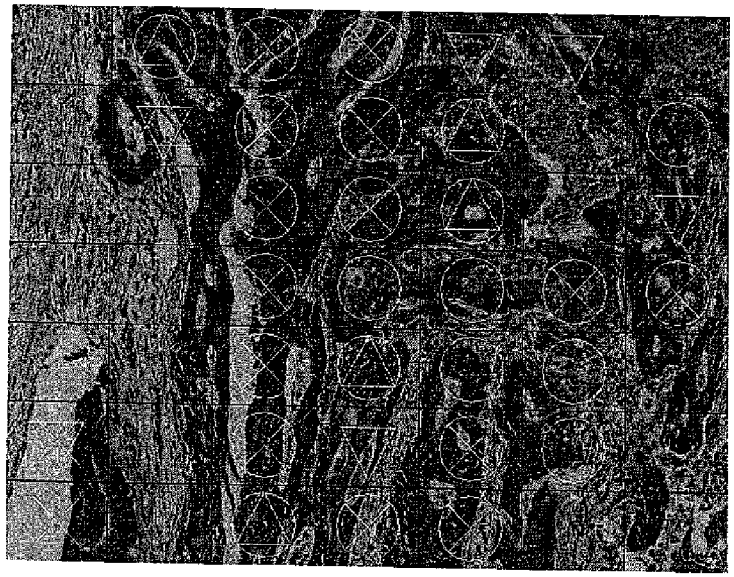
[THE NUMBER OF HOLES]
| 98 | 2597 | 2597 | 3479 | 2205 | 2058 | 784 |
|---|---|---|---|---|---|---|
| 196 | 2254 | 3283 | 3577 | 2695 | 735 | 2744 |
| 0 | 1323 | 4557 | 3773 | 3136 | 1176 | 2009 |
| 0 | 980 | 2989 | 2499 | 2548 | 3626 | 3577 |
| 98 | 1372 | 2499 | 2842 | 3087 | 2548 | 1813 |
| 2156 | 931 | 3969 | 2352 | 3822 | 3381 | 1127 |
| 1911 | 1764 | 2891 | 2842 | 3969 | 1470 | 1911 |
[THE NUMBER OF HOLES/THE NUMBER OF CONNECTED COMPONENTS]
| 0.03 | 1.66 | 1.96 | 3.38 | 0.61 | 1.11 | 0.15 |
|---|---|---|---|---|---|---|
| 0.06 | 1.53 | 3.94 | 2.43 | 1.49 | 0.14 | 1.14 |
| 0 | 0.4 | 5.81 | 1.88 | 1.6 | 0.32 | 1.28 |
| 0 | 0.33 | 3.21 | 0.96 | 0.73 | 1.72 | 2.7 |
| 0.06 | 0.5 | 3 | 1.49 | 0.94 | 0.76 | 0.71 |
| 2 | 0.35 | 3 | 0.92 | 3.12 | 1.1 | 0.37 |
| 5.57 | 0.82 | 1.44 | 1.71 | 2.53 | 0.39 | 0.58 |
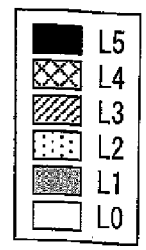
L5
L4
L3
L2
L1
L0

FIG. 32
COEXISTENCE OF WELL-DIFFERENTIATED CANCER TISSUE AND NORMAL TISSUE
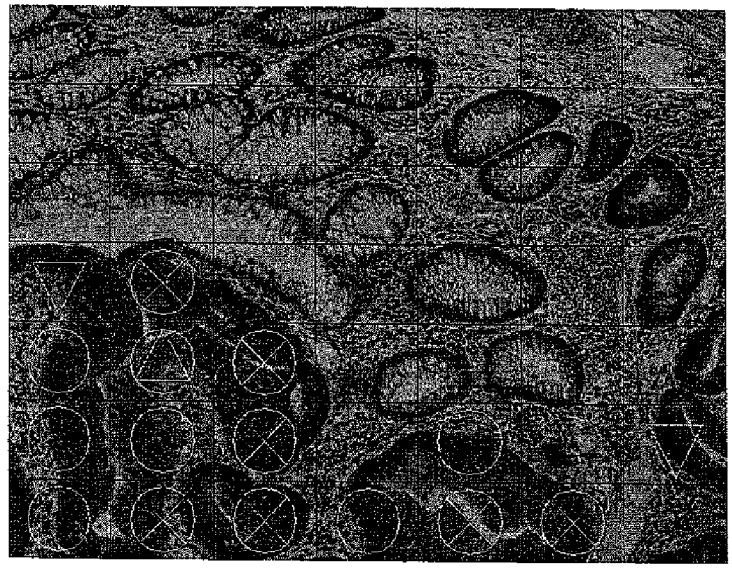
[THE NUMBER OF HOLES]
| 980 | 392 | 931 | 637 | 490 | 1323 | 98 |
|---|---|---|---|---|---|---|
| 245 | 931 | 294 | 637 | 294 | 1176 | 1421 |
| 196 | 294 | 392 | 392 | 147 | 441 | 1960 |
| 2254 | 5243 | 784 | 588 | 637 | 490 | 637 |
| 3528 | 3087 | 4655 | 686 | 1323 | 245 | 882 |
| 4116 | 3038 | 4263 | 588 | 3136 | 490 | 2058 |
| 3185 | 3332 | 3871 | 3087 | 4508 | 3185 | 1078 |
[THE NUMBER OF HOLES/THE NUMBER OF CONNECTED COMPONENTS]
| 0.48 | 0.08 | 0.26 | 0.15 | 0.1 | 0.25 | 0.03 |
|---|---|---|---|---|---|---|
| 0.08 | 0.39 | 0.18 | 0.17 | 0.08 | 0.38 | 0.38 |
| 0.27 | 0.18 | 0.29 | 0.13 | 0.02 | 0.06 | 0.67 |
| 1.02 | 4.12 | 0.53 | 0.2 | 0.25 | 0.05 | 0.2 |
| 1.18 | 1.5 | 4.52 | 0.18 | 0.39 | 0.04 | 0.22 |
| 1.35 | 1.02 | 2.42 | 0.17 | 1.1 | 0.09 | 0.59 |
| 1.27 | 2.27 | 2.72 | 1.07 | 2.19 | 1.76 | 0.38 |
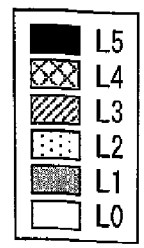

POORLY-DIFFERENTIATED CANCER

[THE NUMBER OF HOLES]

| 0 | 49 | 49 | 0 | 49 | 49 | 294 |
|---|---|---|---|---|---|---|
| 0 | 49 | 147 | 196 | 98 | 98 | 147 |
| 0 | 0 | 49 | 0 | 49 | 98 | 147 |
| 245 | 196 | 196 | 245 | 0 | 294 | 49 |
| 49 | 49 | 294 | 147 | 98 | 441 | 147 |
| 147 | 98 | 343 | 98 | 49 | 147 | 98 |
| 49 | 294 | 245 | 0 | 441 | 196 | 147 |

[THE NUMBER OF HOLES/THE NUMBER OF CONNECTED COMPONENTS]

| 0 | 0.02 | 0.01 | 0 | 0.02 | 0.01 | 0.08 |
|---|---|---|---|---|---|---|
| 0 | 0.01 | 0.04 | 0.07 | 0.03 | 0.04 | 0.07 |
| 0 | 0 | 0.02 | 0 | 0.03 | 0.04 | 0.06 |
| 0.07 | 0.06 | 0.06 | 0.12 | 0 | 0.11 | 0.02 |
| 0.01 | 0.01 | 0.09 | 0.07 | 0.05 | 0.21 | 0.07 |
| 0.05 | 0.02 | 0.08 | 0.03 | 0.02 | 0.04 | 0.02 |
| 0.01 | 0.06 | 0.05 | 0 | 0.11 | 0.04 | 0.03 |

POORLY-DIFFERENTIATED CANCER (PART II)

[THE NUMBER OF HOLES]

| 0 | 0 | 0 | 0 | 0 | 0 | 0 |
|---|---|---|---|---|---|---|
| 0 | 0 | 49 | 0 | 0 | 0 | 0 |
| 0 | 0 | 49 | 0 | 49 | 0 | 0 |
| 0 | 0 | 0 | 49 | 0 | 49 | 0 |
| 0 | 0 | 98 | 98 | 98 | 0 | 0 |
| 0 | 49 | 49 | 392 | 637 | 294 | 49 |
| 0 | 0 | 539 | 98 | 343 | 49 | 49 |

[THE NUMBER OF HOLES/THE NUMBER OF CONNECTED COMPONENTS]

| 0 | 0 | 0 | 0 | 0 | 0 | 0 |
|---|---|---|---|---|---|---|
| 0 | 0 | 0.02 | 0 | 0 | 0 | 0 |
| 0 | 0 | 0.03 | 0 | 0.02 | 0 | 0 |
| 0 | 0 | 0 | 0.02 | 0 | 0.01 | 0 |
| 0 | 0 | 0.03 | 0.02 | 0.03 | 0 | 0 |
| 0 | 0.02 | 0.01 | 0.1 | 0.14 | 0.08 | 0.02 |
| 0 | 0 | 0.14 | 0.02 | 0.08 | 0.02 | 0.02 |

FIG. 35

| No | AVERAGE SIZE (μm) |
|---|---|
| 1 | 3.50 |
| 2 | 2.18 |
| 3 | 6.53 |
| 4 | 4.72 |
| 5 | 12.11 |
| 6 | 3.50 |
| 7 | 13.58 |
| 8 | 8.85 |
| 9 | 11.95 |
| 10 | 4.73 |

| No | AVERAGE SIZE (μm) |
|---|---|
| 11 | 13.61 |
| 12 | 17.01 |
| 13 | 3.64 |
| 14 | 6.60 |
| 15 | 5.08 |
| 16 | 36.68 |
| 17 | 24.99 |
| 18 | 34.58 |
| 19 | 30.54 |
| 20 | 31.06 |

F I G. 3 7
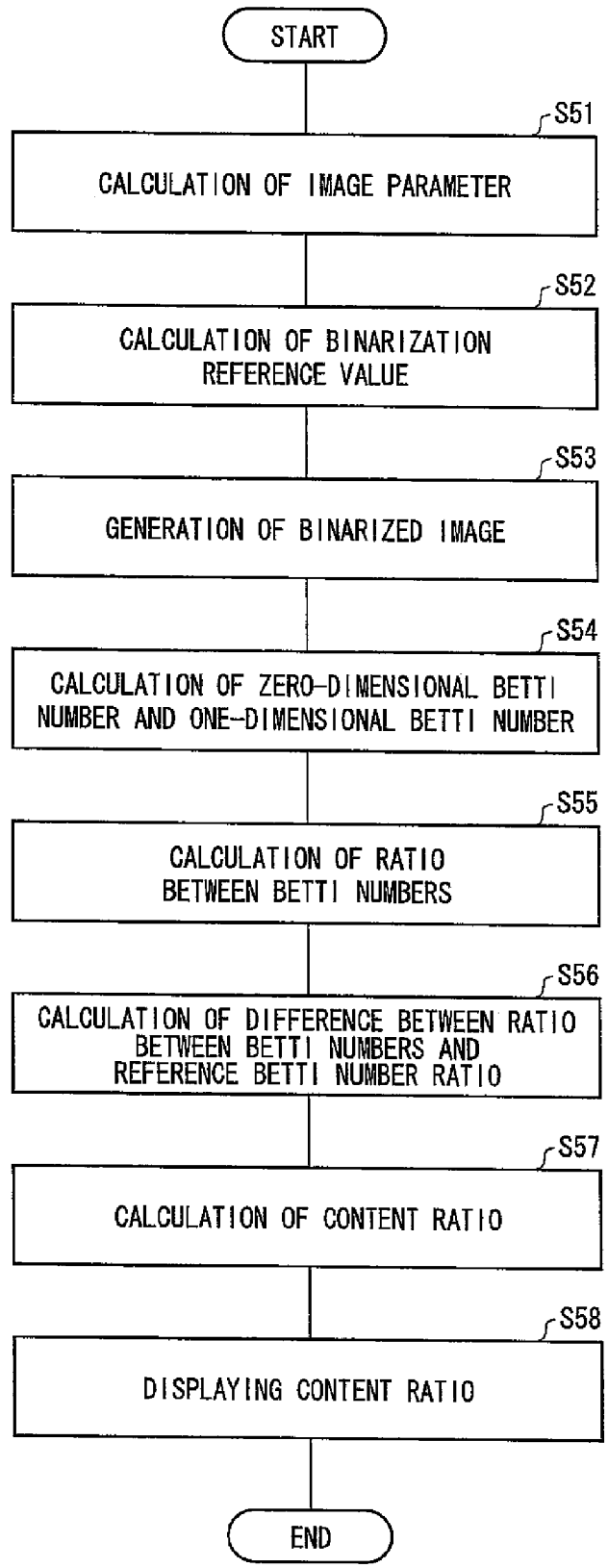

[THE NUMBER OF HOLES/THE NUMBER OF CONNECTED COMPONENTS]

| COMPENSATION PARAMETER | 0.9 | 0.8 | 0.7 | 0.6 |
|---|---|---|---|---|
| MARTENSITE | 3 | 1.29 | 0.49 | 0.15 |
| PEARLITE | 4.37 | 4.69 | 3.12 | 1.26 |
| FERRITE | 2.9 | 2.59 | 1.4 | 0.52 |

[THE NUMBER OF HOLES]

| COMPENSATION PARAMETER | 0.9 | 0.8 | 0.7 | 0.6 |
|---|---|---|---|---|
| MARTENSITE | 12457 | 9087 | 4458 | 1596 |
| PEARLITE | 19098 | 12185 | 8506 | 5521 |
| FERRITE | 16545 | 9886 | 6007 | 3349 |

IMAGE ANALYSIS APPARATUS, IMAGE ANALYSIS METHOD, IMAGE ANALYSIS PROGRAM AND RECORDING MEDIUM

TECHNICAL FIELD

The present invention relates to an image analysis apparatus and an image analysis method, each of which analyzes a captured image in which a tissue is captured so as to determine whether or not cancer is present in the tissue.

BACKGROUND ART

Cancer treatment requires a medical certificate that proves presence of a cancer cell, which medical certificate is made by a pathological diagnosis. The pathological diagnosis determines, on the basis of morphological evidence obtained through microscopic observation, whether or not a cancer cell is present.

However, the absolute number of pathologists who can carry out such a pathological diagnosis is insufficient. There are facilities, such as a hospital in a remote area, where no full-time pathologist works. In such a facility, there may be a case where the pathological diagnosis cannot be carried out immediately when it is required. This causes a delay in starting on cancer treatment. Particularly, if a possible cancer tissue is found during an operation in a hospital where no pathologist works, it is then impossible to (i) appropriately decide a therapeutic strategy and (ii) determine which part is to be excised. The insufficiency in the number of such pathologists has been therefore pointed out as a significant problem.

Due to such a shortage of the pathologists, the number of pathological diagnoses performed per pathologist is increased, and this results in an increase in risk of occurrence of a diagnostic error (human error). In fact, there has been reported in the U.S. such a case that (i) few pathologists had to carry out a lot of diagnoses during a group medical examination for uterus cancer and (ii) this causes presence of cancer to be overlooked a lot in the group medical examination. There was even a case where such a human error led to a lawsuit. Further, the pathological diagnosis is carried out by a subjective decision on the basis of a morphological evidence of a tissue or a cell, which evidence is obtained through the microscopic observation. In some cases, it is difficult to morphologically determine whether or not cancer is present. In this regard, a more objective way has been demanded for the pathological diagnosis.

Under the circumstances, application of an image processing technique to screening for uterus cancer has been attempted in Japan. Cancer screening employing the image processing technique allows determination of presence of cancer without a pathologist being in an actual site where the cancer screening is carried out. According to the screening for uterus cancer, which employs the image processing technique, it is determined whether or not a cell is a cancer cell by finding, in an image of the cell, (i) a size of a nucleus, (ii) a ratio of the nucleus to a cytoplasm (N/C ratio), and/or (iii) a chromatin pattern.

Meanwhile, "AutoPap (Focal Point)" has been known as an image diagnosis system for recognizing a malignant cell by carrying out pattern recognition of a cancer cell. Performance of the AutoPap (Focal Point) is reported in Non-Patent Literatures 1 through 5. Further, a mechanism of the Auto Pap (Focal Point) is reported in Non-Patent Literature 6.

Furthermore, each of Non-Patent Literatures 7 and 8 discloses a technique for (i) morphologically presenting a cancer tissue in a three-dimensional manner by use of the Betti numbers and (ii) analyzing the cancer tissue.

CITATION LIST

Non-Patent Literature

Non-Patent Literature 1
Kyoko Hasegawa et al., "Introduction of Automatic Cell Diagnosis Apparatus (Auto Pap System) in Rescreening for Accuracy Management: Result of Field Test", the Journal of the Japanese society of Clinical Cytology, Vol. 37 (suppl. 1), 1998, p. 99

Non-Patent Literature 2
Kyoko Hasegawa et al., "Attempt to Perform Accuracy Management of Cervical Cytologic Sample Using Auto Rap 300QC System", the Journal of the Japanese society of Clinical Cytology, Vol. 37 (suppl. 1), 1998, p. 99

Non-Patent Literature 3
Kyoko Hasegawa et al., "Review of Possibility of Application of Gynecological Cytologic Automatic Screening Apparatus (Auto Pap) to Primary Screening", the Journal of the Japanese society of Clinical Cytology, Vol. 38 (suppl. 2), 1999, p. 495

Non-Patent Literature 4
Yoshie Iwasaki et al., "Review of Cytologic Automatic Diagnosis Support Apparatus (Auto Pap), Second Report", the Journal of the Japanese society of Clinical Cytology, Vol. 38 (suppl. 2), 1999, p. 495

Non-Patent Literature 5
Emi Kawatani et al., "Review by Auto Pap System (Focal Point (current)): Evaluation in Thinlayer Smear", the Journal of the Japanese society of Clinical Cytology, Vol. 43 (suppl. 1), 2004, p. 239

Non-Patent Literature 6
Noboru Tanaka et al., "Automated Cytologic Screening System (CYBEST Model 4): an Integrated Image Cytometry System", Applied OPTICS, Vol. 26, No. 16

Non-Patent Literature 7
Toru Takahashi et al., "Three-Dimensional Morphology of Gastric Adenocarcinoma", Stomach and Intestine, Vo. 18, No. 6, June 1983, p. 663-639

Non-Patent Literature 8
Toru Takahashi et al., "Three-Dimensional Structure of Atypical Epithelial Nest of Stomach", Stomach and Intestine, Vol. 18, No. 7, July 1983, p. 775-782

SUMMARY OF INVENTION

During the course of a cell becoming cancerous, various morphological changes are viewed in the cell, such as a change in size of its nucleus, a change in a ratio of the nucleus to the cytoplasm, and a change in chromatin pattern. According to any one of the conventional methods, however, (i) it is sometimes impossible to get rid of an influence of a noise due to components other than the cell in a tissue and (ii) this makes it difficult to accurately determine whether or not the cell is a cancer cell.

Furthermore, there are a variety of morphological types of either a mass of cancer cells or a cancer tissue containing a cancer cell. For this reason, it is difficult to recognize a cancer tissue by carrying out pattern recognition of a shape of a tissue. Further, a cancer tissue and a normal tissue show no difference in color between them when they are dyed. Therefore, it is also difficult to recognize a cancer tissue by finding a difference in color intensity of between the cancer tissue and the normal tissue thus dyed. For example, a nucleus of a cancer cell and a nucleus of a normal cell are similarly dyed by an HE (Hematoxylin Eosin) dyeing method, in principle.

According to the analysis method disclosed either in Non-Patent Literature 7 or Non-Patent Literature 8, a three-dimensional image is reconstructed on the basis of an image of a cancer tissue, and then a three-dimensional structure of the cancer tissue is assumed by use of the Betti numbers. This however requires a large amount of the image processing, and therefore the analysis method cannot be suitably used in a case where determination of the presence/absence of cancer needs to be carried out a lot of times within a short time period. In other words, the analysis method described in Non-Patent Literature 7 or 8 is not a practical method for determining whether or not cancer is present.

Further, according to the analysis method described in either Non-Patent Literature 7 or Non-Patent Literature 8, a structure of a cancer tissue, particularly, a structure of lung cancer, and a relatively large morphological change resulting from canceration of a tissue are analyzed morphologically. Therefore, according to the analysis method, it is difficult to (i) identify an essential characteristic of cancer and (ii) accurately determine whether or not cancer is present. It is considered that the analysis method raises a high risk of overlooking of, in particular, low-grade atypical cancer.

The present invention is made in view of the problems. An object of the present invention is to provide an image analysis apparatus which analyzes an image of a tissue so as to determine, with high accuracy, whether or not an image of a cancer tissue is included in the image of the tissue.

Further, the present invention is applicable to not only determination as to whether or not cancer is present in a body tissue but also determination of a composition of a structure other than a body tissue. A tissue is a unit of structure (certain pattern) in which a predetermined plurality types of components congregate so as to form a certain pattern. A body tissue has an arrangement in which cells which are identical with each other in function and morphological property congregate, while a mineral structure has a structure which is determined in accordance with a size of and a shape of its crystal grains, a sequence of the crystal grains, and the like.

Such a mineral structure or the like significantly varies in its characteristics in accordance with its structure, and can be categorized on the basis of visual observation with a microscope or the like. However, such observation is significantly influenced by a subjective opinion of an observer as the pathological diagnosis. Accordingly, a determined result may differ depending on observer's skills and experience. In this regard, converting a structure into objective values and carrying out determination on the basis of such objective values are significantly valuable in view of various applications.

When being broadly interpreted, an object of the present invention is to provide an image analysis apparatus that can analyze a structure image so as to determine a composition of a structure included in the structure image.

In order to attain the object, an image analysis apparatus of the present invention includes: component and space number calculation means for calculating, in a captured image (i) in which a tissue is captured and (ii) which has been binarized by use of a prescribed reference value as a threshold, (I) the number of connected components and (II) the number of spaces, each of the connected components being an aggregate of at least one component which is defined by connecting an outer edge(s) of the at least one component which is a graphic having a closed outer edge, each of the spaces being surrounded by an outer edge(s) of the at least one component; comparison value calculation means for calculating a comparison value which indicates a difference between the number of connected components and the number of spaces, both of which have been calculated by the component and space number calculation means; and determination means for determining, by comparing the comparison value calculated by the comparison value calculation means with a predetermined reference value, whether or not an image of a cancer tissue is included in the captured image.

In order to attain the object, an image analysis method of the present invention, for use in an image analysis apparatus which analyzes a captured image in which a tissue is captured, includes the steps of: (a) calculating, in a captured image (i) in which a tissue is captured and (ii) which has been binarized by use of a prescribed reference value as a threshold, (I) the number of connected components and (II) the number of spaces, each of the connected components being an aggregate of at least one component which is defined by coming in contact with an outer edge(s) of the at least one component which is a graphic having a closed outer edge, each of the spaces being surrounded an outer edge(s) of the at least one component; (b) calculating a comparison value which indicates a difference between the number of connected components and the number of spaces, both of which have been calculated in the step (a); and (c) determining that an image of a cancer tissue is included in the captured image in a case where the comparison value calculated in the step (b) is greater than a predetermined reference value.

During the course of a tissue becoming cancerous, proliferation of a cell group constituting the tissue occurs disorderly. Therefore, the cell group becomes likely to be in contact with another cell group. The inventors of the present invention found that it is possible to determine whether or not a cancer tissue is present by digitalizing such a change by use of a comparison value indicating a difference between the number of spaces and the number of connected components. Note that each of the spaces described above is a space on a two-dimensional plane of the captured image.

According to the arrangement, the component and number calculation means calculates, in a captured image (i) in which a tissue is captured and (ii) which has been binarized by use of a prescribed reference value as a threshold, (I) the number of connected components and (ii) the number of spaces (holes), each of the connected components being an aggregate of at least one component which is defined by connecting an outer edge(s) of the at least one component which is a graphic having a closed outer edge, each of the spaces being surrounded by an outer edge(s) of the at least one component. To put it mathematically, such a process includes a step of calculating Betti numbers of the captured image. The number of connected components corresponds to a zero-dimensional Betti number, while the number of spaces corresponds to a one-dimensional Betti number. In this regard, the component and space number calculation means is means for calculating a zero-dimensional Betti number and a one-dimensional Betti number of a captured image of a tissue, for example.

The component and space number calculation means can be a device for executing a program for calculating the Betti numbers from the image. Such a program has been well known.

The comparison value calculation means calculates a comparison value indicating a difference between of the number of connected components and the number of spaces (holes). The comparison value can be a ratio of the number of spaces to the number of connected components or a difference between them. Further, the comparison value can also be a value obtained by use of a function indicating a relationship between the number of spaces and the number of connected components.

Then, the determination means determines, by comparing the comparison value calculated by the comparison value calculation means with the predetermined reference value, whether or not an image of a cancer tissue (malignant tumor) is included in the captured image of the tissue. For example, the determination means determines that an image of a cancer tissue is included in the tissue image in a case where the comparison value calculated by the comparison value calculation means is greater than the predetermined reference value. The predetermined reference value is a reference value for statistically discriminating a comparison value obtained from a tissue including a cancer tissue from a comparison value obtained from a normal tissue, and is set appropriately by a person skilled in the art.

The phenomenon in which the number of spaces increases with respect to the number of connected components is inherent in generation of a differentiated cancer tissue. Therefore, according to the arrangement describe above, it is possible to determine, with high accuracy, by use of an image of a tissue, whether or not a differentiated cancer tissue is included in the tissue.

In order to attain the object, an image analysis apparatus of the present invention includes: space number calculation means for calculating, in a captured image (i) in which a tissue is captured and (ii) which has been binarized by use of a prescribed reference value as a threshold, the number of spaces, each of which is surrounded by an outer edge(s) of a component(s) which is a graphic having a closed outer edge; and determination means for determining, by comparing the number of spaces, calculated by the space number calculation means, with a predetermined reference value, whether or not an image of a cancer tissue is included in the captured image.

In order to attain the object, an image analysis method of the present invention, for use in an image analysis apparatus which analyzes a captured image in which a tissue is captured, includes the steps of: (a) calculating, in a captured image (i) in which a tissue is captured and (ii) which has been binarized by use of a prescribed reference value as a threshold, the number of spaces, each of which is surrounded by an outer edge(s) of a component(s) which is a graphic having a closed outer edge; and (b) determining, by comparing the number of spaces, calculated in the step (a), with a predetermined reference value, whether or not an image of a cancer tissue is included in the captured image.

During the course of a tissue becoming cancerous, proliferation of a cell group occurs disorderly. Therefore, the cell group becomes likely to be in contact with another cell group. The inventors of the present invention found that it is possible to determine whether or not a cancer cell is present by finding the foregoing change on the basis of a change in the number of spaces. Note that each of the spaces is a space on a two-dimensional plane of the captured image.

During the course of generation of a differentiated cancer tissue, there is an increase in the number of spaces. Meanwhile, during the course of generation of a poorly-differentiated cancer tissue, there is a reduction in the number of spaces. Note that each of the spaces is a space on a two-dimensional plane of the captured image.

According to the arrangement, the space number calculation means calculates, in a captured image in which (i) a tissue is captured and (ii) which has been binarized by use of a prescribed reference value as a threshold, the number of spaces (holes), each of which is surrounded by an outer edge(s) of at least one component which is a graphic having a closed outer edge. To put it mathematically, such a process includes a step of calculating a two-dimensional Betti number of the captured image. In this regard, the space number calculation means is means for calculating a two-dimensional Betti number of the captured image of the tissue, for example.

The determination means determines, on the basis of a result of a comparison between the predetermined reference value and the number of spaces, calculated by the space calculation means, whether or not an image of a cancer tissue is included in the captured image of the tissue. The predetermined reference value is a reference value for statistically discriminating the number of spaces, obtained from a normal tissue, from the number of spaces, obtained from a tissue including a cancer tissue. The predetermined reference value is set appropriately by a person skilled in the art.

The phenomenon in which the number of spaces significantly increases is inherent in generation of a differentiated cancer tissue. Meanwhile, the phenomenon in which the number of spaces significantly decreases is inherent in generation of a poorly-differentiated cancer tissue. Therefore, according to the arrangement described above, it is possible to determine, with high accuracy, by use of a captured image of a tissue, whether or not a cancer tissue is included in the tissue.

An image analysis apparatus of the present invention includes: component and space number calculation means for calculating, in a captured image (i) in which a structure is captured and (ii) which has been caused to have a low resolution, (I) the number of connected components and (II) the number of spaces, each of the connected components being an aggregate of at least one component which is defined by connecting an outer edge(s) of the at least one component which is a graphic having a closed outer edge, each of the spaces being surrounded by an outer edge(s) of the at least one component; comparison value calculation means for calculating a comparison value which indicates a difference between the number of connected components and the number of spaces, both of which have been calculated by the component and space number calculation means; and determination means for determining, by comparing the comparison value calculated by the comparison value calculation means with a predetermined reference value, a composition of the structure included in the captured image.

The structure is a unit in which a plurality of types of components congregate so as to form a certain pattern. The structure is determined in accordance with a size of and a shape of its components, a sequence of the components, and the like. In a case of a metal structure, for example, how the metal structure is constituted is determined in accordance with a size of and a shape of its crystal grains (components), a sequence of the crystal grains, and the like. The entire structure significantly varies in its characteristics in accordance with how the structure is constituted. Therefore, by determining how the structure is constituted, it is possible to determine what characteristics the structure has.

The inventors of the present invention found that it is possible to determine how the structure is constituted by digitizing the structure by use of a comparison value indicating a difference between the number of spaces and the number of connected components. Note that each of the spaces is a space on a two-dimensional plane of the captured image.

According to the arrangement, the component and space number calculation means calculates, in a captured image (i) in which a structure is captured and (ii) which has been caused to have a low resolution, (I) the number of connected components and (ii) the number of spaces (holes), each of the connected components being an aggregate of at least one component which is defined by connecting an outer edge(s) of the at least one component which is a graphic having a closed outer edge, each of the spaces being surrounded by an outer edge(s) of the at least one component. To put it mathematically, such a process includes a step of calculating Betti numbers of an image having a low resolution. The number of connected components corresponds to a zero-dimensional Betti number, while the number of spaces corresponds to a one-dimensional Betti number. In this regard, the component and space number calculation means is means for calculating a zero-dimensional Betti number and a one-dimensional Betti number of a image having a low resolution.

The component and space number calculation means can be a device for executing a program for calculating the Betti numbers from the image. Such a program has been well known.

The comparison value calculation means calculates a comparison value which indicates a difference between the number of connected components and the number of spaces, both of which have been calculated by the component and space number calculation means. The comparison value can be a ratio of the number of spaces to the number of connected components or a difference between them. Further, the comparison value can also be a value obtained by use of a function indicating a relationship between the number of spaces and the number of connected components.

Then, the determination means determines, by comparing the comparison value calculated by the comparison value calculation means with the predetermined reference value, a composition of the structure included in the captured image.

Accordingly, it is possible to determine, by use of an image of a structure, what structure is included in the image, without carrying out physical or chemical analysis.

BRIEF DESCRIPTION OF DRAWINGS

FIG. 1 is a view schematically illustrating a configuration of a cancer determination apparatus in accordance with Embodiment 1 of the present invention.

Figure 2:
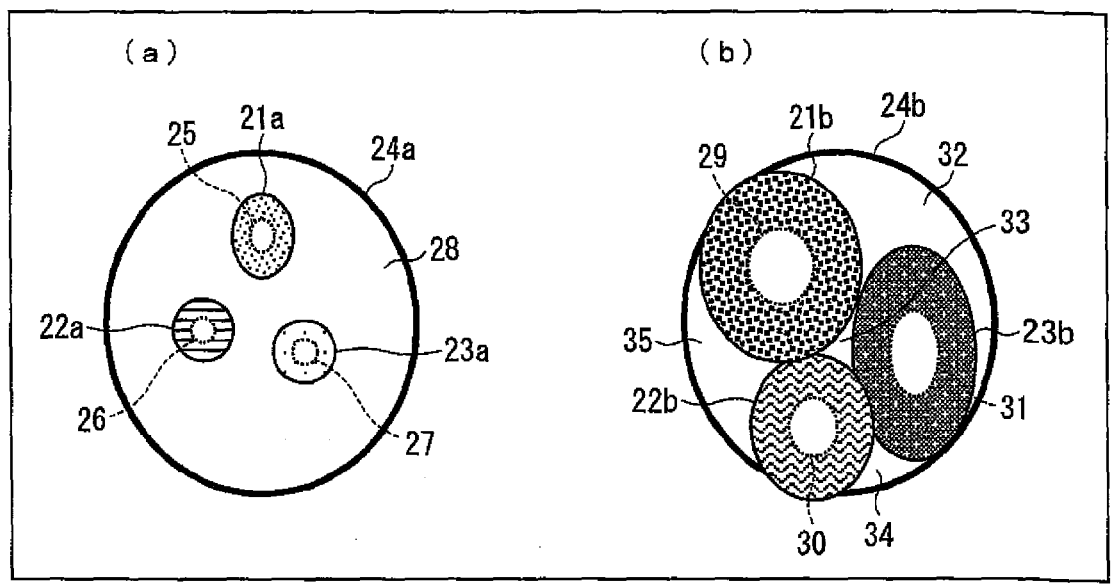
FIG. 2

(a) and (b) of FIG. 2 are views for morphologically explaining a differentiated cancer tissue.

FIG. 3

Figure 3:
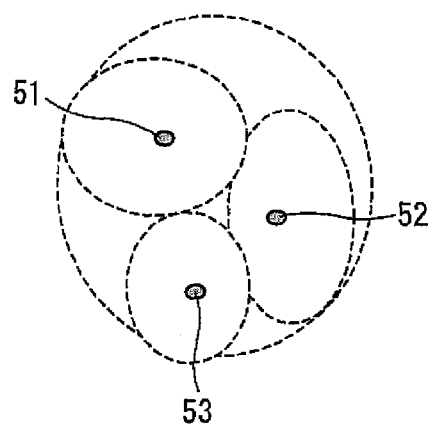

FIG. 3 is a view for morphologically explaining a poorly-differentiated cancer tissue.

FIG. 4

Figure 4:
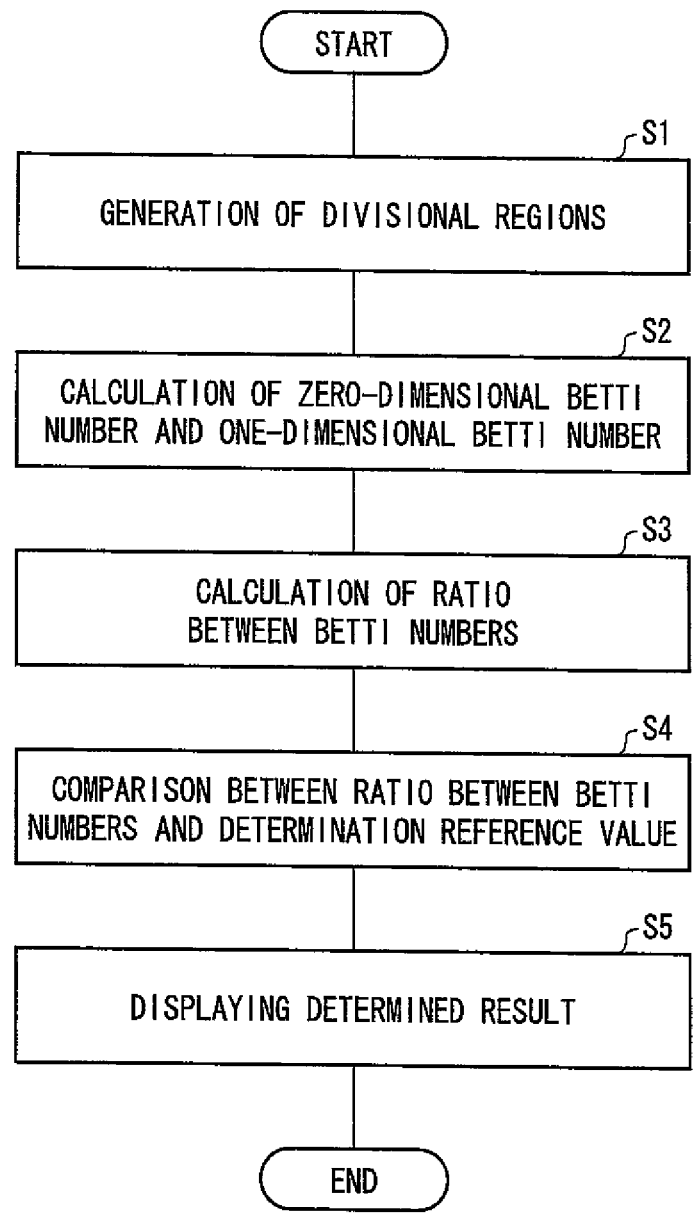

FIG. 4 is a flowchart showing an example of how a process is carried out by the cancer determination apparatus of Embodiment 1 of the present invention.

FIG. 5

Figure 5:
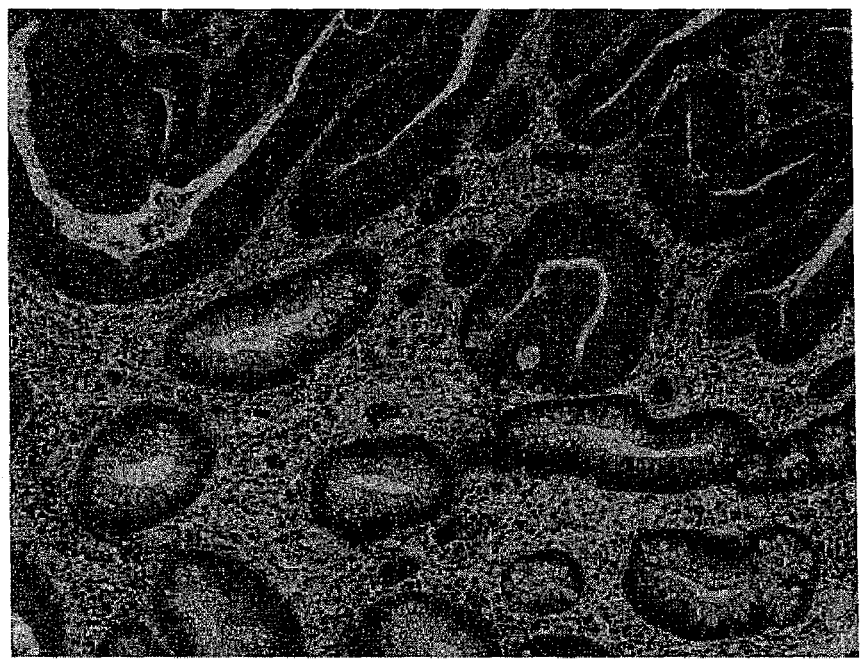

FIG. 5 is a view showing an example of a tissue image in which a tissue is captured.

FIG. 6

Figure 6:
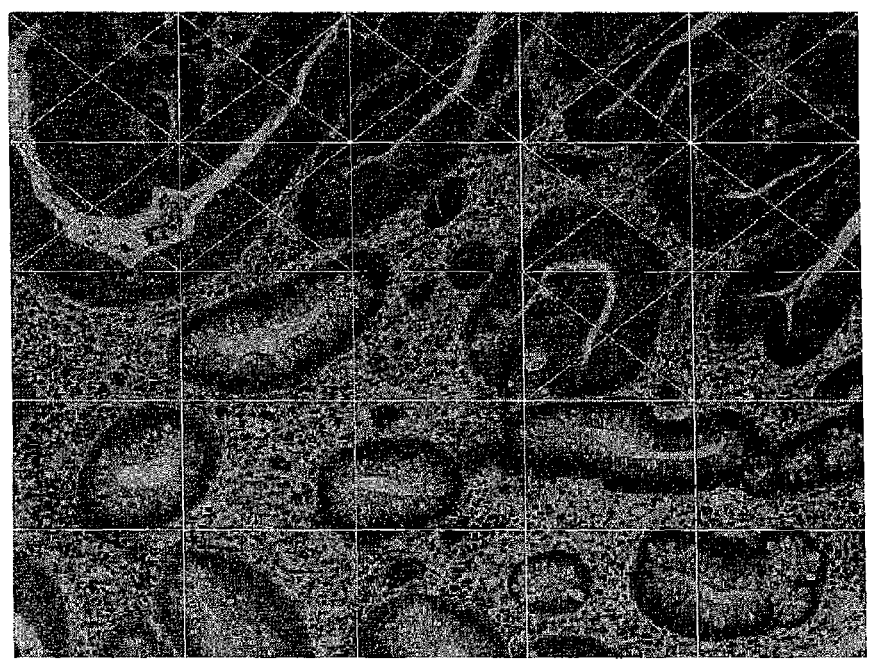

FIG. 6 is a view showing how the tissue image shown in FIG. 5 is divided into 5×5 divided regions.

FIG. 7

(a) of FIG. 7 is a view showing a tissue image captured at a certain magnification, (b) of FIG. 7 is a view showing a tissue image captured at another magnification, and (c) of FIG. 7 is a view showing a tissue image captured at still another magnification.

FIG. 8

FIG. 8 is a view showing an example of a tissue image that has been binarized.

FIG. 9

Figure 9:
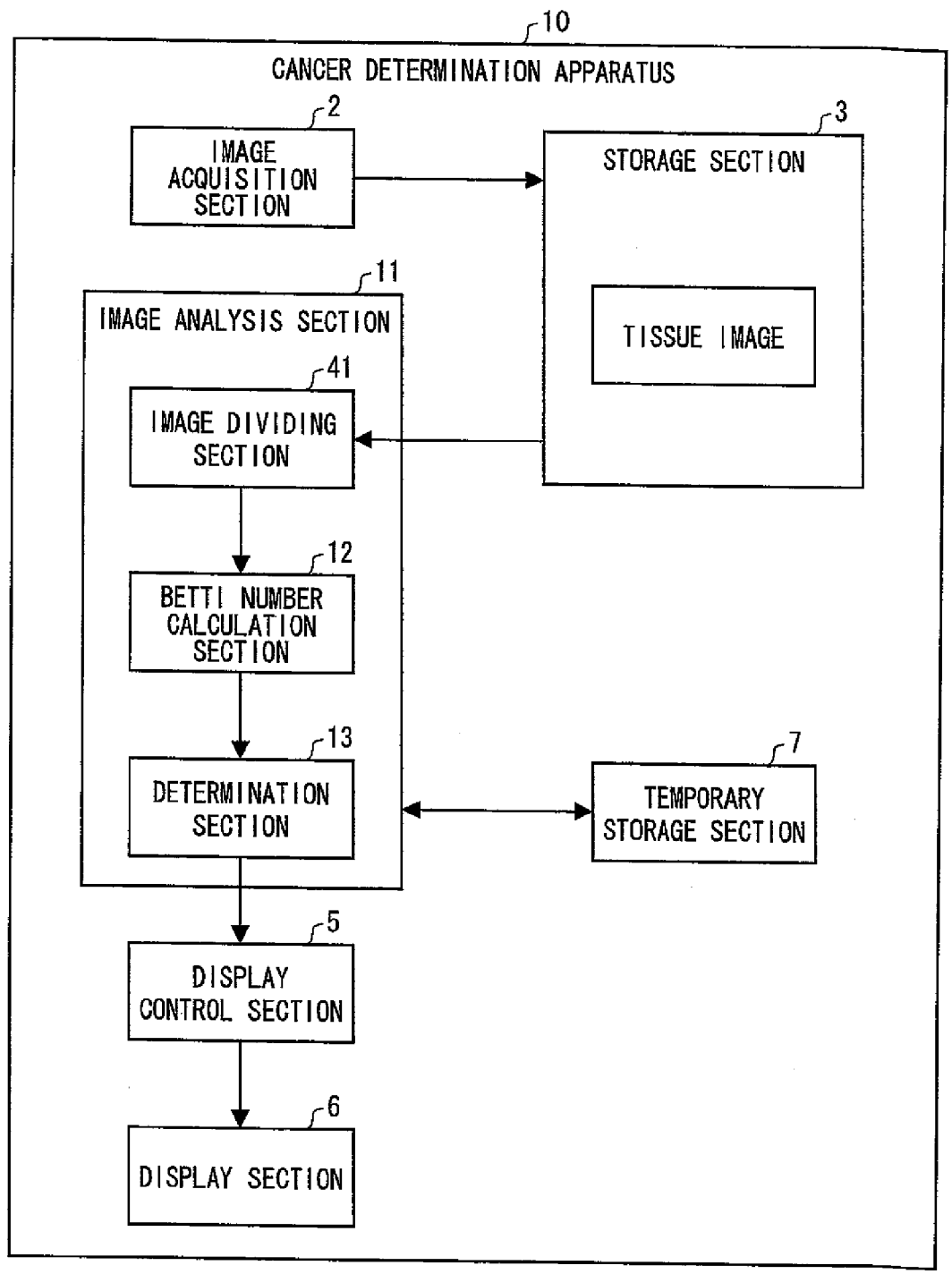

FIG. 9 is a view schematically illustrating a configuration of a cancer determination apparatus in accordance with Embodiment 2 of the present invention.

FIG. 10

Figure 10:
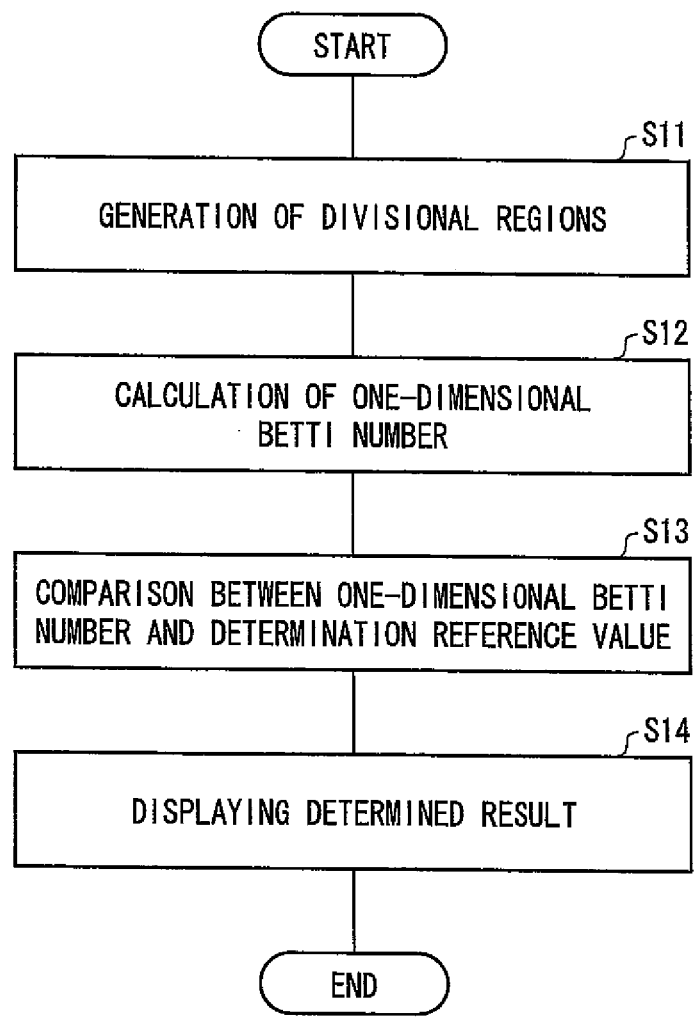

FIG. 10 is a flowchart showing how a process is carried out by the cancer determination apparatus in accordance with Embodiment 2 of the present invention.

FIG. 11

FIG. 11 is a view showing an example of a result of cancer determination, carried out by the cancer determination apparatus in accordance with Embodiment 1 of the present invention.

FIG. 12

Figure 12:
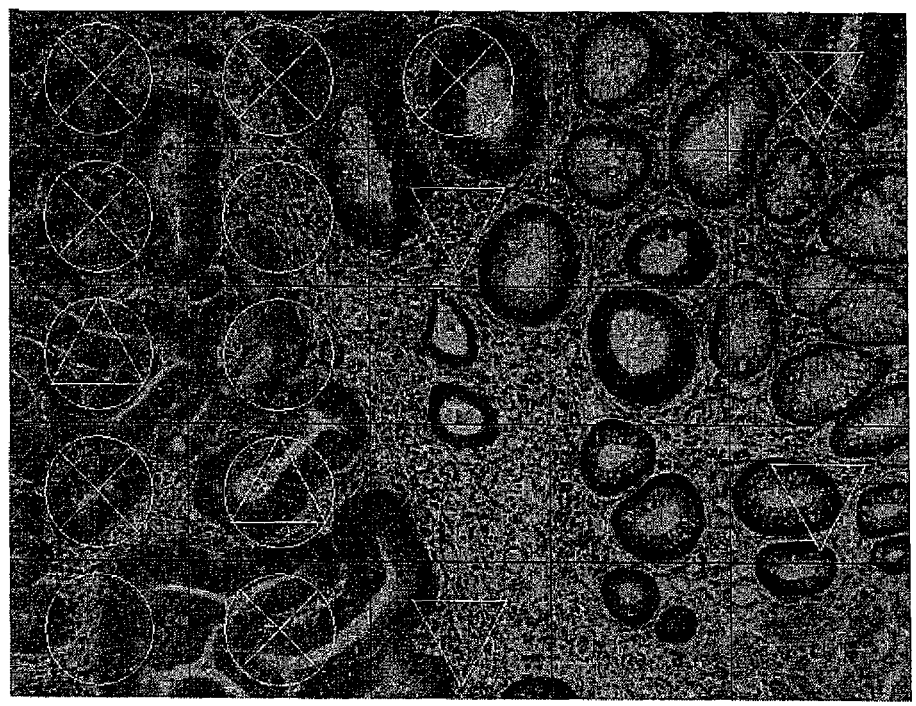

FIG. 12 is a view showing an example of a result of cancer determination, carried out by the cancer determination apparatus in accordance with Embodiment 2 of the present invention.

FIG. 13

(a) through (c) of FIG. 13 are views each showing a result of analysis of the tissue image shown in FIG. 12, which analysis was carried out by the cancer determination apparatus of the present invention.

FIG. 14

FIG. 14 is a view showing another tissue image, used in Analysis Result Example 2.

FIG. 15

(a) through (c) of FIG. 15 are views each showing a result of analysis of the tissue image shown in FIG. 14, which analysis was carried out by the cancer determination apparatus of the present invention.

FIG. 16

Figure 16:
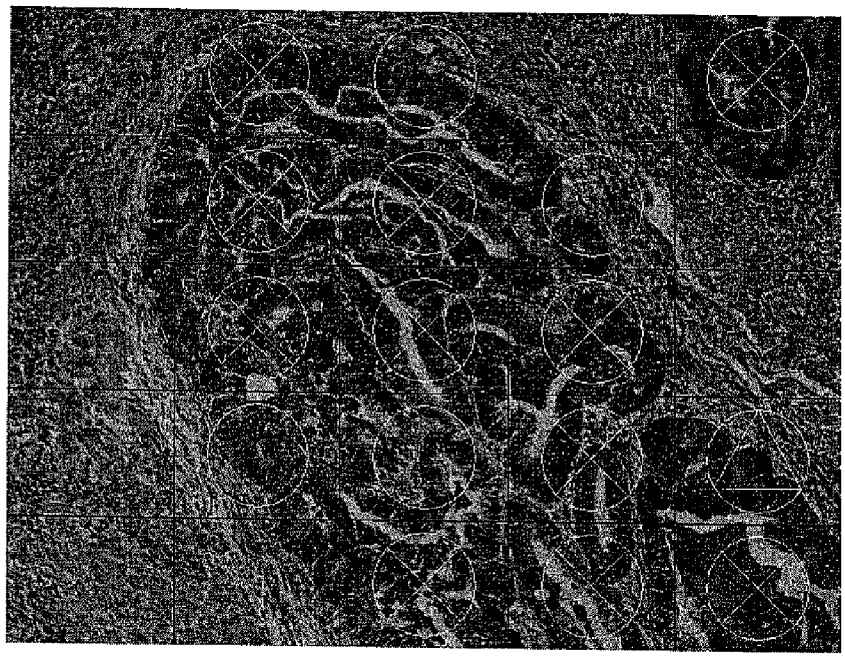

FIG. 16 is a view showing a tissue image, where a result of the determination carried out by the cancer determination apparatus of the present invention is shown.

FIG. 17

Figure 17:
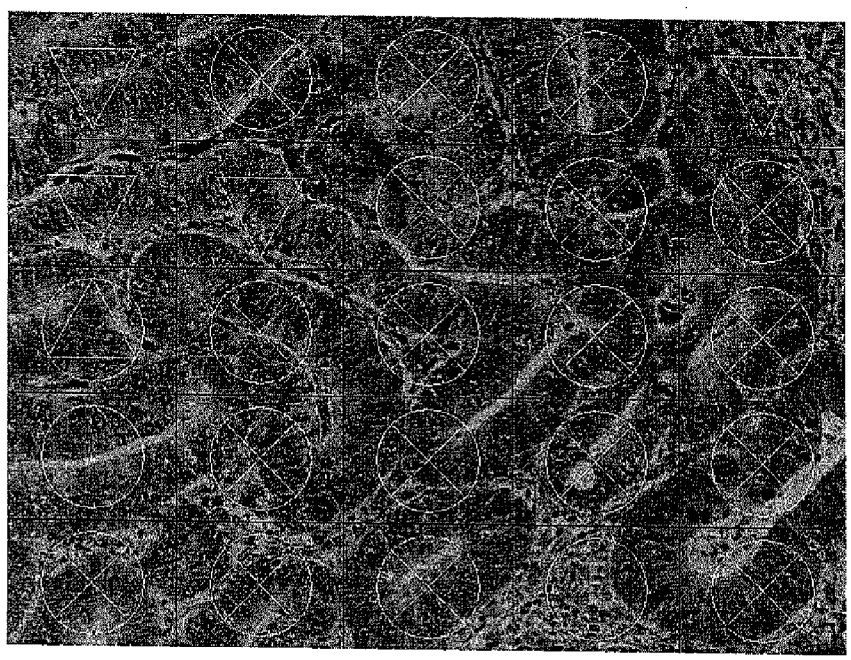

FIG. 17 is a view showing another tissue image, where a result of the determination carried out by the cancer determination apparatus of the present invention is shown.

FIG. 18

Figure 18:
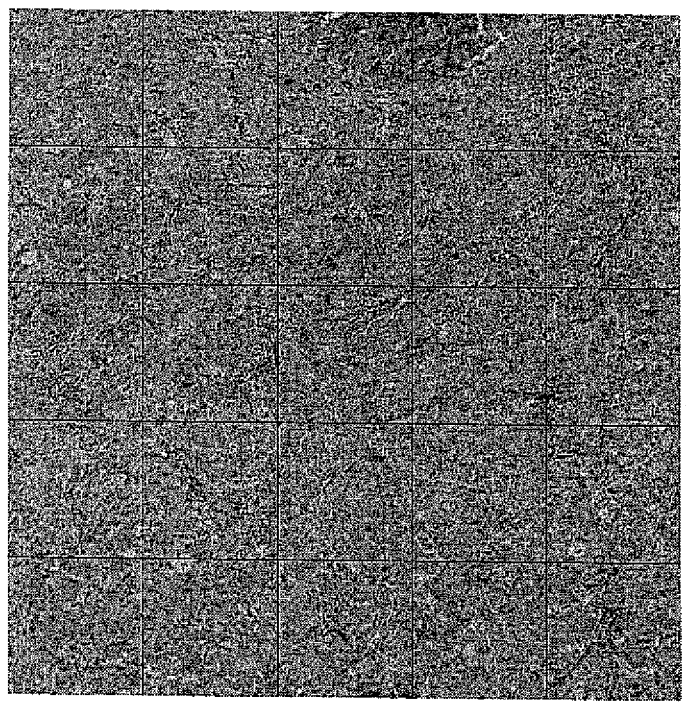

FIG. 18 is a view showing a tissue image used in Analysis Result Example 3 of the present invention.

FIG. 19

(a) through (c) of FIG. 19 are views each showing a result of analysis of the tissue image shown in FIG. 18, which analysis was carried out by the cancer determination apparatus of the present invention.

FIG. 20

Figure 20:
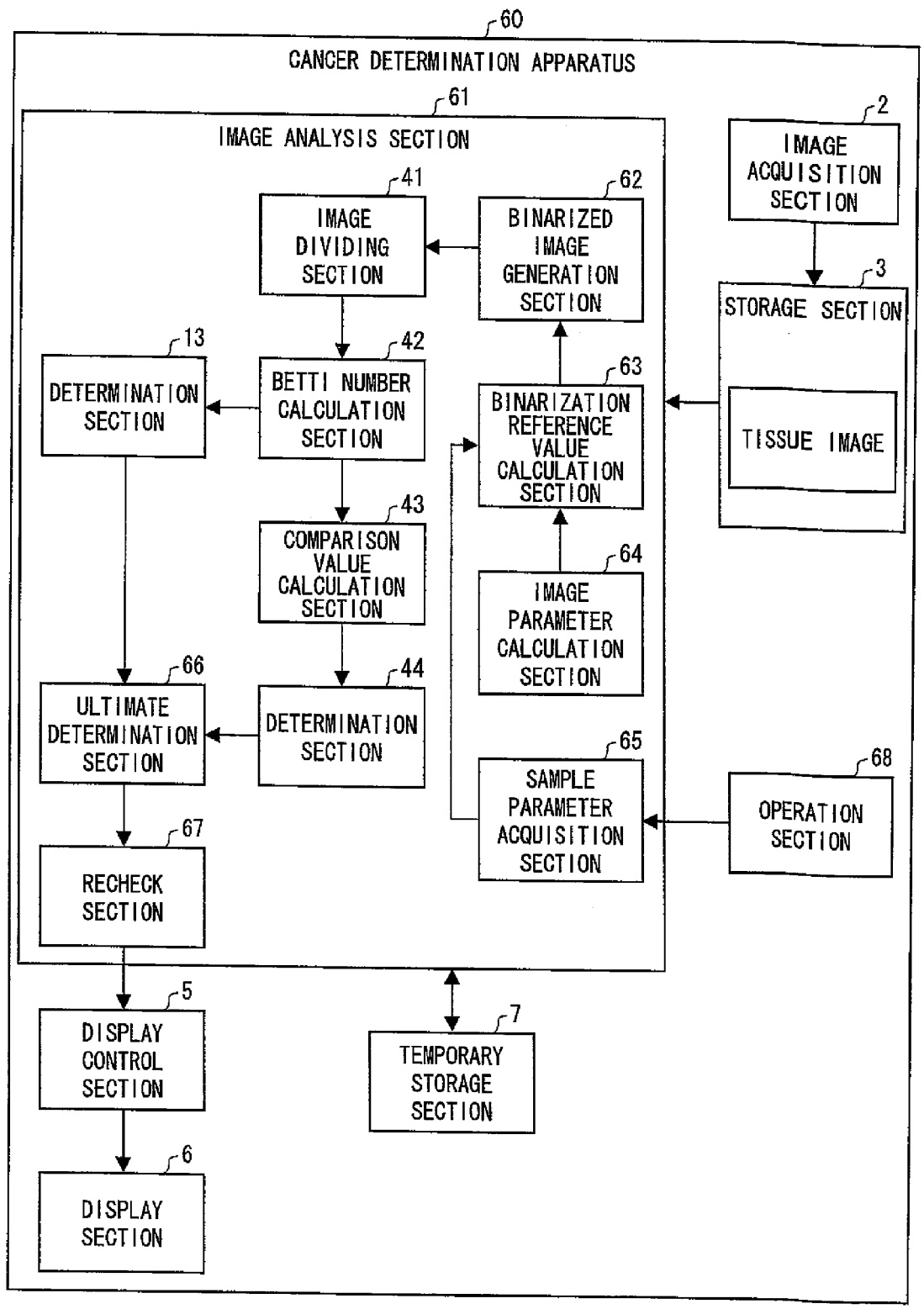

FIG. 20 is a view schematically illustrating a configuration of a cancer determination apparatus in accordance with Embodiment 3 of the present invention.

FIG. 21

FIG. 21 is a view schematically illustrating a configuration of a recheck section of the cancer determination apparatus.

FIG. 22

Figures 22, 23:
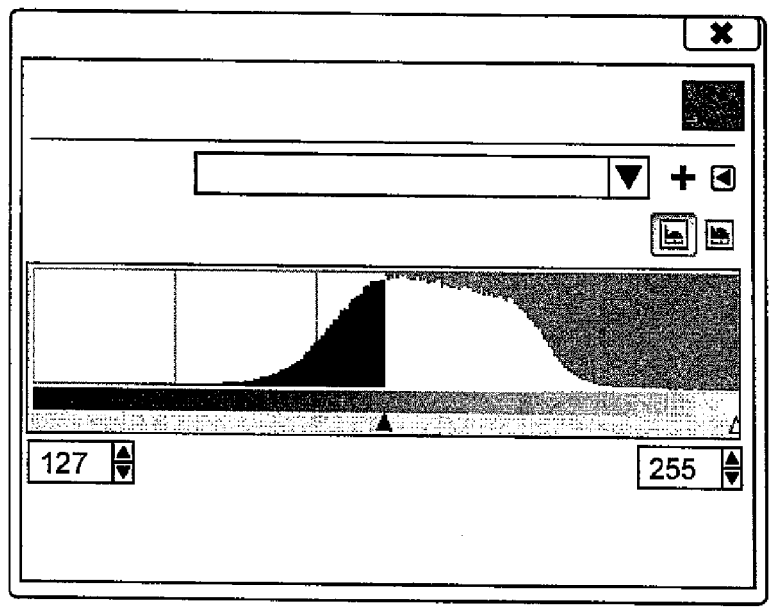

FIG. 22 is a view illustrating an example of how to calculate a pixel value of a first peak in an intensity distribution of pixel values.

FIG. 23

FIG. 23 is a view showing an example of how to calculate a binarization reference value.

FIG. 24

FIG. 24 is a flowchart showing an example of how a process is carried out by the cancer determination apparatus in accordance with Embodiment 3 of the present invention.

FIG. 25

FIG. 25 is a flowchart showing an example of how a process is carried out by the recheck section.

FIG. 26

FIG. 26 is a view showing an example of a result of cancer determination carried out by the cancer determination apparatus in accordance with Embodiment 3 of the present invention.

FIG. 27

FIG. 27 is a view showing an example of a result of cancer determination carried out by the cancer determination apparatus in accordance with Embodiment 3 of the present invention.

FIG. 28

FIG. 28 is a view showing an example of a result of cancer determination carried out by the cancer determination apparatus in accordance with Embodiment 3 of the present invention.

FIG. 29

FIG. 29 is a view showing an example of a result of cancer determination carried out by the cancer determination apparatus in accordance with Embodiment 3 of the present invention.

FIG. 30

FIG. 30 is a view showing an example of a result of cancer determination carried out by the cancer determination apparatus in accordance with Embodiment 3 of the present invention.

FIG. 31

FIG. 31 is a view showing an example of a result of cancer determination carried out by the cancer determination apparatus in accordance with Embodiment 3 of the present invention.

FIG. 32

FIG. 32 is a view showing an example of a result of cancer determination carried out by the cancer determination apparatus in accordance with Embodiment 3 of the present invention.

FIG. 33

Figure 33:
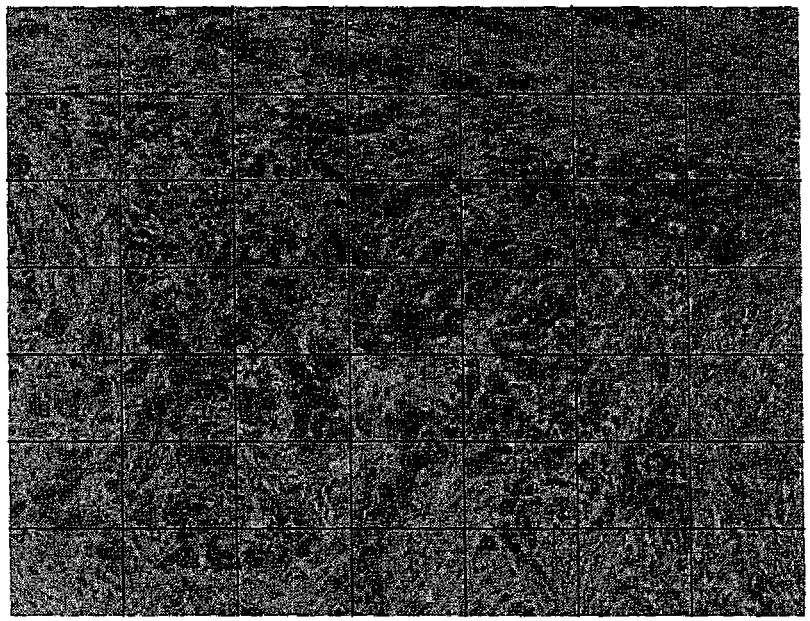

FIG. 33 is a view showing an example of a result of cancer determination carried out by the cancer determination apparatus in accordance with Embodiment 3 of the present invention.

FIG. 34

Figure 34:
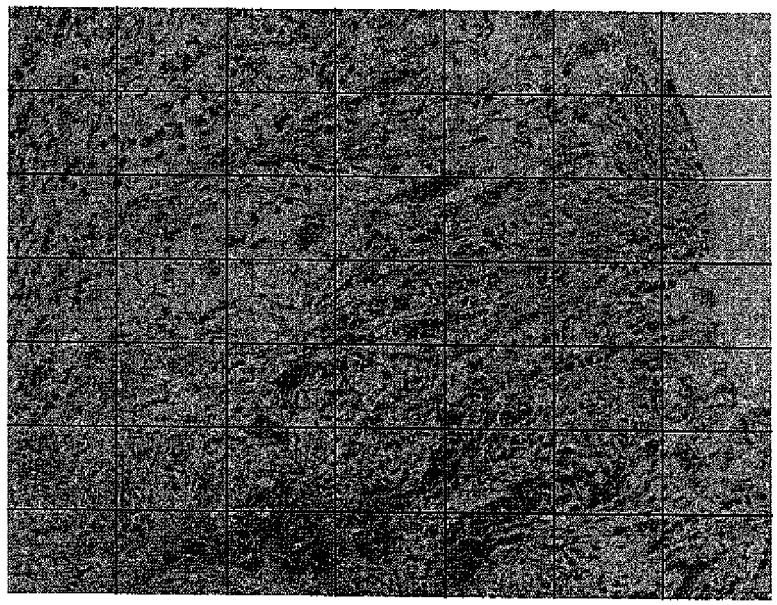

FIG. 34 is a view showing an example of a result of cancer determination carried out by the cancer determination apparatus in accordance with Embodiment 3 of the present invention.

FIG. 35

FIG. 35 is an example of a result of measurement of a size of a connected component in a corresponding divided region(s).

FIG. 36

Figure 36:
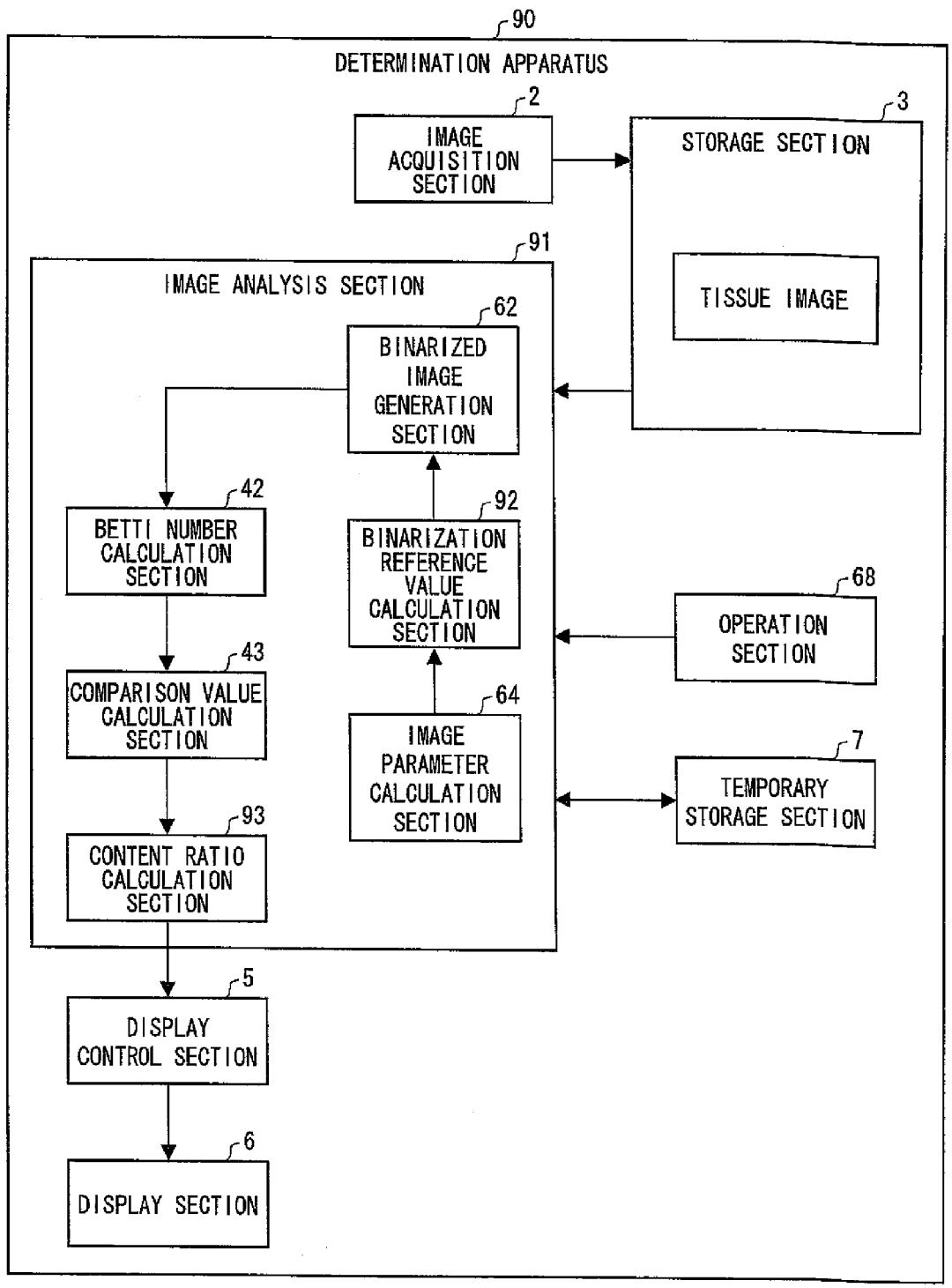

FIG. 36 is a view schematically illustrating a configuration of a determination apparatus in accordance with Embodiment 4 of the present invention.

FIG. 37

FIG. 37 is a flowchart showing an example of a process carried out by the determination apparatus in accordance with Embodiment 4 of the present invention.

FIG. 38

Figure 38:
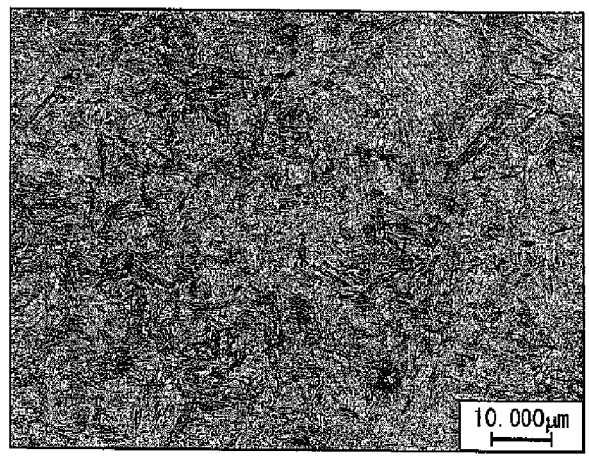

FIG. 38 is a view showing an example of a captured image of a martensite structure.

FIG. 39

Figure 39:
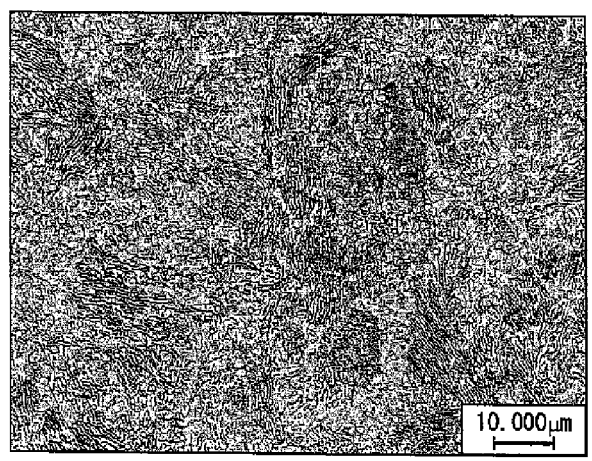

FIG. 39 is a view showing an example of a captured image of a pearlite structure.

FIG. 40

Figure 40:
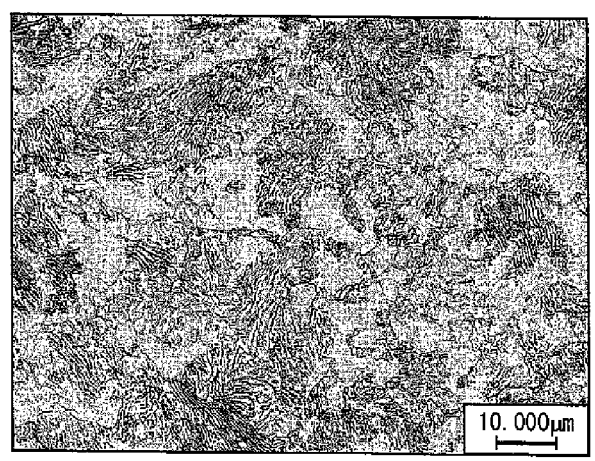

FIG. 40 is a view showing an example of a captured image of a ferrite structure.

FIG. 41

Figure 41:
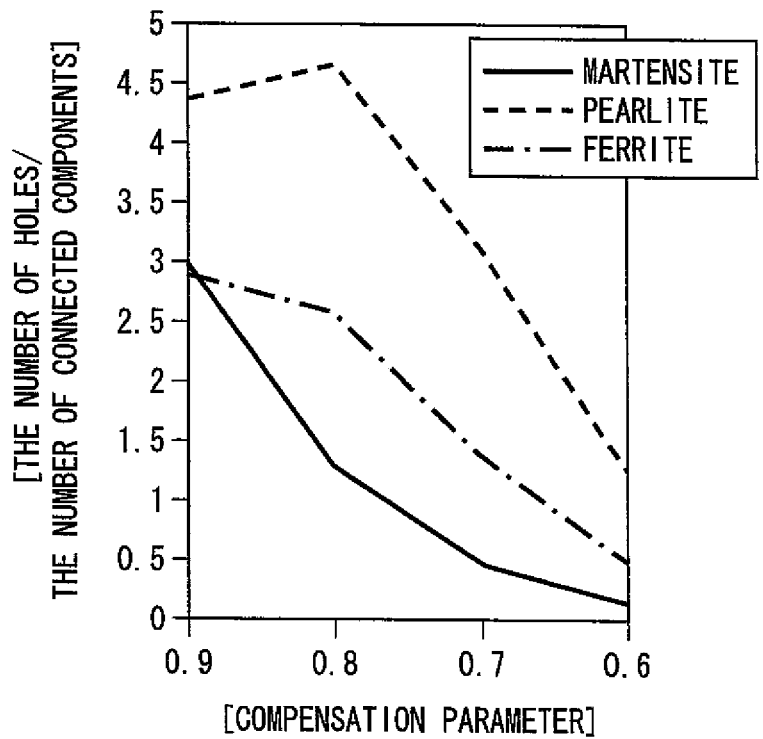

FIG. 41 is a view showing a result of calculation of a ratio between Betti numbers for each of images that have been obtained by binarizing the tissue images shown in FIGS. 38 through 40.

FIG. 42

Figure 42:
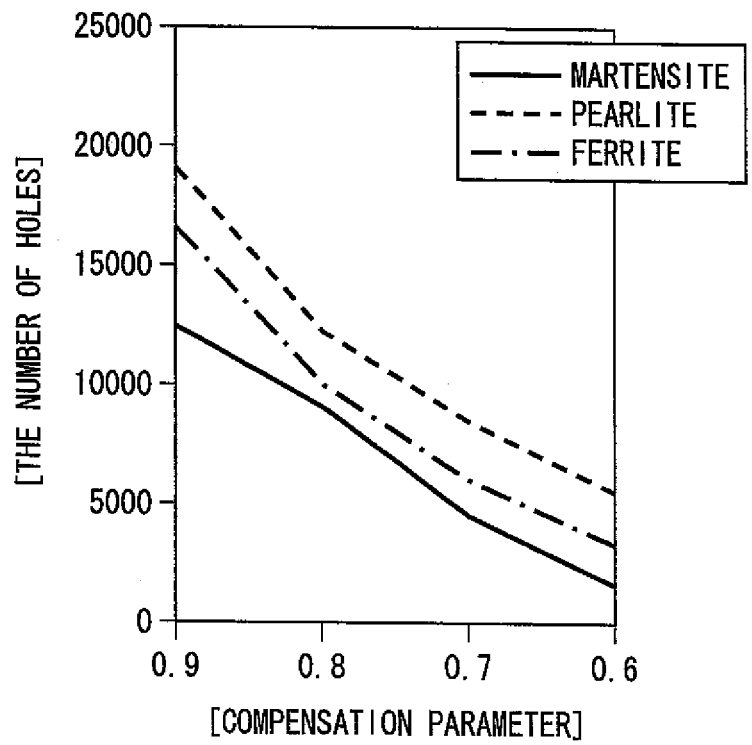

FIG. 42 is a view showing a result of calculation of the number of holes for each of images that have been obtained by binarizing the tissue images shown in FIGS. 38 through 40.

DESCRIPTION OF EMBODIMENTS

[Embodiment 1]

One embodiment of the present invention is described below with reference to FIGS. 1 through 8.

(Technical Idea of the Present Invention)

One of objects of the present invention is to analyze a captured image, in which a tissue is captured, so as to determine whether or not the tissue becomes cancerous. In order to attain the one of the objects, the inventors of the present invention have diligently studied whether or not they can determine whether a tissue becomes cancerous on the basis of changes in sizes of, shapes of, and/or a positional relationship of cells during a course of canceration. Note that the "tissue" intends, biologically, to mean a unit of structure in which a predetermined several types of cells congregate so as to form a certain pattern. Such a tissue plays a definite role as a whole.

<Morphological Change During the Course of Canceration>

The following description deals with how a normal tissue becomes cancerous. A normal cell is controlled at the gene level so as to grow or be divided only when the tissue requires a new cell. In general, when a cell dies or is damaged or defective, a new cell is generated and replaced with the cell.

However, if a specific gene has a mutation, the foregoing process of cell growth and cell division becomes out of order. This causes the cells to excessively grow and be divided. The excessive cells thus generated cause a mass of tissues called "tumor" or "neoplasm". Among others, a tumor of or a neoplasm of a malignant nature is called "cancer".

From a standpoint of morphological observation, a normal tissue turns into a cancer tissue through a plurality of stages. First, cell division is accelerated, so that cell proliferation occurs. This causes hyperplasia, in which the number of cells increases more than usual. Subsequently, dysplasia occurs, in which a tissue turns into an abnormal state morphologically which cannot be observed in a normal tissue. The dysplasia is classified into low-grade dysplasia and high-grade dysplasia. The high-grade dysplasia further proceeds and ultimately results in formation of a cancer tissue.

Meanwhile, biogenesis starts from a single fertilized egg. At first, no morphological difference and no functional difference are recognized. Then, each cell alters itself so as to have morph and function inherent in its tissue. This morphological and functional cellular alteration is called "differentiation". The cancer cell has characteristics of blastogenesis/dedifferentiation. Cancer is roughly classified into well-differentiated cancer and poorly-differentiated cancer, depending on a degree of the differentiation. The well-differentiated cancer keeps tissues that are morphologically similar to neighboring tissues, whereas the poorly-differentiated cancer does not keep such tissues.

<Mathematical Representation of Morphological Change>

The inventors of the present invention have attempted to, by broadly interpreting a homological concept, mathematically express such a morphological change of a tissue in the course of the canceration. The homology is a mathematical field in which characteristics of a graphic are converted into algebra so as to easily calculate a connection of graphics and the like. The inventors of the present invention have especially focused on a Betti number in the homology.

The Betti number is a topological pointer number that is related to only connection and separation between graphics, not related to a shape of a graphic. In a case where a q-th singular homology group is finitely generated, the q-th singular homology group can be classified into a direct sum of a free abelian group and a finite abelian group. A rank of the free abelian group is called "Betti number".

In a case of two dimension, the Betti number stands for a combination of (i) the number of connected components (zero-dimensional Betti number) and (ii) the number of spaces whose outer edges are defined by the connected components, i.e., the number of holes in the connected components (one-dimensional Betti number). Note here that the connected component stands for a graphic which allows any two different points to be connected to each other by a corresponding continuous line.

(a) of FIG. 2 illustrates four components indicated by respective signs of 21a through 24a. The components 21a through 24a constitute an aggregate, in which each of the components 21a through 24a has its physiological role, and is located in a region partitioned by boundaries. Note that there is a case where the three components 21a through 23a constitute a single cell.

The components 21a through 24a are different from one another in function. Therefore, they exist away from one another. Further, since their roles are identical to one another, each of them is expressed as a connected component constituted by a single component when they are binarized as their respective images. Further, it is considered that each of the components 21a through 24a has generally 1 "hole", which serves as a contact hole via which a corresponding component is in contact with the outside so as to carry out a corresponding function. Therefore, it appears that each of the components 21a through 24a is represented by the Betti numbers (1, 1). Accordingly, in the case of the tissue illustrated in (a) of FIG. 2, (i) the number of the connected components (the zero-dimensional Betti number is four (4) (because an outmost edge also serves as one (1) connected component) and (ii) the number of holes (holes indicated by respective reference numerals 25 through 28) (the dimensional Betti number), each being surrounded by a corresponding outer edge, is four (4). Therefore, a ratio of the number of the holes to the number of the connected components is one (1).

Note that the components 21a through 23a illustrated in (a) of FIG. 2 have the holes 25 through 27, respectively, so that each of them has a ring shape. A part forming the ring corresponds to each outer edge of a corresponding one of the components. In a case where the holes 25 through 27 do not exist, the two-dimensional Betti number of each of the components 21a through 23a is zero. In (a) of FIG. 2, the holes 25 through 27 are defined by circles in the respective components 21a through 23a. Note, however, that it is possible to regard each of the components 21a through 23a as a corresponding circle in a case of carrying out so-called continuous deformation by which a plane is made as thin as a line.

(b) of FIG. 2 illustrates four components 21b through 24b, and schematically shows that the four components 21b through 24b are combined with and pressed against one another due to the occurrence of the hyperplasia, so that the dysplasia has occurred. The components 21b through 24b are partially in contact with one another via their outer edges. This causes a single connected component having a continuous outer edge. Therefore, according to the tissue illustrated in (b) of FIG. 2, (i) the number of connected components (the zero-dimensional Betti number) is one (1) and (ii) the number of holes (holes indicated by respective signs 29 through 35) (the one-dimensional Betti number each surrounded by a corresponding one(s) of an outer edge(s) of the components is (7+a). The "a" stands for the number of additional holes each of which may be generated due to a smudge in a background (tumor diathesis) in a corresponding one of the components. Accordingly, the ratio of the number of holes to the number of the connected components is (7+a).

In calculation of the Betti numbers, an image derived from a boundary generated due to a smudge in a background is also recognized as one (1) component. Such an image is generally in contact with an outer edge of a component that includes such an image. Therefore, even if there is such an image, the number of the connected components is rarely increased.

Further, since every image is binarized, the image generated due to a smudge in the background is recognized as one (1) component (or a part of a connected component). Therefore, even if there is an image generated due to a smudge in the background, it is necessary to carry out the process for calculating a ratio of a one-dimensional Betti number to a zero-dimensional Betti number.

In a case of a differentiated cancer tissue, it is possible to determine whether or not an image of a cancer tissue is included in an image of a tissue by (i) calculating a one-dimensional Betti number and a zero-dimensional Betti number of the image of the tissue and (ii) comparing a ratio of the one-dimensional Betti number to the zero-dimensional Betti number with a predetermined reference value.

Meanwhile, in an image of a poorly-differentiated cancer tissue shown in FIG. 3, (i) no boundary is recognized between cell groups and (ii) only three cell nuclei (nuclei indicated by respective reference numerals 51 through 53) are scattered. Each of the three cell nuclei is considered as one (1) connected component. The three cell nuclei are away from one another, so that the number of connected components (the zero-dimensional Betti number) is three (3). Meanwhile, such cell nuclei are dyed to have a single color when they are dyed. As such, there is no space whose outer edge is any one of the cell nuclei. That is, the number of holes (the one-dimensional Betti number) is zero.

In this case, a ratio of the one-dimensional Betti number to the zero-dimensional Betti number is zero. In a case of a normal tissue, the ratio of the Betti numbers is vanishingly unlikely to be zero. Therefore, in a case where the ratio is zero or substantially equal to zero, it is possible to determine that a captured image contains an image of a poorly-differentiated cancer tissue.

In the above descriptions, the ratio of the one-dimensional Betti number to the zero-dimensional Betti number is used so as to digitize the fact that a difference between the zero-dimensional Betti number and the one-dimensional Betti number becomes greater during the course of a tissue becoming cancerous. Alternatively, it is possible to determine whether or not cancer is present by using, as an index, (i) a difference between a one-dimensional Betti number and a zero-dimensional Betti number or (ii) a value obtained by use of a function which indicates the above feature.

Further, it is possible to determine whether or not cancer is present by using, as a criterion which is independent of the value of the ratio of the one-dimensional Betti number to the zero-dimensional Betti number, only the one-dimensional Betti number (the number of holes). This will be later described in detail in Embodiment 2.

Furthermore, it is also possible to combine (i) the determination in which the ratio (or the value obtained by use of the function, such as a difference between the one-dimensional Betti number and the zero-dimensional Betti number) is used and (ii) the determination in which large or small of the value of the one-dimensional Betti number is merely used. In this case, it is possible to determine that the cancer is present in a case where at least one determination suggests the presence of cancer.

To put it simply, the present invention is made in an attempt to classify tissue structures by use of combinational invariant measurement method. The combinational invariant measurement method is a mathematical method for calculating a combinational invariant. In other words, according to the combinational invariant measurement method, (i) relationships between neighboring components of a tissue is cyclopaedically investigated, (ii) the relationships are organized by an algebraic operation so as to define invariants, and (iii) a classification of the tissue is carried out.

According to the present invention, homological indexes (invariants) such as the Betti numbers and the ratio between the Betti numbers are measured as the combinational invariants, and a tissue is classified on the basis of the measurement. It is possible to give the homology the status of one of the "combinational (topological) invariants".

(Configuration of Cancer Determination Apparatus 1)

Figure 1:
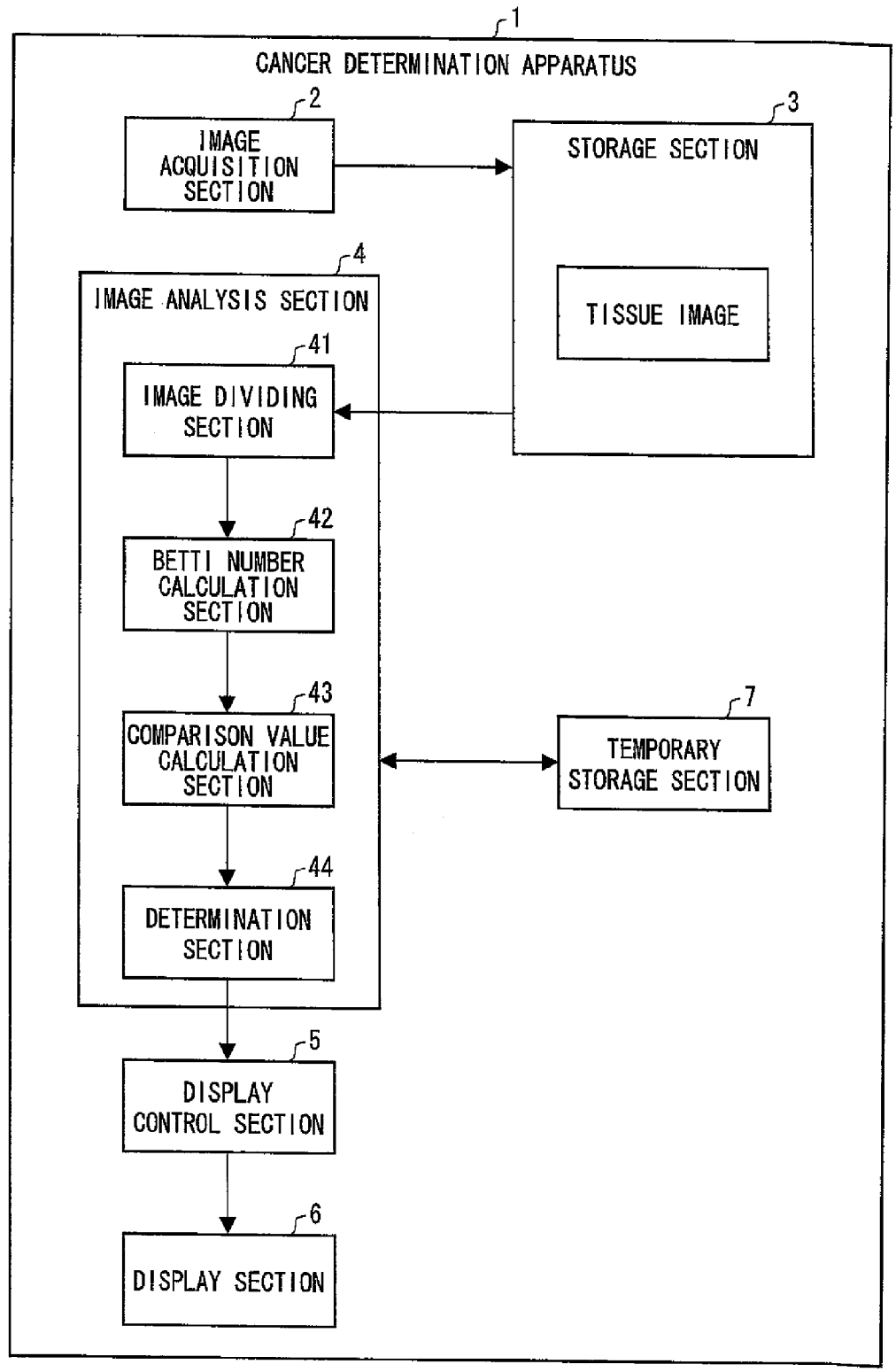
FIG. 1

FIG. 1 is a view schematically illustrating a configuration of a cancer determination apparatus (image analysis apparatus) 1. The cancer determination apparatus 1 includes an image acquisition section 2, a storage section 3, an image analysis section (image analysis apparatus) 4, a display control section 5, a display section 6, and a temporary storage section 7 (see FIG. 1).

The image acquisition section 2 acquires, from an external device (e.g., an image capturing device), an image in which a tissue is captured (hereinafter, referred to as "tissue image"), and stores the tissue image in the storage section 3. The tissue image is obtained by capturing a dyed tissue at an appropriate magnification. Note that magnifications described later are of an objective lens, and a magnification of an ocular lens is set to ×10. Accordingly, an actual magnification is obtained by multiplying a magnification of the objective lens by 10.

How to dye a tissue is not particularly limited, and therefore, for example, an HE (Hematoxylin-Eosin) dyeing method can be employed. According to the HE dyeing method, a cell nucleus and a cytoplasm are dyed. It is therefore possible to get the cell and a structure of the cell in perspective. If a dyed state of and subsequent management of a sample are appropriate, then the sample can be preserved permanently.

The storage section 3 stores, in addition to the tissue image obtained by the image acquisition section 2, (i) a control program for controlling various sections, (ii) an OS program, and (iii) an application program, each of which is executed by the image analysis section 4, and (iv) various data, which are read out when the programs are executed. The storage section 3 is constituted by a nonvolatile storage device such as a hard disk or a flash memory.

The temporary storage section 7 is used as a work area for temporarily storing data during a process of executing the programs. The temporary storage section 7 is constituted by a volatile storage device such as an RAM (Random Access Memory).

The display control section 5 controls the display section 6 to display data such as a determined result received from the image analysis section 4.

The display section 6 is a display device for displaying data such as a determined result received from the image analysis section 4. The display section 6 is a liquid crystal display, for example.

The cancer determination apparatus 1 includes an operation section (such as a mouse and a keyboard) via which a user enters an instruction. The operation section is not directly related to the features of the present invention. The description of the operation section is therefore omitted in FIG. 1.

(Configuration of Image Analysis Section 4)

The image analysis section 4 analyzes the tissue image acquired by the image acquisition section 2 so as to determine whether or not an image of a cancer tissue is included in the tissue image. The image analysis section 4 includes an image dividing section (image dividing means) 41, a Betti number calculation section (component and space number calculation means) 42, a comparison value calculation section (comparison value calculation means) 43, and a determination section (determination means) 44.

The image dividing section 41 divides the tissue image acquired by the image acquisition section 2 into a plurality of divided regions each having a predetermined size.

The Betti number calculation section 42 binarizes the tissue image by use of a prescribed reference value as a threshold. Then, in the tissue image thus binarized, the Betti number calculation section 42 calculates, for each of the plurality of divided regions generated by the image dividing section 41, (i) the number of connected components and (ii) the number of holes (spaces). Each of the connected components is an aggregate of at least one component which is defined by connecting an outer edge(s) of the at least one component which is a graphic having a closed outer edge. Each of the holes (spaces) is surrounded by an outer edge of a corresponding one of the at least one components or surrounded by outer edges of a plurality of the at least one components. Each of the holes is an opening part which has, as its outer edge, at least part of an outer edge(s) of the at least one components (in a case of a single component, a full outer edge of the single component). In other words, the holes encompass two types of holes, i.e., (i) a hole which is in one (1) component and (ii) a hole surrounded by outer edges of a plurality of components that are connected to each other (i.e., the plurality of components included in the connected component).

To put it mathematically, the Betti number calculation section 42 calculates a zero-dimensional Betti number of and a one-dimensional Betti number of the tissue image. The number of connected components corresponds to the zero-dimensional Betti number, while the number of holes corresponds to the one-dimensional Betti number.

Stated differently, the Betti number calculation section 42 calculates the number of connected components and the number of spaces by processing a captured image having a low resolution by use of a combinational invariant measurement method which is one of mathematical methods employing a homological concept.

An existing program such as a CHomP can be employed as the Betti number calculation section 42. The CHomP is freeware in compliance with a GNU (General Public License) and can be downloaded from its homepage (http://chomp.rutgers.edu/). Any programs can be employed instead of the CHomP, provided that the program can calculate the zero-dimensional Betti number and the one-dimensional Betti number from an image.

Further, the prescribed reference value (hereinafter, referred to as "binarization reference value") used in binarization of the tissue image should be stored in the storage section 3 in advance.

The binarization reference value plays an important role in detection of each outer edge of a corresponding component in the tissue image. A pixel whose luminance is greater than the binarization reference value displays white, whereas a pixel whose luminance is smaller than the binarization reference value displays black. Accordingly, if the binarization reference value is set too great, then the binarized tissue image will become a blackish image in which boundaries are excessively emphasized. On the other hand, if the binarization value is set too low, then the binarized tissue image will become a whitish image having few boundaries.

In view of the circumstances, it is necessary to appropriately set the binarization reference value so that each outer edge of components in the tissue image is appropriately detected. The binarization reference value can be changed in accordance with a degree to which the tissue is dyed. That is, it is possible to (i) set an internal standard for a sample of an analysis target and (ii) set the binarization reference value on the basis of the internal standard.

The comparison value calculation section 43 calculates a comparison value indicating a difference between the number of connected components and the number of spaces, both of which have been calculated by the Betti number calculation section 42. Specifically, the comparison value calculation section 43 calculates, as the comparison value, a ratio of the number of the spaces to the number of the connected components.

The determination section 44 compares (i) the comparison value calculated by the comparison value calculation section 43 with a predetermined value (hereinafter, referred to as "determination reference value") so as to determine, for each of the plurality divided regions, whether or not an image of a cancer tissue is included in the tissue image. The determination reference value is a reference value for statistically discriminating a comparison value obtained from a tissue having a cancer cell from a comparison value obtained from a normal tissue. The determination reference value is determined by a person skilled in the art appropriately. Note that it is possible to (i) set a plurality of determination reference values and (ii) control the determination section 44 to determine, in stages with the use of the plurality of determination reference values, whether or not an image of a cancer tissue is included in the tissue image.

(How Process is Carried Out by Cancer Determination Apparatus 1)

Next, the following description deals with an example of how a process is carried out by the cancer determination apparatus 1 with reference to FIG. 4. FIG. 4 is a flowchart showing an example of how the process is carried out by the cancer determination apparatus 1. Note here that the following descriptions are made on a premise that a tissue image has been stored in the storage section 3 in advance.

First, the image dividing section 41 obtains a tissue image from the storage section 3, and divides the tissue image into a plurality of divided regions each having a predetermined size (S1).

FIG. 5 is a view showing an example of a tissue image, and FIG. 6 is a view showing how the tissue image shown in FIG. 5 is divided into 5×5 divided regions. The tissue image has been captured at a magnification of ×10 (objective lens), for example (see FIG. 5). In the case of the tissue image captured at a magnification of ×10, the tissue image is divided into 5×5 divided regions, each of which has a size of 250 µm×200 µm, for example. Note that, in FIG. 6, a divided region having a cross mark (x) has been determined to include a cancer tissue.

The magnification at which the tissue image is captured is not limited to ×10, and therefore can be set appropriately by a person skilled in the art. (a) through (c) of FIG. 7 are views showing tissue images, which are captured at respective different magnifications. Specifically, (a) of FIG. 7 shows a tissue image captured at a magnification of ×10, (b) of FIG. 7 shows a tissue image captured at a magnification of ×20, and (c) of FIG. 7 shows a tissue image captured at a magnification of ×40 (objective lens). In the case of the tissue image captured at the magnification of ×20, the tissue image is divided into a plurality of divided regions each having a size of 125 µm×100 µm. In the case of the tissue image captured at the magnification of ×40, the tissue image is divided into a plurality of divided regions each having a size of 62.5 µm×50 µm. (a) of FIG. 7 shows a bar 71 which indicates a scale of 100 µm, (b) of FIG. 7 shows a bar 72 which indicates a scale of 100 µm, and (c) of FIG. 7 shows a bar 73 which indicates a scale of 50 µm.

Note that, in a case where the magnification at which the tissue image is captured is set too great or too small, it is likely that a normal tissue is erroneously determined to be a cancer tissue. It is therefore not clear whether a determination is appropriately made. In view of the circumstances, it is preferable to appropriately select a magnification in a range of approximately ×10 to ×20 (objective lens) to capture a tissue image. That is, the tissue image should be captured at an appropriate magnification so that each shape of a plurality of cells included in the tissue can be recognized.

The image dividing section 41 (i) associates, with a tissue image, region information which indicates the plurality of divided regions thus generated and (ii) supplies, to the Betti number calculation section 42, the region information with which the tissue image has been associated.

The Betti number calculation section 42, first, binarizes the tissue image. FIG. 8 is a view showing an example of a binarized tissue image. Image data expresses various graphics by determining a light intensity on each of a plurality of pixels (each having a minute square) (bit map method). The binarization is a process for (i) determining that the image data is recognized as black (recognized as 1 by a calculator) when the light intensity is not less than a predetermined value, whereas recognized as white (recognized as 0 by the calculator) when the light intensity is not more than the predetermined value. When this is expressed on graph paper (on a plane of coordinates), apexes of each square correspond to coordinates. It is possible to express a connected graphic in the binarized image as a combination of coordinates, in a case where connection or separation is determined based on whether any adjacent squares are recognized as identical values (1 or 0). If the connected graphic is expressed as such a combination of coordinates, then Betti numbers can be worked out by a method that has been generally used in a homological field.

The Betti number calculation section 42 calculates, for each of the plurality of divided regions indicated by the region information thus received, a zero-dimensional Betti number and a one-dimensional Betti number (S2). The Betti number calculation section 42 supplies, to the comparison value calculation section 43, the zero-dimensional Betti number and the one-dimensional Betti number which are thus obtained.

The comparison value calculation section 43 (i) calculates, for each of the plurality of divided regions, a ratio of a corresponding one-dimensional Betti number to a corresponding zero-dimensional Betti number, both of which have been received from the Betti number calculation section 42, (ii) associates a value of the ratio thus obtained with information for identifying the each of the plurality of divided regions, and (iii) supplies an associated value of the ratio to the determination section 44 (S3).

The determination section 44 compares, for each of the plurality of divided regions, the determination reference value with a corresponding value of the ratio received from the comparison value calculation section 43. The determination reference value can be (i) one (1) numeric value indicating a ratio of an upper limit value of or a lower limit value of a normal tissue or (ii) a pair of an upper limit value of and a lower limit value which indicate a range of ratios of a normal tissue.

In a case of determining whether or not a well-differentiated cancer tissue is present, an upper limit of a range for a normal tissue can be used as the determination reference value. On the other hand, in a case of determining whether or not a poorly-differentiated cancer tissue is present, a lower limit of a range for a normal tissue can be used as the determination reference value. Note that, in a case of determining whether or not a cancer tissue is present without distinguishing, in advance, between a well-differentiated cancer tissue and a poorly-differentiated cancer tissue, a pair of an upper limit value of and a lower limit value, which indicate a range of ratios of a normal tissue, can be used as the determination reference value.

In a case where the value of the ratio, received from the comparison value calculation section 43, is greater than the upper limit value or smaller than the lower limit value, the determination section 44 determines that an image of a cancer tissue is included in a divided region associated with the value of the ratio (S4). The determination section 44 supplies a determined result to the display control section 5.

The display control section 5 controls the display section 6 to display the determined result received from the determination section 44 (S5). A graphic (e.g., a cross mark (x)), which shows that an image of a cancer tissue is included in a divided region(s) of the tissue image, can be displayed as the determined result (see FIG. 6). Alternatively, a divided region, in which an image of a cancer tissue is included, can be displayed, as the determined result, in a color different from a divided region in which no image indicating a cancer tissue is included.

Alternatively, it is also possible for the display section 6 to display, as the determined result, Betti numbers and a ratio between the Betti numbers for a divided region which is clicked on. Alternatively, it is also possible for the display section 6 to display, as the determined result, a percentage of a divided region(s), which have been determined to have a cancer tissue(s), with respect to an entire tissue image.

(Effects of Cancer Determination Apparatus 1)
<Reduction of Work Load of Pathologist>
Currently, the absolute number of pathologists has been insufficient in view of the number of cases where the pathological diagnosis is required. For this reason, it is necessary for the pathologists to carry out a lot of diagnoses within a short time period. The cancer determination apparatus 1 can easily carry out a cancer diagnosis by use of a tissue image. Therefore, with the cancer determination apparatus 1, it is possible to significantly reduce pathologist's time and energy required for their cancer diagnoses at a current actual medical site. Accordingly, it becomes possible to reduce the number of human errors caused by a large amount of work for the small number of pathologists.

<Standardization of Determination>
According to the present invention, the determination of a cancer is made on the basis of Betti numbers, which are objective numeric values obtained by mathematical calculation. In the present circumstances, a problem has arisen that a result of diagnosis differs from hospital to hospital because the skill level of the pathologist differs from hospital to hospital. Such a problem can be addressed by standardization of criteria for the determination with the use of the present invention.

<Speed and Accuracy of Determination>
The cancer determination apparatus 1 can complete a cancer determination for one (1) tissue image within a time period of 0.5 second (used CPU: Intel Dual-Core 1.90 GHz). A conventional cancer determination apparatus takes a long time (e.g., 5-6 hours) to complete a cancer diagnosis because it (i) carries out analysis in a three-dimensional manner by use of a lot of images and (ii) carries out pattern recognition with respect to the lot of images and a typical example. According to the present invention, such a conventional problem can be solved.

Further, the present invention is hard to overlook the presence of cancer. This is because the present invention comprehends essential features of cancer. That is, according to the present invention, (i) individual characteristics of components in a body tissue are eliminated by causing the tissue image to have a low resolution (e.g., binarization) and (ii) a state of connection/separation between the components, particularly, a state in which surrounding cells are pressed by disorderly-proliferated cells, is extracted as numeric values. The pressing of the above cells itself is the essential feature of cancer, and the present invention comprehends the essential feature.

For this reasons, the present invention is higher in determination accuracy than conventional techniques. In fact, no false negative (overlooking) of presence of cancer was seen through actual 80 cases for each of which the present invention carried out the determination.

MODIFIED EXAMPLE

In a modified example of the present invention, (i) the comparison value calculation section 43 calculates a difference between the zero-dimensional Betti number and the one-dimensional Betti number and (ii) the determination section 44 (a) compares a value of the calculated difference with a determination reference value and (b), in a case where the value of the difference is greater than the determination reference value, determines that an image of a cancer tissue is included in a divided region which is associated with the value of the difference. Note, however, that the foregoing determination employing the value of the ratio between the Betti numbers is higher in accuracy than the determination employing the value of the difference between the Betti numbers.

Further, the Betti number calculation section 42 can calculate Betti numbers of an entire tissue image. In this case, the process carried out by the image dividing section 41 is unnecessary. In a case where an image of cancer is scattered across the tissue image, it is possible to carry out the cancer determination with high accuracy even when calculating the Betti numbers of the entire tissue image.

Furthermore, the determination section 44 can determine, in a case where the ratio of the one-dimensional Betti number to the zero-dimensional Betti number is zero or substantially equal to zero (i.e., in a case where a value of the ratio is less than a predetermined reference value), that an image of a poorly-differentiated cancer tissue is included in a divided region from which the ratio has been calculated.

[Embodiment 2]
Another embodiment of the present invention is described below with reference to FIGS. 9 and 10. Note that members identical with the members described in Embodiment 1 have the same reference numerals as those in Embodiment 1, and their explanations are omitted here for convenience.

(Technical Idea of the Present Invention)

As early described, a difference between a zero-dimensional Betti number and a one-dimensional Betti number becomes greater during the course of a cell becoming cancerous. The inventors of the present invention found that this phenomenon was accompanied by a significant increase or a significant reduction in the one-dimensional Betti number, and therefore cancer determination could be carried out on the basis of a change in the one-dimensional Betti number. The present embodiment is based on this technical idea.

FIG. 9 is a view schematically illustrating a configuration of a cancer determination apparatus (image analysis apparatus) 10 of the present embodiment. Unlike the cancer determination apparatus 1, the cancer determination apparatus 10 includes an image analysis section (image analysis apparatus) 11 (see FIG. 9). The image analysis section 11 carries out cancer determination on the basis of a result of a comparison between the number of holes (i.e., a one-dimensional Betti number) and a determination reference value.

(Configuration of Image Analysis Section 11)

The image analysis section 11 includes an image dividing section (image dividing means) 41, a Betti number calculation section (component and space number calculation means) 12, and a determination section (determination means) 13.

The Betti number calculation section 12 binarizes a tissue image by use of a prescribed reference value as a threshold, which tissue image has been acquired by an image acquisition section 2. In the tissue image thus binarized, the Betti number calculation section 12 calculates, for each of a plurality of divided regions, generated by an image dividing section 41, the number of spaces (holes). Each of the holes is surrounded by an outer edge(s) of at least one components which is graphic having a closed outer edge. To put it mathematically, the Betti number calculation section 12 calculates a one-dimensional Betti number for each of the plurality of divided regions into which the tissue image has been divided.

Stated differently, the Betti number calculation section 12 calculates the number of spaces by processing a captured image having a low resolution by use of a combinational invariant measurement method, which is one of mathematical methods employing a homological concept.

The determination section 13 compares the one-dimensional Betti number calculated by the Betti number calculation section 12 with a predetermined reference value (hereinafter, referred to as "determination reference value") so as to determine whether or not an image of a cancer tissue is included in a corresponding one of the plurality of divided regions. The determination reference value is a reference value for statistically discriminating a one-dimensional Betti number obtained from a tissue including a cancer tissue from a one-dimensional Betti number obtained from a normal tissue. The determination reference value can be set appropriately by a person skilled in the art. Note here that the determination reference value is an upper limit and a lower limit which indicate a range of one-dimensional Betti numbers of a normal tissue.

That is, in a case where the one-dimensional Betti number calculated by the Betti number calculation section 12 is out of the range indicated by the determination reference value, the determination section 13 determines that an image of a cancer tissue is included in a divided region from which the one-dimensional Betti number has been calculated.

Note that it is possible to (i) set a plurality of determination reference values and cause the determination section 13 to determine, in stages, with the use of the plurality of determination reference values, whether or not an image of a cancer tissue is included in the tissue image.

(How Process is Carried Out by Cancer Determination Apparatus 10)

Next, the following description deals with an example of how a process is carried out by the cancer determination apparatus 10 with reference to FIG. 10. FIG. 10 is a flowchart showing an example of how the process is carried out by the cancer determination apparatus 10. Note here that the following descriptions are made on a premise that the tissue image has been stored in a storage section 3.

First, the image dividing section 41 (i) obtains the tissue image from the storage section 3 and (ii) divides the tissue image into a plurality of divided regions each having a predetermined size (S11). The image dividing section 41 (i) associates, with the tissue image, region information indicating the plurality of divided regions thus generated and (ii) supplies, to the Betti number calculation section 12, the region information with which the tissue image has been associated.

The Betti number calculation section 12 calculates, for each of the plurality of divided regions indicated by the region information thus received, a one-dimensional Betti number (S12). More specifically, the Betti number calculation section 12, first, binarizes the tissue image by using a binarization reference value as a threshold, and then calculates a one-dimensional Betti number for each of the plurality of divided regions of the tissue image thus binarized. The Betti number calculation section 12 supplies the one-dimensional Betti number thus obtained to the determination section 13.

In a case where the one-dimensional Betti number received from the Betti number calculation section 12 is out of the range indicated by the determination reference value, the determination section 13 determines that an image of a cancer tissue is included in a divided region associated with the one-dimensional Betti number (S13). The determination section 13 supplies a determined result to a display control section 5.

The display control section 5 controls a display section 6 to display the determined result received from the determination section 13 (S14).

Note that, in a case of a differentiated cancer tissue, the one-dimensional Betti number becomes greater than the determination reference value, whereas, in a case of a poorly-differentiated cancer tissue, the one-dimensional Betti number becomes less than the determination reference value. In other words, the determination reference value should be set so that (i), in the case of the differentiated cancer tissue, the one-dimensional Betti number becomes greater than the determination reference value and (ii), in the case of the poorly-differentiated cancer tissue, the one-dimensional Betti number becomes less than the determination reference value. By taking advantage of this characteristic, it is possible to arrange the display section 6 to display a determined result indicating whether an image of a differentiated cancer tissue or an image of a poorly-differentiated cancer tissue is included in the tissue image.

(Effects of Cancer Determination Apparatus 10)

As described above, the cancer determination apparatus 10 carries out cancer determination on the basis of a one-dimensional Betti number (the number of holes) calculated from a tissue image. Therefore, it is possible to carry out cancer determination with a smaller processing amount than that of the cancer determination apparatus 1 which calculates a ratio of a one-dimensional Betti number to a zero-dimensional Betti number.

Further, according to the cancer determination apparatus 10, it is possible to determine, with high accuracy, whether or not an image of a differentiated cancer tissue or an image of a poorly-differentiated cancer tissue is included in a tissue image.

Analysis Result Example 1

Example 1 describes an example of a result of cancer determination by use of a cancer determination apparatus 1. As a sample, a large-intestinal tissue including a cancer cell was obtained with consent of a patient. The large-intestinal tissue was subjected to HE dyeing so as to prepare a microscopic specimen. The HE dyeing was carried out, with a commercially-available reagent, in accordance with a general protocol.

The microscopic specimen thus prepared was observed with a microscope at a magnification of ×10 so as to obtain a tissue image. FIG. 5 shows an example of a tissue image thus obtained.

The cancer determination was made with respect to the tissue image by use of the cancer determination apparatus 1. A binarization reference value, used in binarization of the tissue image, was set to 100. FIG. 11 shows an example of determined results. In a table shown in FIG. 11, a tissue image number, the number of connected components in the tissue image (a zero-dimensional Betti number), the number of holes in the tissue image (a one-dimensional Betti number), and a ratio of the number of holes to the number of connected components (comparison value) are shown in this order from the left side to the right side. Note that, according to the present example, the process for dividing the tissue image was not carried out, and Betti numbers were calculated from the entire tissue image.

The table of FIG. 11 shows determined results classified into first through third groups. The first group is related to normal tissues, the second group is related to tissues most of which are cancer tissues, and the third group is related to tissues in which normal tissues and cancer tissues coexist.

As is clear from the table, each of the tissue images in the first group has (i) a ratio of 1.5 or less and (ii) 2000 holes or less, whereas each of the tissue images in the second group has at least one of (i) a ratio of more than 1.5 and (ii) more than 2000 holes.

These determined results show that cancer determination can be appropriately carried out by using, as an index, (i) the ratio of the one-dimensional Betti number to the zero-dimensional Betti number or (ii) only the one-dimensional Betti number, without dividing the tissue image, provided that normal tissues and cancer tissues do not coexist in the tissue image.

Analysis Result Example 2

The third group is an example in which normal tissues and cancer tissues coexist in the tissue image. Here, the following description deals with (i) an example of determined results obtained when cancer determination was made by use of cancer determination apparatus 1 after a tissue image was divided into a plurality of divided regions by the image dividing section 41 and (ii) an example of determined results obtained when cancer determination was made by use of a cancer determination apparatus 10 after a tissue image was divided into a plurality of divided regions by the image dividing section 41.

FIG. 12 is a view showing a tissue image used in the present analysis result example. The tissue image includes an image of a differentiated cancer tissue. As shown in FIG. 12, the tissue image was divided into 5×5 divided regions by the image dividing section 41.

(a) through (c) of FIG. 13 show results of analysis of the tissue image shown in FIG. 12, which analysis was carried out by use of the cancer determination apparatuses 1 or 10. (a) of FIG. 13 shows the number of connected components for each of the plurality of divided regions (zero-dimensional Betti number). The zero-dimensional Betti numbers in a table shown in (a) of FIG. 13 correspond to the respective plurality of divided regions shown in FIG. 12. (b) of FIG. 13 shows the number of holes for each of the plurality of divided regions (one-dimensional Betti number). The one-dimensional Betti numbers in a table shown in (b) of FIG. 13 correspond to the respective plurality of divided regions shown in FIG. 12. Note, however, that each of values in the table shown in (b) of FIG. 13 is obtained by multiplying a corresponding actual value by 25 (the number of the plurality of divided regions). (c) of FIG. 13 shows a ratio of the number of holes to the number of connected components for each of the plurality of divided regions. That is, each of numerical values in a table shown in (c) of FIG. 13 was obtained by (i) dividing a corresponding one of the values shown in (b) of FIG. 13 by 25 and (ii) dividing a resultant value by a corresponding one of the values shown in (a) of FIG. 13.

In a case where a ratio, shown in (c) of FIG. 13, is more than 0.5 but not more than 1.4, a determination section 44 of the cancer determination apparatus 1 determines that a corresponding divided region indicates a normal tissue. In a case where a ratio shown in FIG. 13 is more than 1.4 but less than 1.7, the determination section 44 of the cancer determination apparatus 1 determines that a corresponding divided region indicates a neutral state between a normal tissue and a cancer tissue. In a case where a ratio shown in (c) of FIG. 13 is not less than 1.7, the determination section 44 of the cancer determination apparatus 1 determines that an image of a cancer tissue is included in a corresponding divided region. Note that a binarization reference value, used in binarization of the tissue image, was set to 105 (100 for the tissue image of 7009).

Further, in a case where a value obtained by dividing the number of holes shown in (b) of FIG. 13 by 25 is not more than 2000, a determination section 13 of the cancer determination apparatus 10 determines that a corresponding divided region indicates a normal tissue. In a case where such a value is more than 2000 but less than 2400, the determination section 13 determines that a corresponding divided region indicates a neutral state between a normal tissue and a cancer tissue. In a case where such a value is not less than 2400, the determination section 13 determines that an image of a cancer tissue is included in a corresponding divided region.

Each determined result is shown, for a corresponding one of the plurality of divided regions, in FIG. 12 by a circle mark (○) (normal), a triangle mark (Δ) (or an inverted triangle mark) (neutral), or a cross mark (X) (cancer). The triangle mark (Δ) (or an inverted triangle mark) shows that a corresponding tissue image indicates a neutral state between a normal tissue and a cancer tissue. Among these, the triangle mark (Δ) shows a result obtained by the determination section 44 (the result of the determination employing the ratio of the Betti numbers), while the inverted triangle mark shows a result obtained by the determination section 13 (the result of the determination employing the number of the holes).

Since a tissue image is divided into a plurality of divided regions, it becomes possible to make a determination with respect to, separately, (i) a region where a cancer tissue is included and (ii) a region where no cancer tissue is included. Therefore, it is possible to improve accuracy of the cancer determination.

FIG. 14 and (a) through (c) of FIG. 15 show determined results for another tissue image in a similar manner. FIG. 14 shows a tissue image including a differentiated cancer tissue. (a) of FIG. 15 shows the number of connected components (zero-dimensional Betti numbers) for each of a plurality of divided regions of the tissue image shown in FIG. 14, (b) of FIG. 15 shows the number of holes (one-dimensional Betti numbers) for each of the plurality of divided regions, and (c) of FIG. 15 shows a ratio of the number of holes to the number of connected components for each of the plurality of divided regions. Note that each of the numerical values shown in (b) of FIG. 15 was also obtained by multiplying, by 25, the number of holes in a corresponding one of the plurality of divided regions.

Further, FIG. 16 shows a determined result of a further tissue image to which a similar determination is made, and FIG. 17 shows a determined result of still a further tissue image to which a similar determination is made.

As is clear from the analysis results, accuracy of the cancer determination is improved by dividing a tissue image into a plurality of divided regions.

Analysis Result Example 3

The present example describes a result of determination made by use of a cancer determination apparatus 10. The determination was made with respect to a tissue image including an image of a poorly-differentiated cancer tissue.

FIG. 18 and (a) through (c) of FIG. 19 show determined results of the tissue image. The tissue image shown in FIG. 18 includes an image of a poorly-differentiated cancer tissue, and is divided into 25 divided regions. (a) of FIG. 19 shows the number of connected components (zero-dimensional Betti number) for each of the 25 divided regions, (b) of FIG. 19 shows the number of holes (one-dimensional Betti number) for each of the 25 divided regions, and (c) of FIG. 19 shows a ratio of the number of holes to the number of connected components for each of the divided regions. Note that each of the numeric values shown in (b) of FIG. 19 was obtained by multiplying, by 25, the number of holes in a corresponding one of the plurality of the divided regions, and a binarization reference value, used in binarization of the tissue image, was set to 105.

A determination reference value, employed by a determination section 13 of the cancer determination apparatus 10, was set so that in a case where a value obtained by dividing the number of holes shown in (b) of FIG. 19 by 25 is less than 5, it is determined that an image of a cancer tissue is included in a corresponding one of the 25 divided regions.

The cancer determination apparatus 10 outputted such a determined result of an image of a poorly-differentiated cancer tissue being included in each of the 25 divided regions. This is a reasonable determined result, as compared with that of the tissue image shown in FIG. 18.

[Embodiment 3]

A further embodiment of the present invention is described below with reference to FIGS. 20 through 23. Note that members identical with those in Embodiments 1 and 2 have identical reference numerals with those in Embodiments 1 and 2, and their descriptions are omitted here for convenience.

FIG. 20 is a view schematically illustrating a configuration of a cancer determination apparatus (image analysis apparatus) 60 of the present embodiment. Unlike the cancer determination apparatuses 1 and 10, the cancer determination apparatus 60 includes an image analysis section (image analysis apparatus) 61 and an operation section 68 (see FIG. 20).

The image analysis section 61 includes a binarized image generation section 62, a binarization reference value calculation section 63, an image parameter calculation section 64, and a sample parameter acquisition section 65. The image analysis section 61 binarizes a tissue image by using these sections. The image analysis section 61 further includes an image dividing section 41, a Betti number calculation section 42, a comparison value calculation section 43, a determination section 13, a determination section 44, an ultimate determination section 66, and a recheck section 67.

According to the present embodiment, the determination section 13 compares a one-dimensional Betti number calculated by the Betti number calculation section 42 with a predetermined reference value (determination reference value) so as to determine whether or not an image of a cancer tissue is included in a corresponding one of a plurality of divided regions.

The sample parameter acquisition section 65 (i) acquires a sample parameter entered by a user via the operation section 68 and (ii) supplies the acquired sample parameter to the binarization reference value calculation section 63. The sample parameter is a parameter for correcting a difference in color of tissue images which reflects the color that is different from sample to sample. For example, the sample parameter is a value which is calculated for each image of a plurality of dyed tissues so as to correct (i) differences in dyed degree between the plurality of tissues which have been dyed separately and independently and (ii) differences in thickness between the plurality of tissues. How to calculate the sample parameter will be described later.

The image parameter calculation section 64 carries out image processing with respect to each of a plurality of tissue images so as to calculate an image parameter. A balance of components of a tissue in a tissue image (a large area of a blank(s), a large area of an interstitial layer(s), or the like) differs from tissue image to tissue image. The image parameters are values for correcting such differences in compositions of tissues included in tissue images between the plurality of tissue images. Each image parameter is calculated for a corresponding one of the tissue images, and is a value indicating a pixel value (luminance value) which is employed by the largest number of pixels in a corresponding one of the plurality of tissue images.

More specifically, the image parameter is a pixel value of pixels which belong to a pixel aggregate which includes the largest number of pixels, in a case where the plurality of pixels in a tissue image are classified into a plurality of pixel aggregates each of which includes pixels having identical pixel values. That is, the image parameter is a pixel value employed by the largest number of pixels in an intensity distribution of pixel values of the tissue image. How to calculate the image parameter will be described later.

The binarization reference value calculation section 63 calculates a binarization reference value (binarization parameter) by multiplying a sample parameter, calculated by the sample parameter acquisition section 65, by the image parameter calculated by the image parameter section 64. The binarization reference value calculation section 63 supplies the binarization reference value to the binarization image generation section 62.

The binarized image generation section 62 (i) binarizes a tissue image, stored in a storage section 3, by use of a binarization reference value calculated by the binarization reference value section 63 and (ii) supplies a binarized tissue image to the image dividing section 41.

The image dividing section 41, the Betti number calculation section 42, the comparison value calculation section 43, and the determination section 44 are basically identical with those in the cancer determination apparatus 1. Further, the Betti number calculation section 12 and the determination section 13 are basically identical with those in the cancer determination apparatus 10.

Note, however, that, according to the present embodiment, the image dividing section 41 divides a binarized image generated by the binarized image generation section 62 into a plurality of divided regions each having a predetermined size. According to the present embodiment, neither the Betti number calculation section 42 nor the Betti number calculation section 12 carries out a binarization process with respect to a tissue image. According to the present embodiment, the determination sections 44 and 13 supply their determined results, obtained in stages, to the ultimate determination section 66.

By use of a determined result received from the determination sections 44 and a determined result received from the determination section 13, the ultimate determination section 66 ultimately determines, in accordance with at least one (1) determination reference (e.g., at least one of determination references 1 and 2 described later), whether or not an image of a cancer tissue is included in each of the plurality of divided regions.

Further, the ultimate determination section 66 determines whether or not there is a divided region(s) in which an image of a poorly-differentiated cancer cell is highly likely to be included. In a case where the ultimate determination section determines that there is such a divided region, the ultimate determination section 66 supplies a recheck command to carry out a recheck with respect to the recheck section 67.

On receipt of the recheck command to carry out the recheck from the ultimate determination section 66, the recheck section 67 rechecks whether or not an image of a cancer tissue is included in such a divided region(s) of the tissue image. FIG. 21 is a block diagram illustrating a configuration of the recheck section 67. The recheck section 67 includes a connected component measurement section 81 and a re-determination section 82 (see FIG. 21).

By use of a binarized image generated by the binarized image generation section 62, the connected component measurement section 81 measures, for each of the plurality of divided regions (divided regions divided by the image dividing section 41) included in the binarized image, sizes of respective connected components included in the each of the plurality of divided regions. Then, the connected component measurement section 81 calculates a statistic of the sizes thus measured (e.g., an average value, an intermediate value, or a maximum value) for each of the plurality of divided regions. A well-known measurement method used in an image processing field (such as ImageJ and GIMP, which are image analysis software) can be employed as a method for (i) detecting the connected components (i.e., a graphic having a specific shape) and (ii) measuring the sizes of the respective connected components.

The re-determination section 82 compares the statistic with a predetermined reference value (e.g., 20 μm). In a case where the statistic is not more than a predetermined reference value, the re-determination section 82 determines that an image of a poorly-differentiated cancer tissue is not included in the divided region. On the other hand, in a case where the statistic is more than the predetermined reference value, the re-determination section 82 determines that an image of a poorly-differentiated cancer tissue is included in the divided region.

How long it takes to carry out a recheck differs depending on performance of a device used in the recheck. Generally, it takes about 1.0 second for the recheck. In a case where an entire sample is viewed from above, interstitial layers account for a considerable large part of the entire sample. Therefore, the recheck carried out by the recheck section 67 is essential to the screening for a cancer tissue.

A display control section 5 controls a display section 6 to display a determined result made by the ultimate determination section 66 and a determined result made by the recheck section 67.

The operation section 68 is an input device via which a user enters various information into the cancer determination apparatus 60. Examples of the operation section 68 encompass an operation button, a mouse, and a keyboard.

(Details of Ultimate Determination Section 66)

The ultimate determination section 66 determines that an image of a cancer tissue is included in a target divided region (determination made on the basis of a first determination reference), in a case where both a determined result made by the determination section 44 and a determined result made by the determination section 13 are positive (an image of a cancer tissue is included in such a target divided region).

Alternatively, the ultimate determination section determines that an image of a cancer tissue is included in a target divided region, in a case where one of a determined result made by the determination section 44 and a determined result for the target divided region, made by the determination section 13, is negative but the other is a determined result showing, out of determined results made in stages, the highest possibility that an image of a cancer tissue is included in the target divided region (determination made on the basis of a second determination reference).

Furthermore, the ultimate determination section 66 determines, for each of the plurality of divided regions, (i) whether or not a ratio of a corresponding one-dimensional Betti number to a corresponding zero-dimensional Betti number (the number of holes/the number of connected components), which are calculated by the comparison value calculation section 43, is not more than a first predetermined reference value and (ii) whether or not a corresponding one-dimensional Betti number (the number of holes), which is calculated by the Betti number calculation section 42, is not more than a second predetermined reference value. In a case where at least one of the ratio and the one-dimensional Betti number is not more than a corresponding one of the predetermined reference values, the ultimate determination section 66 instructs the recheck section 67 to carry out a recheck for a corresponding one of the plurality of divided regions.

That is, the ultimate determination section 66 instructs the recheck section 67 to carry out a recheck for a divided region(s) in a case where the ultimate determination section 66 determines that an image of a poorly-differentiated cancer tissue is highly likely to be included in the divided region(s). The determination clarifies whether an image of a tissue included in the divided region(s) is an image of a poorly-differentiated cancer tissue or an image of an interstitial layer.

The first predetermined reference value is, for example, 0.1. The second predetermined reference value is, for example, 0.3. In a case where a ratio between the Betti numbers or a one-dimensional Betti number is not more than a corresponding one of the first and second predetermined reference values, it is highly likely that an image of a poorly-differentiated cancer tissue is included in a target divided region. The first and second predetermined reference values are not limited to specific ones, and can be therefore set appropriately by a person skilled in the art so that a poorly-differentiated cancer tissue is discriminated from an interstitial layer.

(How to Calculate Sample Parameter)

In a case of a diagnosis of a body tissue, (i) a tissue (e.g., a human tissue) is excised, (ii) the tissue is sliced into pieces and dyed, and then (iii) a piece of the tissue thus dyed is placed on a mount. A sample is thus prepared. Here, the degree, to which the samples are dyed, differs from sample to sample due to the problems that (i) sliced pieces do not always have identical thicknesses, (ii) dyeing solutions do not always have identical compositions, (iii) chemical reactions do not occur to the same degree in the dyeing step due to a change in room temperature or the like, and/or (iv) a dyed state is changed as time goes by. A value which reflects such differences in color between the samples is referred to as the sample parameter.

For example, it is possible to address the problem that the sliced pieces do not always have identical thicknesses by accurately measuring the sliced pieces by use of an appropriate measuring device.

It is possible to address the problem that the dyeing solutions do not always have identical compositions by (i) setting, as an internal standard, a cell or a tissue which commonly exists in any target body tissue (such as a white blood cell) and (ii) comparing dyed degrees of internal standards with each other.

In this case, a user (i) measures, by use of a well-known image processing software, dyed degrees of internal standards in the plurality of tissue images obtained by capturing dyed tissues and (ii) uses, as a sample parameter, a relative value (e.g., a value obtained by dividing each dyed degree of a corresponding one of the plurality of tissue images by a reference dyed degree) of each dyed degree of a corresponding one of the plurality of tissue images.

Alternatively, it is also possible for the user to determine, after the user views and compares a plurality of target tissue images to be used, a sample parameter on the basis of differences in dyed degrees of the plurality of target tissue images to be used.

(How to Calculate Image Parameter)

The image parameter calculation section 64 (i) obtains a tissue image from the storage section 3 and (ii) calculates an intensity distribution of pixel values of a plurality of pixels included in the tissue image. FIG. 22 is a view showing an example in which a pixel value of a first peak is calculated from the intensity distribution of pixel values. The intensity distribution can be represented as a graph in which (i) a plurality of pixel values are shown in a horizontal axis and (ii) the number of pixels, having identical pixel values in the horizontal axis, is shown in a vertical axis (see FIG. 22).

More specifically, the image parameter calculation section 64 (i) prepares a histogram in which (a) a plurality of pixel values are shown in a horizontal axis and (b) the number of pixels, having identical pixel values in the horizontal axis, is shown in a vertical axis and (ii) calculates the intensity distribution by approximating the histogram by use of a smooth function. A well-known function can be used as the smooth function.

Then, the image parameter calculation section 64 specifies the first peak which is the highest peak among peaks of the graph indicating the intensity distribution, and then sets, as an image parameter, a pixel value corresponding to the first peak. Note here that the first peak can be specified by (i) differentiating the graph indicating the intensity distribution and (ii) finding a point where the graph indicating the intensity distribution has a gradient of zero. It appears that a pixel value of the first peak indicates a pixel value of the most characteristic component out of a plurality of components included in a tissue image.

Note that the tissue image can be a color image or a gray-scale image.

(Significance of Calculation of Binarization Reference Value)

Next, the following description deals with a significance of calculating a binarization reference value by multiplying a sample parameter by an image parameter.

For each of the plurality of tissue images, a corresponding image parameter (a pixel value of a first peak) is multiplied by a corresponding sample parameter so as to calculate a binarization parameter. An image parameter is an index for correcting differences in composition between the plurality of tissue images, while a sample parameter is an index for correcting differences in color between the plurality of tissue images, due to (i) differences in dyed degree and/or (ii) differences in thickness. Therefore, by multiplying a corresponding image parameter by a corresponding sample parameter for each of the plurality of tissue images, it is possible to obtain a corresponding binarization reference value which reflects both the differences in composition and the differences in color between the plurality of tissue images.

(Concrete Example of Calculation of Binarization Reference Value)

FIG. 23 is a view showing a calculation example of binarization reference values. In FIG. 23, "IMAGE NUMBER" is a tissue image number of a tissue that is identified by "SAMPLE NUMBER". Here, tissues, which were used to capture their images, were three samples having respective sample numbers 1 through 3. Images identified by respective image numbers 1 through 4 were obtained by capturing the tissue identified by the sample number 1. Images identified by respective image numbers 5 through 8 were obtained by capturing the tissue identified by the sample number 2. Images identified by respective numbers 9 through 13 were obtained by capturing the tissue identified by the sample number 3.

Each of a plurality of binarization reference values was obtained by multiplying a corresponding image parameter by a corresponding sample parameter (see FIG. 23).

(How Process is Carried Out by Cancer Determination Apparatus 60)

Next, the following description deals with an example of how a process is carried out by the cancer determination apparatus 60. FIG. 24 is a flowchart showing an example of how the process is carried out by the cancer determination apparatus 60.

First, the image parameter calculation section 64 obtains a plurality of tissue images from the storage section 3, and then calculates, for each of the plurality of tissue images, a corresponding image parameter (a pixel value of a first peak) as described above (S21). After that, the image parameter calculation section 64 (i) associates the corresponding image parameter with the each of the plurality of tissue images and (ii) supplies an associated image parameter to the binarization reference value calculation section 63.

Meanwhile, the sample parameter acquisition section 65 (i) acquires a corresponding sample parameter entered by a user via the operation section 68 and (ii) supplies the corresponding sample parameter to the binarization reference value calculation section 63 (S22).

The binarization reference value calculation section multiplies the corresponding sample parameter received from the sample parameter acquisition section 65 by the corresponding image parameter received from the image parameter calculation section 64 so as to obtain a corresponding binarization reference value (binarization parameter) (S23). Then, the binarization reference value calculation section 63 supplies the binarization reference value to the binarized image generation section 62.

The binarized image generation section 62 (i) obtains the plurality of tissue images from the storage section 3, (ii) binarizes each of the plurality of tissue images by use of a corresponding binarization reference value calculated by the binarization reference value calculation section 63, and then (iii) supplies a corresponding binarized tissue image (binarized image) to the image dividing section 41 and stores the corresponding binarized image in the storage section 3 (S24).

The image dividing section 41 divides each of a plurality of binarized images generated by the binarized image generation section 62 into a plurality of divided regions each having a predetermined size (S25). Then, the image dividing section 41 (i) associates, with the each of the plurality of binarized images, each region information for identifying a corresponding one of the plurality of divided regions thus generated for each of the plurality of binarized images and (ii) supplies associated region information to the Betti number calculation section 42 and stores the associated region information in the storage section 3.

The Betti number calculation section 42 carries out, for each of the plurality of binarized images, a process for calculating, for a corresponding one of the plurality of divided regions identified by corresponding region information thus received, (i) a zero-dimensional Betti number and (ii) a one-dimensional Betti number (S26). Then, for each of the plurality of binarized images, the Betti number calculation section 42 (i) associates a calculated zero-dimensional Betti number and a calculated cone-dimensional Betti number with a corresponding one of the plurality of divided regions and (ii) supplies an associated zero-dimensional Betti number and an associated one-dimensional Betti number to the comparison value calculation section 43. Simultaneously, for each of the plurality of binarized images, the Betti number calculation section 42 (i) associates a calculated one-dimensional Betti number with a corresponding one of the plurality of divided regions and (ii) supplies an associated one-dimensional Betti number to the determination section 13.

For each of the plurality of binarized images, the comparison value calculation section 43 carries out a process for calculating, for each of a corresponding plurality of divided regions, a ratio of a corresponding one-dimensional Betti number to a corresponding zero-dimensional Betti number. Then, the comparison value calculation section 43 (i) associates a value of a calculated ratio with corresponding region information which specifies a corresponding plurality of divided regions and (ii) supplies an associated value of the ratio to the determination section 44 (S27).

The determination section 44 compares, with a plurality of first determination reference values, a value of the ratio between the Betti numbers which is received from the comparison value calculation section 43 for each of the plurality of divided regions. The plurality of first determination reference values are determination reference values related to a ratio between the Betti numbers, and are used to determine, in stages (e.g., 6 stages), a possibility that a well-differentiated cancer tissue is included in a corresponding one of the plurality of divided regions. The plurality of first determination reference values should be stored in the storage section 3 in advance.

That is, the determination section 44 determines whether a value of the ratio received from the comparison value calculation section 43 is greater than which of the plurality of first determination reference values and is smaller than which of the plurality of first determination reference values, so as to determine, in stages, a possibility that an image of a well-differentiated cancer tissue is included in a corresponding one of the plurality of divided regions (S28). For each of the plurality of binarized images, the determination section 44 supplies a determined result for each of a corresponding plurality of divided regions to the ultimate determination section 66.

Meanwhile, the determination section 13 compares, with a plurality of second determination reference values, a one-dimensional Betti number for each of a plurality of divided regions received from the Betti number calculation section 42. The plurality of second determination reference values are determination reference values related to a one-dimensional Betti number (the number of holes), and are used to determine, in stages (e.g., 6 stages), a possibility that an image of a well-differentiated cancer tissue is included in a corresponding one of the plurality of divided regions. The plurality of second determination reference values should be stored in the storage section 3 in advance.

The determination section 13 determines whether a one-dimensional Betti number received from the comparison value calculation section 43 is greater than which one of the plurality of second determination reference values and is smaller than which one of the plurality of second determination reference values, so as to determine, in stages, a possibility that an image of well-differentiated cancer tissue is included in a corresponding one of the plurality of divided regions (S29). For each of the plurality of binarized images, the determination section 13 supplies a determined result for each of a corresponding plurality of divided regions to the ultimate determination section 66.

On the basis of a determined result made by the determination section 44 and a determined result made by the determination section 13, the ultimate determination section 66 determines, for each of the plurality of divided regions, whether or not an image of a cancer tissue is included in a corresponding one of the plurality of divided regions (S30).

For example, the ultimate determination section 66 determines that an image of a cancer tissue is included in a target divided region, in a case where both a determined result made by the determination section 44 and a determined result made by the determination section 13 are the highest level (L5), the second-highest level (L4), or the third-highest level (L3) out of 6 levels (L0 through L5), each of which shows a possibility that an image of a cancer tissue is included in the target divided region.

Alternatively, in a case where one of a determined result made by the determination section 44 and a determined result made by the determination section 13 is the highest level L5 or the second-highest level L4, the ultimate determination section 66 determines that an image of a cancer tissue is included in a target divided region, even if the other determined result is a negative result (level L0, L1, or L2).

Next, the ultimate determination section 66 determines whether or not a recheck is necessary (S31). Specifically, the ultimate determination section 66 determines, for each of a plurality of divided regions, whether or not each of (i) a corresponding ratio, between the Betti numbers, which is calculated by the comparison value calculation section 43 and (ii) a corresponding one-dimensional Betti number (the number of holes) which is calculated by the Betti number calculation section 42, is not more than a corresponding one of the predetermined reference values. In a case where it is determined that at least one of the above (i) and (ii) is not more than a corresponding one of the reference values in a divided region(s) (YES in S31), the ultimate determination section 66 instructs the recheck section 67 to carry out a recheck with respect to such a divided region(s) (or with respect to a tissue image including such a divided region(s)).

On receipt of the instruction from the ultimate determination section 66, the recheck section 67 carries out a recheck so as to determine whether or not an image of a cancer tissue is included in such a divided region(s) specified by the recheck section 67 (or in the tissue image including such a divided region(s)) (S32).

The display control section 5 controls the display section 6 to display a determined result made by the ultimate determination section 66 and a determined result made by the recheck section 67 (S33).

(How Process is Carried Out by Recheck Section 67)

Next, the following description deals with an example of how a process is carried out by the recheck section 67. FIG. 25 is a flowchart showing an example of how the process is carried out by the recheck section 67.

First, the connected component measurement section 81 obtains, from the storage section 3, (i) a binarized image including the divided region specified by the recheck section 67 and (ii) corresponding region information generated by the image dividing section 41, and then measures a size of each connected component included in each of the divided region(s) specified by the recheck section 67 (S41).

After that, the connected component measurement section 81 averages, for each of the divided region(s) thus specified, measured sizes of connected components, and then supplies an average value thus obtained to the re-determination section 82 (S42).

The re-determination section 82 compares an average value for each divided region, received from the re-determination section 82, with a predetermined reference value (e.g., 20 µm) (S43). Then, in a case where the average value is not more than a predetermined reference value in a divided region(s), the re-determination section 82 determines that no image of a poorly-differentiated cancer tissue is included in such a divided region(s). On the other hand, in a case where the average value is more than the predetermined reference value in such a divided region(s), the re-determination section 82 determines that an image of a poorly-differentiated cancer tissue is included in such a divided region(s).

The re-determination section 82 supplies a determined result to the display control section 5 (S44).

Analysis Result Example 4

The present example describes an example of a result of cancer determination made by use of the cancer determination apparatus 60. Each of FIGS. 26 through 32 shows an example of a result of cancer determination carried out by the cancer determination apparatus 60. In each of FIGS. 26 through 32, indicated below a tissue image used in the cancer determination is (i) the number of holes (one-dimensional Betti number) for each of a plurality of divided regions in a corresponding tissue image and (ii) a ratio of the corresponding number of holes to the corresponding number of connected components (zero-dimensional Betti number) (see FIGS. 26 through 32). In each of FIGS. 26 through 32, the numeric values correspond to the respective plurality of divided regions. Each tissue image is divided into 7×7 divided regions (see FIGS. 26 through 32). The method of dyeing a tissue and the method of capturing a tissue, used in Analysis Result Examples 1 through 3, were also used in the present example.

Note that the number of holes for each of a plurality of divided regions, shown in each of FIGS. 26 through 32, was obtained by multiplying the actual number of holes for the each of the plurality of divided regions by the number of the plurality of divided regions (49) so as to standardize numeric values. Accordingly, the actual number of holes for each of a plurality of divided regions in each of FIGS. 26 through 32 is found by dividing a corresponding numeric value by 49.

The determination section 44 of the cancer determination apparatus 60 carries out determination employing a value of the ratio in 6 stages. Further, the determination section 13 of the cancer determination apparatus 60 carries out determination employing the number of holes in 6 stages. In each of FIGS. 26 through 32, determined results are categorized into 6 levels (L0 through L5). L0 indicates the lowest possibility that an image of a cancer is included in a divided region, whereas L5 indicates the highest possibility that an image of a cancer is included in a divided region. The 6 levels are shown by respective different types of hatching with respect to the numbers of the holes and the ratios between Betti numbers (see FIGS. 26 through 32).

Values of ratios between the Betti numbers were classified as follows. Namely, a value of 3.5 or more was classified into L5, a value not less than 2.4 but less than 3.5 was classified into L4, a value not less than 2.0 but less than 2.4 was classified into L3, a value not less than 1.7 but less than 2.0 was classified into L2, a value not less than 1.4 but less than 1.7 was classified into L1, and a value not less than 0 but less than 1.4 was classified into L0.

The numbers of holes were classified as follows. Namely, the number of 4000 or more was classified into L5, the number not less than 3500 but less than 4000 was classified into L4, the number not less than 3000 but less than 3500 was classified into L3, the number not less than 2400 but less than 3000 was classified into L2, the number not less than 2000 but less than 2400 was classified into L1, and the number not less than 0 but less than 2000 was classified into L0. Note that an actual reference value for the number of holes can be obtained by dividing a corresponding numeric value by 49.

Further, in a case where one of a determined result made with respect to a target divided region by the determination section 44 and a determined result made with respect to the target divided region by the determination section 13 is any one of L2 through L5, the ultimate determination section 66 determines that an image of a cancer tissue is highly likely to be included in the target divided region (positive). A divided region(s) marked with "X" has been determined as being "positive" by the determination section 44 (a determined result made by use of a ratio between the Betti numbers), whereas a divided region(s) marked with "O" has been determined as being positive by the determination section 13 (a determined result made by use of the number of holes).

Furthermore, in a case where one of a determined result made with respect to a target divided region by the determination section 44 and a determined result made with respect to the target divided region by the determination section 13 is L1, the ultimate determination section 66 determines that there is a slight possibility that an image of a cancer tissue is included in the target divided region (neutral determination). A divided region(s) marked with "Δ" has been determined as being "neutral" by the determination section 44 (a determined result made by use of a ratio between the Betti number), whereas a divided region(s) marked with an inverted triangle has been determined as being "neutral" by the determination section 13 (a determined result made by use of the number of holes).

It is thus possible to carry out cancer determination with higher accuracy by use of both a determined result made by use of a ratio between the Betti numbers and a determined result made by use of the number of holes.

FIG. 26 shows an image of a normal tissue. Although some divided regions, in the tissue image, where tissues are densely located, were determined as L1, L2, or L3, the other divided regions were determined as being normal (L0).

FIG. 27 shows an image of a slightly atypical tissue. Approximately one-eighth of a plurality of divided regions in the tissue image were determined as being normal (L0). However, most of the other divided regions were determined as L1 or L2, showing that there is a slight possibility that an image of a cancer tissue is included.

FIG. 28 shows an image of a highly atypical tissue. According to a determined result made with respect to the tissue image by use of a ratio between the Betti numbers, it was determined that an image of cancer tissue is highly possible to be included in most of the plurality of divided regions (L3, L4, or L5). Meanwhile, according to a determined result made with respect to the tissue image by use of the number of holes, part of the plurality of divided regions was determined as L1 or L2.

FIG. 29 shows an image of a tissue which became cancerous. According to both a determined result made with respect to each of the plurality of divided regions in the image by use of a corresponding ratio between the Betti numbers, and a determined result made with respect to each of the plurality of divided regions by use of the corresponding number of holes, approximately one-fourth to one-third of the plurality of divided regions were determined as L4 or L5.

FIG. 30 shows an image of a well-differentiated cancer tissue. According to both a determined result made with respect to each of a plurality of divided regions in the image by use of a corresponding ratio between the Betti numbers, and a determined result made with respect to each of the plurality of divided regions by use of the corresponding number of holes, approximately 30% to 40% of the plurality of divided regions were determined as L4 or L5.

FIG. 31 shows an image of another well-differentiated cancer tissue. According to both a determined result made with respect to each of a plurality of divided regions in the image by use of a corresponding ratio between the Betti numbers, and a determined result made with respect to each of the plurality of divided regions by use of the corresponding number of holes, approximately 15% to 20% of the plurality of divided regions were determined as L4 or L5. Further, according to the determined result made with respect to each of the plurality of divided regions by use of the corresponding number of holes, approximately 35% of the plurality of divided regions were determined as L2 or L3.

FIG. 32 shows an image in which well-differentiated cancer tissues and normal tissues coexist. According to both a determined result made with respect to each of a plurality of divided regions in the image by use of a corresponding ratio between the Betti numbers, and a determined result made with respect to each of the plurality of divided regions by use of the corresponding number of holes, separate parts of the plurality of divided regions were determined as L3, L4, or L5, each of which parts includes an image of a well-differentiated cancer tissue.

The determined results made by use of the above cancer determination apparatus 60 almost matched those of pathologists. It was thus confirmed that whether or not a well-differentiated cancer tissue is present in a tissue image can be determined with high accuracy by use of the cancer determination apparatus 60.

Analysis Result Example 5

The present example describes another example of a result of cancer determination made by use of the cancer determination apparatus 60. Each of FIGS. 33 and 34 shows an example of a result of cancer determination made by use of the cancer determination apparatus 60.

Each of FIGS. 33 and 34 shows an image of a poorly-differentiated cancer tissue. According to both a determined result made with respect to each of a plurality of divided regions in the image by use of a corresponding ratio between the Betti numbers, and a determined result made with respect to the plurality of divided regions by use of the corresponding number of holes, all of the plurality of divided regions were determined as being normal (L0).

For each of these tissue images, the ultimate determination section 66 determined, for each of a plurality of divided regions in such a tissue image, (i) whether or not a corresponding ratio between the Betti numbers (the number of holes/the number of connected components) was not more than 0.1 or (ii) whether or not the corresponding number of holes (a one-dimensional Betti number) was not more than 3. Note that the number of holes shown in each of FIGS. 33 and 34 was obtained by multiplying a corresponding actual number of holes by 49. In other words, in terms of the numeric values shown in FIGS. 33 and 34, the ultimate determination section 66 determined whether or not the corresponding number of holes was not more than 147.

The recheck section 67 carried out a recheck with respect to a divided region(s) (i) whose ratio between the Betti numbers was 0.1 or less or (ii) whose number of holes was 3 or less.

The connected component measurement section 81 of the recheck section 67 (i) measured sizes of connected components included in such a divided region(s) which was determined by the ultimate determination section 66 that a recheck was necessary and (ii) calculated an average value of the sizes thus measured.

The re-determination section 82 compared the average value, received from the connected component measurement section 81, with 20 μm. In a case where the average value was greater than 20 μm, the re-determination section 82 determined that an image of a cancer tissue was included in such a divided region(s).

FIG. 35 shows an example of a result of measurement of sizes of connected components included in a tissue image or a divided region in the tissue image. According to the example shown in FIG. 35, sizes of connected components included in each of twenty (20) images were measured. Then, an average value of the sizes of the connected components thus measured was calculated for each of the twenty (20) images. The image No. 3 corresponds to divided regions in a leftmost column out of the plurality of divided regions in the tissue image shown in FIG. 31. The image No. 7 corresponds to a divided region indicated by coordinates (5, 3) in the tissue image shown in FIG. 32. Note here that coordinates (1, 1) correspond to a location of an upper-left corner of the tissue image shown in FIG. 32. The image No. 8 corresponds to a divided region indicated by coordinates (7, 1) in the tissue image shown in FIG. 32. The image No. 17 corresponds to the entire tissue image shown in FIG. 33. The image No. 18 corresponds to the entire tissue image shown in FIG. 34.

An average value of sizes of connected components included in each of the divided regions No. 1 through No. 15 was not more than 20 μm. Therefore, the tissues included in these divided regions were determined to be normal interstitial layers.

On the other hand, an average value of sizes of connected components included in each of the divided regions No. 16 through No. 20 was greater than 20 μm. Therefore, the tissues included in these divided regions were determined to be poorly-differentiated cancer tissues. The determined results matched those of pathologists.

According to the cancer determination apparatus 60, it is thus possible to make cancer determination with high accuracy even in a case where an image of a poorly-differentiated cancer tissue is included in a tissue image.

[Embodiment 4]

The present invention is applicable to not only determination of presence/absence of cancer in a body tissue but also determination of a composition included in a structure other than a body tissue. As an example, the present embodiment describes how a determination apparatus 90 determines a content state (particularly a content ratio) of a component (such as a martensite) in an iron tissue.

A metal significantly varies in engineering property, such as physical strength and abrasion resistance, depending on its structure. A metal structure can be observed with a microscope. Therefore, if a property of an entire metal structure can be determined by observing the structure with the microscope, then this will bring about much advantage in view of expansion in application. However, a result of such determination made on the basis of the microscopic observation may sometimes significantly differ depending on skill and experience of an observer, which is similar to a pathological diagnosis for cancer determination. Therefore, it is also important to determine a metal structure by use of objective numeric values.

Fe—C carbon steel is improved in physical strength and abrasion resistance when the Fe—C carbon steel is subjected to heating and cooling processes appropriately. Steel called martensite (a' steel) stands for a structure obtained by rapidly cooling Fe—C carbon steel in a stable austenite state. Steel having structure such as an austenite structure cannot be used in a situation where high toughness is required. It is, however, possible to further strengthen such a metal by turning the autensite into the martensite via steps such as quench hardening and tempering.

The present embodiment describes how to carry out a process for calculating a content ratio of a martensite in Fe—C carbon steel. Note, however, that the present embodiment is not limited to this and can therefore be applied to calculation of a content ratio of another iron structure, such as a pearlite and a ferrite, or calculation of content ratios of a plurality of iron structures.

(Configuration of Determination Apparatus 90)

FIG. 36 is a view schematically illustrating a configuration of a determination apparatus 901n accordance with Embodiment 4 of the present invention. Unlike the cancer determination apparatus 60, the determination apparatus (image analysis apparatus) 90 includes an image analysis section (image analysis apparatus) 91 (see FIG. 36). The image analysis section 91 includes a binarized image generation section 62, a binarization reference value calculation section 92, an image parameter calculation section 64, a Betti number calculation section 42, a comparison value calculation section 43, and a content ratio calculation section (determination means) 93.

The determination apparatus 90 includes no image dividing section 41. The Betti number calculation section 42 carries out a process for each of a plurality of binarized images generated by the binarized image generation section 62. In the case of cancer determination, if an image of a cancer tissue is included, even partially, in a tissue image, then a positive determination should be made. In this regard, it is preferable to divide a tissue image into a plurality of divided regions so as to improve determination accuracy. On the other hand, in the case of determination of a composition of an iron structure, only a composition of an entire target structure should be determined. As such, it is not necessary to divide a structure image into a plurality of divided regions. Note, however, that the determination apparatus 90 can further include an image dividing section 41, like the cancer determination apparatuses 1, 10, and 60.

The Betti number calculation section 42 calculates, for each of the plurality of binarized images generated by the binarized image generation section 62, (i) a zero-dimensional Betti number and (ii) a one-dimensional Betti number. Then, the Betti number calculation section 42 (i) associates a corresponding zero-dimensional Betti number and a corresponding one-dimensional Betti number thus calculated with a corresponding binarized image and (ii) supplies an associated zero-dimensional Betti number and an associated one-dimensional Betti number to the comparison value calculation section 43.

The comparison value calculation section 43 carries out, for each of the plurality of binarized images, a process for calculating a ratio of a corresponding one-dimensional Betti number to a corresponding zero-dimensional Betti number (a ratio of the number of spaces to the number of connected components), which numbers have been supplied from the Betti number calculation section 42. Then, the comparison value calculation section 43 (i) associates the calculated ratio between the Betti numbers with a corresponding binarized image and (ii) supplies an associated ratio between the Betti numbers to the content ratio calculation section 93.

Note that the determination apparatus 90 can include a Betti number calculation section 12 instead of a combination of the Betti number calculation section and the comparison value calculation section 43, like the cancer determination apparatus 10.

In this case, the Betti number calculation section 12 will serve as space number calculation means for calculating the number of spaces (holes) surrounded by an outer edge(s) of at least one component which is defined by connecting an outer edge(s) of the at least one component which is a graphic having a closed outer edge, which spaces are included in a captured image that has been caused to have a low resolution.

Further, the content ratio calculation section 93 serves as determination means for determining a composition of a structure in a captured image by comparing the number of spaces calculated by the Betti number calculation section 12 with a predetermined reference value. The content ratio calculation section 93 can calculate a content ratio of an iron structure (e.g., a martensite) which is a detection target or can determine whether or not a metal contains such an iron structure of not less than a predetermined ratio.

(Details of Binarization Reference Value Calculation Section 92).

The binarization reference value calculation section calculates a plurality of binarization reference values (hereinafter, referred to as a binarization reference value set) by multiplying an image parameter calculated by the image parameter calculation section 64 by each of a plurality of correction parameters. The each of the plurality of correction parameters is a parameter for correcting a binarization reference value, and is a predetermined constant value.

In a case of a body tissue, samples are different from one another in color due to differences in dyed degrees of the samples and/or differences in thicknesses of tissues. Therefore, a sample parameter is prepared so as to correct such a difference in color. Meanwhile, in a case of a metal structure, it is not necessary to prepare a sample parameter in a case where a structure image is captured under a constant capturing condition.

Note, however, that, in a case where an image parameter itself is used as a binarization reference value, a mineral composition may not be determined accurately. For this reason, the determination apparatus 90 (i) prepares a correction parameter for correcting a binarization reference value and (ii) multiplies an image parameter by the correction parameter so as to calculate a binarization reference value.

In a case where one (1) optimum correction parameter can be prepared in advance to determine a composition of a specific mineral structure, it is not necessary to calculate a plurality of binarization reference values. Note, however, that, for improvement in determination accuracy, it is preferable to (i) prepare a plurality of binarized images by use of a plurality of binarization reference values and (ii) carry out determination for each of the plurality of binarized images thus prepared.

A correction parameter aggregation is constituted by numeric values of less than 1 such as 0.9, 0.8, 0.7, and 0.6. In this case, binarization reference values to be worked out are 0.9a, 0.8a, 0.7a, and 0.6a when a value of an image parameter is indicated by "a". Note, however, that the number of correction parameters and numeric values of the correction parameters are not limited to the above ones, and can be set appropriately by a person skilled in the art.

As described above, the determination apparatus 90 includes (i) binarization reference value calculation means (64) for calculating a binarization reference value based on a structure image and (ii) correction means (binarization reference value calculation section 92) for correcting the binarization reference value thus obtained.

The binarized image generation section 62 generates a plurality of binarized images by using a respective plurality of binarization reference values, which have been calculated by the binarization reference value calculation section 92.

(Details of Content Ratio Calculation Section 93)

The content ratio calculation section 93 compares a corresponding ratio between the Betti numbers (comparison value), calculated by the comparison value calculation section 43, with a predetermined reference value so as to determine a composition of a structure in a structure image. Specifically, the content ratio calculation section 93 calculates a content ratio of the martensite in an iron structure in each of a plurality of binarized images, by comparing (i) a ratio between the Betti numbers for each of the plurality of binarized images, calculated by the comparison value calculation section 43, with (ii) a ratio between the Betti numbers for each of a plurality of reference composition images that have been binarized by use of correction parameters identical with those of the respective plurality of binarized images.

Each of the plurality of reference composition images is, for example, an image of an iron structure in which a content ratio of the martensite is 50%. A ratio between the Betti numbers calculated based on the each of the plurality of reference composition images is a ratio between the Betti numbers calculated in a case where a content ratio of a martensite is 50%.

In a case where (i) the predetermined correction parameters are 0.9, 0.8, 0.7, and 0.6 and (ii) a value of the predetermined image parameter for the reference composition images is b, the reference composition images are binarized by respective four binarization reference values, namely, 0.9b, 0.8b, 0.7b, and 0.6b. Then, a ratio between the Betti numbers is calculated for each of the reference composition images thus binarized.

Each of the correction parameters used in the binarization of the reference composition images and a corresponding ratio between the Betti numbers (hereinafter, referred to as reference Betti number ratio) calculated based on a corresponding reference composition image binarized by use of the correction parameter, are associated with each other, and are stored in the storage section 3 in advance.

Further, the value b of the image parameter for the reference composition images should be set appropriately, so that the accuracy of calculation of a content ratio of the mineral structure is improved, by a person skilled in the art in accordance with a mineral structure to be measured.

The content ratio calculation section 93 calculates a difference between (i) the respective four reference Betti number ratios and (ii) the respective four ratios between the Betti numbers calculated by the comparison value calculation section 43. The respective four reference Betti number ratios and the respective four ratios between the Betti numbers are associated with respective identical correction parameters. For example, the content ratio calculation section 93 calculates a difference between (i) the ratio between the Betti numbers calculated based on a structure image that has been binarized by use of a binarization reference value of 0.9a and (ii) the reference Betti number ratio calculated based on a reference structure image that has been binarized by use of a binarization reference value of 0.9b.

Then, the content ratio calculation section 93 employs a maximum difference out of the four differences thus calculated so as to calculate a content ratio of the martensite on the basis of the maximum difference. In a case where a ratio of the Betti numbers calculated by the comparison value calculation section 43 is greater than a corresponding reference Betti number ratio, it is considered that the content ratio of the martensite is greater than 50%. In contrast, a ratio of the Betti numbers calculated by the comparison value calculation section 43 is less than a corresponding reference Betti number ratio, it is considered that the content ratio of the martensite is less than 50%. It is thus possible to calculate a content ratio of the martensite by use of a difference between a ratio between the Betti numbers calculated by the comparison value calculation section 43 and a corresponding reference Betti number ratio.

Specifically, a mathematical formula, expressing a relationship between (i) a difference between a ratio between the Betti numbers and a corresponding reference Betti number ratio and (ii) a content ratio of the martensite, is stored in the storage section 3 in advance. The content ratio calculation section 93 calculates a content ratio of the martensite by substituting the maximum difference described above in the mathematical formula so as to calculate the content of the martensite. A direct function or a quadratic function can be used as the mathematical formula.

Further, the content ratio calculation section 93 can calculate a content ratio of the martensite by use of an average value of the four differences instead of the maximum difference. That is, the content ratio calculation section 93 can calculate a content ratio of the martensite by use of a value obtained by carrying out a statistical process with respect to a plurality of differences.

Alternatively, the content ratio calculation section 93 can determine whether or not a content ratio falls within a predetermined range, instead of calculating a content ratio as a single numeric value. For example, the content ratio calculation section 93 can determine whether or not a content ratio of the martensite is greater than 50%.

Note that, in a case where the determination apparatus 90 includes the Betti number calculation section 12 instead of a combination of the Betti number calculation section 42 and the comparison value calculation section 43, the content ratio calculation section 93 compares the numbers of holes for the respective plurality of binarized images, calculated by the comparison value calculation section 43, with the numbers of holes calculated from the respective plurality of reference composition images. The plurality of binarized images and the plurality of reference composition images have been binarized with identical correction parameters, respectively. The content ratio calculation section 93 thus calculates a content ratio of the martensite in an image of an iron structure.

(How Process is Carried Out by Determination Apparatus 90)

Next, the following description deals with an example of how a process is carried out by the determination apparatus 90. FIG. 37 is a flowchart showing an example of how the process is carried out by the determination apparatus 90.

First, the image parameter calculation section 64 obtains a structure image from the storage section 3, and then calculates an image parameter (a pixel value of a first peak) for the structure image as described above (S51). The image parameter calculation section 64 supplies the image parameter thus calculated to the binarization reference value calculation section 92.

The binarization reference value calculation section multiplies the image parameter received from the image parameter calculation section 64 by each of a plurality of correction parameters stored in the storage section 3, so as to calculate a plurality of binarization reference values (binarization parameters) (S52). The binarization reference value calculation section 92 (i) associates each of the plurality of binarization reference values thus calculated with a corresponding one of the plurality of correction parameters which are used during calculation of the plurality of binarization reference values and (ii) supplies the plurality of binarization reference values each being associated as described above to the binarized image generation section 62.

The binarized image generation section 62 (i) obtains the structure image from the storage section 3 and (ii) binarizes the structure image by use of the plurality of binarization reference values calculated by the binarization reference value calculation section 92. Then, the binarized image generation section 62 (i) associates each of the plurality of structure images thus binarized (binarized images) with a corresponding one of the correction parameters and (ii) supplies the plurality of binarized images each being associated as described above to the Betti number calculation section 42 (S53).

The Betti number calculation section 42 calculates, for each of the plurality of binarized images generated by the binarized image generation section 62, (i) a zero-dimensional Betti number and (ii) a one-dimensional Betti number (S54). The Betti number calculation section 42 (i) associates the zero-dimensional Betti number and the one-dimensional Betti number thus calculated with a corresponding one of the plurality of correction parameters and (ii) supplies an associated zero-dimensional Betti number and an associated one-dimensional Betti number to the comparison value calculation section 43.

The comparison value calculation section 43 (i) calculates, for each of the plurality of binarized images, a ratio of a corresponding one-dimensional Betti number to a corresponding zero-dimensional Betti number, which are received from the Betti number calculation section 42, (ii) associates the ratio of the Betti numbers with a corresponding one of the plurality of correction parameters, and (iii) supplies an associated ratio between the Betti numbers to the content ratio calculation section 93 (S55).

The content ratio calculation section 93 compares the respective ratios of Betti numbers, obtained from the respective plurality of binarized images by the comparison value calculation section 43, with respective reference Betti number ratios, obtained from the respective plurality of reference structure images. The plurality of binarized images and the plurality of reference structure images have been binarized with identical correction parameters, respectively. The content ratio calculation section 93 thus obtains differences between the ratios between Betti numbers and the respective reference Betti number ratios (S56).

Then, the content ratio calculation section 93 calculates a content ratio of a martensite by substituting a maximum difference out of the plurality of differences thus calculated into a mathematical formula for calculating a content ratio (S57).

After that, a display control section 5 controls a display section 6 to display the content ratio calculated by the content ratio calculation section 93 (S58).

Example of Calculation of Ratio of Betti Numbers

FIG. 38 is a view showing an example of a captured image of a martensite structure. The martensite structure (a' steel) can be obtained by treating Fe—C carbon steel in a stable state via steps such as quench hardening and tempering. Steel having the martensite structure can be used as steel having high toughness.

FIG. 39 is a view showing an example of a captured image of a pearlite structure. The pearlite structure can be obtained by gradually cooling the Fe—C carbon steel in a stable state. The name "pearlite" originates from a fact that gloss of the pearlite structure is similar to that of a pearl. Steel whose structure is constituted by only the pearlite is called "eutectoid steel". The pearlite is excellent in abrasion resistance.

FIG. 40 is a view showing an example of a captured image of a ferrite structure. The ferrite structure is a ferromagnetic substance which is soft and has high ductility.

The structure images shown in respective FIGS. 38 through 40 were captured under the same capturing condition. The image parameter for the martensite (FIG. 38) is 161, the image parameter for the pearlite (FIG. 39) is 221, and the image parameter for the ferrite (FIG. 40) is 225.

The image parameters are multiplied by respective correction parameters 0.9, 0.8, 0.7, and 0.6 so that four binarization reference values were obtained. The structure images illustrated in FIGS. 38 through 40 were binarized by use of the respective four binarization reference values. Then, a ratio between the Betti numbers (the number of holes/the number of connected components) was calculated based on each of the binarized images thus generated. The results are shown in FIG. 41.

FIG. 41 shows (i) a table, in its upper part, in which individual numeric values are shown and (ii) a graph, in its lower part, which is represented by the numeric values. As shown in FIG. 41, a ratio between the Betti numbers is changed by decreasing the correction parameter. Note that how the martensite, the pearlite, and the ferrite change in their ratios differ from one another. Note also that, in a case where the correction parameter falls in a range of 0.6 to 0.8, the pearlite shows the highest ratio of the Betti numbers, the ferrite shows the second-highest ratio, and the martensite shows the lowest ratio.

Similarly, FIG. 42 shows results obtained by calculating the number of holes for each of the plurality of binarized images. As shown in FIG. 42, the number of holes decreases by decreasing the correction parameter. Furthermore, in a case where the correction parameter falls in a range of 0.6 to 0.9, the pearlite shows the largest number of holes, the ferrite shows the second-largest number of holes, and the martensite shows the lowest number of holes.

Therefore, by appropriately setting the correction parameter, it is possible to determine, by use of the ratio between the Betti numbers and/or the number of holes, which one of the pearlite, the ferrite, and the martensite has the highest content ratio in an iron structure which is a target of determination.
(Other Modified Examples)

The present invention is not limited to the descriptions of the respective embodiments, but may be altered by a skilled person within the scope of the claims. An embodiment derived from a proper combination of technical means disclosed in different embodiments is also encompassed in the technical scope of the present invention.

For example, each of determined results can be made, in 3 or more stages, by the determination sections 13 and 44. For example, each of the determination sections 13 and 44 can output, as its determined result, one of "normal tissue", "observation required", and "cancer tissue". Alternatively, each of the determination sections 13 and 44 can (i) set 5 stages between a normal tissue and a cancer tissue and (ii) output a determined result indicating under which stage of the five stages a determined tissue falls. Such arrangements can be realized by causing the determination sections 13 and 44 to use 3 determination reference values which indicate numeric value range for three stages or for five stages.

Further, in the above descriptions, the Betti numbers are calculated after a tissue image is binarized. However, it is possible to carry out image processing in which the tissue image is digitalized by multi-valued logic of not less than ternary logic. That is, it is possible to calculate a zero-dimensional Betti number and a one-dimensional Betti number based on an image obtained by a tissue image having a low resolution.

Furthermore, it is possible to (i) apply the pre sent invention to a device for cutting out a tissue (such as a laser microdissection) and (ii) cut out a part of the tissue, which part is determined to include a cancer cell. Moreover, the present invention can be realized as a cancer diagnosis system including a device for cutting out a tissue, a device for dyeing the tissue, a device for capturing an image of the tissue, and the determination apparatus 1, 10, or 60.

Further, the present invention can be realized as an image analysis apparatus for cytodiagnosis (determination of a chromatin pattern).

Furthermore, the technical idea of Embodiment 4 of the present invention, that is, a plurality of binarized images whose binarization levels are different from each other are generated by use of a plurality of correction parameters, can be applied to the cancer determination apparatuses described in Embodiments 1 through 3.

Moreover, each block of the foregoing cancer determination apparatuses 1, 10, and 60, particularly, the image analysis sections 4, 11, and 61, and each block of the determination apparatus 90, among others, the image analysis section 91, can be realized by a hardware logic, or realized by software by use of a CPU as described below.

That is, each of the cancer determination apparatuses 1, 10, and 60, and the determination apparatus 90 includes (i) a CPU (central processing unit) which executes instructions of a control program realizing each of the functions described above, (ii) a ROM (read only memory) in which the program is stored, (iii) a RAM (random access memory) in which the program is loaded, and (iv) a storage device (storage medium), such as a memory, in which the program and various kinds of data are stored. Further, one object of the present invention can also be achieved by (i) loading, to the cancer determination apparatuses 1, 10, or 60, or the determination apparatus 90, a storage medium for computer-readably storing a program code (an executable program, intermediate code program, or source program) of a control program of the cancer determination apparatuses 1, 10, or 60, or the determination apparatus 90 which control program is software for implementing the functions and (ii) causing a computer (or a CPU or a MPU (Microprocessor Unit)) of the cancer determination apparatuses 1, 10, or 60, or the determination apparatus 90 to read out and execute the program code stored in the storage medium.

Examples of the storage medium encompass: tapes, such as magnetic tapes and cassette tapes; disks including magnetic disks, such as floppy disks (registered trademark) and hard disks, and optical disks, such as CD-ROMs, MOs, MDs, DVDs, and CD-Rs; cards, such as IC cards (including memory cards) and optical cards; and semiconductor memories, such as mask ROMs, EPROMs, EEPROMs, and flash ROMs.

Further, each of the cancer determination apparatuses 1, 10, and 60, and the determination apparatus 90 can be made connectable to a communication network, and the program code can be supplied via the communication network. The communication networks are not limited to specific means. Examples of the communication network encompass the Internet, an intranet, an extranet, a LAN, an ISDN, a VAN, a CATV communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE 1394 standard, a USB line, a power line, a cable TV line, a telephone line, an ADSL line, and the like, as the transmission medium. Moreover, it is possible to use (i) a wireless line utilizing an infrared ray used in IrDA and a remote controller, (ii) a wireless line which is in compliance with a Bluetooth standard (registered trademark) or an IEEE802.11 wireless standard, and (iii) a wireless line utilizing an HDR (High Data Rate), a mobile phone network, a satellite line, a terrestrial digital network, and the like, as the transmission medium. Note that, the present invention can be realized by a computer data signal which is realized by electronic transmission of the program code and which is embedded in a carrier wave.

As described above, according to the present invention, it is preferable that the comparison value calculation means calculates, as the comparison value, a ratio of the number of spaces to the number of connected components.

In a case where the ratio of the number of spaces to the number of connected components is used as the comparison value instead of the difference between them, it becomes possible to numerically discriminate an increase in the number of spaces with respect to the number of connected components more successfully, as compared with the use of the difference as the comparison value. Therefore, according to the arrangement described above, it is possible to determine, with high accuracy, whether or not cancer is present.

Further, the image analysis apparatus preferably further includes dividing means for dividing the captured image into a plurality of divided regions each having a predetermined size, the number of connected components and the number of spaces is calculated, for each of the plurality of divided regions, by the component and space number calculation means, the comparison value is calculated, for each of the plurality of divided regions, by the comparison value calculation means, and the determination means determines, by use of the comparison value calculated for each of the plurality of divided regions, whether or not an image of a cancer tissue is included in the each of the plurality of divided regions.

According to the arrangement, the dividing means divides the captured image of the tissue into a plurality of divided regions each having a predetermined size. The component and space number calculation means calculates, for each of the plurality of divided regions, the number of connected components and the number of spaces (holes). Then, the comparison value calculation means calculates, for each of the plurality of divided regions, a comparison value on the basis of the number of connected components and the number of spaces (holes) for the each of the plurality of divided regions, calculated by the component and space number calculation means. The determination means determine, by comparing the comparison value for each of the plurality of divided regions with the predetermined reference value, whether or not an image of a cancer tissue is included the each of the plurality of divided regions.

Accordingly, it is possible to (i) increase accuracy of determination as to whether or not cancer is present, as compared with a case where an entire captured image of a tissue is analyzed and (ii) find which part of the captured image includes an image of a cancer tissue.

Furthermore, it is preferable that the predetermined reference value indicates a range of the number of spaces of a normal tissue, and the determination means determines that an image of a cancer tissue is included in the captured image in a case where the number of spaces, calculated by the space number calculation means, is out of the range indicated by the predetermined reference value.

According to the arrangement, in a case where the number of spaces, calculated by the space number calculation means, is out of the range for the number of spaces in a normal tissue, it is determined that an image of a cancer tissue is included in the captured image of the tissue. For example, the determination means determines that a differentiated cancer tissue is present in a case where the number of spaces is greater than an upper limit of the range indicated by the predetermined reference value. On the other hand, the determination means determines that a poorly-differentiated cancer tissue is present in a case where the number of spaces is less than a lower limit of the range indicated by the predetermined reference value.

Therefore, even in a case where it is unclear which one of an image of a differentiated cancer tissue and an image of a poorly-differentiated cancer tissue is included in the captured image of the tissue, it is possible to appropriately determine whether or not cancer is present.

The image analysis apparatus preferably further includes dividing means for dividing the captured image into a plurality of divided regions each having a predetermined size, the number of spaces being calculated, for each of the plurality of divided regions, by the space number calculation means, and the determination means determining, for each of the plurality of divided regions, whether or not an image of a cancer tissue is included in the each of the plurality of divided regions.

According to the arrangement, the dividing means divides the captured image of the tissue into a plurality of divided regions each having a predetermined size, and the space number calculation means calculates the number of spaces for each of the plurality of divided regions. Then, the determination means compares, for each of the plurality of divided regions, the number of spaces calculated by the space calculation means with the predetermined reference value so as to determine whether or not an image of a cancer tissue is included in the each of the plurality of divided regions.

Therefore, it is possible to (i) increase accuracy of determination as to whether or not cancer is present as compared with a case where an entire captured image of a tissue is analyzed and (ii) find which part of the captured image includes an image of a cancer tissue.

Further, an image analysis program for causing the image analysis apparatus to operate, the image analysis program causing a computer to function as each means described above, and a computer-readable storage medium in which the image analysis program is stored, are also included in the technical scope of the present invention.

INDUSTRIAL APPLICABILITY

According to the present invention, it is possible to carry out cancer determination with high accuracy by use of a captured image obtained by capturing a tissue. The present invention is therefore applicable to a determination device for determining whether or not cancer is present.

REFERENCE SIGNS LIST

1: Cancer determination apparatus (image analysis apparatus)
4: Image analysis section (image analysis apparatus)
10: Cancer determination apparatus (image analysis apparatus)
11: Image analysis section (image analysis apparatus)
12: Betti number calculation section (component and space number calculation means)
13: Determination section (determination means)
21a through 24b: Components
21b through 24b: Components
41: Image dividing section (image dividing means)
42: Betti number calculation section (component and space number calculation means)
43: Comparison value calculation section (comparison value calculation means)
44: Determination section (determination means)
60: Cancer determination apparatus (image analysis apparatus)
61: Image analysis section (image analysis apparatus)
90: Determination apparatus (image analysis apparatus)
91: Image analysis section (image analysis apparatus)
93: Content ratio calculation section (determination means)

The invention claimed is:

1. An image analysis apparatus comprising:
component and space number calculation means for calculating, in a captured image (i) in which a tissue is captured and (ii) which has been binarized by use of a prescribed reference value as a threshold, (I) the number of connected components and (II) the number of spaces, each of the connected components being an aggregate of at least one component which is defined by connecting an outer edge(s) of the at least one component which is a graphic having a closed outer edge, each of the spaces being surrounded by an outer edge(s) of the at least one component;
comparison value calculation means for calculating a comparison value which indicates a difference between the number of connected components and the number of spaces, both of which have been calculated by the component and space number calculation means; and determination means for determining, by comparing the comparison value calculated by the comparison value calculation means with a predetermined reference value, whether or not an image of a cancer tissue is included in the captured image.

2. The image analysis apparatus as set forth in claim 1, wherein:

the comparison value calculation means calculates, as the comparison value, a ratio of the number of spaces to the number of connected components.

3. An image analysis apparatus as set forth in claim 1, further comprising:

dividing means for dividing the captured image into a plurality of divided regions each having a predetermined size, the number of connected components and the number of spaces being calculated, for each of the plurality of divided regions, by the component and space number calculation means, the comparison value being calculated, for each of the plurality of divided regions, by the comparison value calculation means, and the determination means determining, by use of the comparison value calculated for each of the plurality of divided regions, whether or not an image of a cancer tissue is included in the each of the plurality of divided regions.

4. An image analysis apparatus comprising:

space number calculation means for calculating, in a captured image (i) in which a tissue is captured and (ii) which has been binarized by use of a prescribed reference value as a threshold, a one-dimensional Betti number, which represents the number of spaces, each of which is surrounded by an outer edge(s) of a component(s) which is a graphic having a closed outer edge; and determination means for determining, by comparing the one-dimensional Betti number, calculated by the space number calculation means, with a predetermined reference value, whether or not an image of a cancer tissue is included in the captured image.

5. The image analysis apparatus as set forth in claim 4, wherein:

the predetermined reference value indicates a range of the number of spaces of a normal tissue; and the determination means determines that an image of a cancer tissue is included in the captured image in a case where the number of spaces, calculated by the space number calculation means, is out of the range indicated by the predetermined reference value.

6. An image analysis apparatus as set forth in claim 4, further comprising:

dividing means for dividing the captured image into a plurality of divided regions each having a predetermined size, the number of spaces being calculated, for each of the plurality of divided regions, by the space number calculation means, and the determination means determining, for each of the plurality of divided regions, whether or not an image of a cancer tissue is included in the each of the plurality of divided regions.

7. A computer-readable storage medium in which an image analysis program for causing an image analysis apparatus recited in claim 1 to operate, the image analysis program causing a computer to function as each of said means.

8. An image analysis method for use in an image analysis apparatus which analyzes a captured image in which a tissue is captured, the image analysis method comprising the steps of:

(a) calculating, in a captured image (i) in which a tissue is captured and (ii) which has been binarized by use of a prescribed reference value as a threshold, (I) the number of connected components and (II) the number of spaces, each of the connected components being an aggregate of at least one component which is defined by coming in contact with an outer edge(s) of the at least one component which is a graphic having a closed outer edge, each of the spaces being surrounded an outer edge(s) of the at least one component;

(b) calculating a comparison value which indicates a difference between the number of connected components and the number of spaces, both of which have been calculated in the step (a); and (c) determining that an image of a cancer tissue is included in the captured image in a case where the comparison value calculated in the step (b) is greater than a predetermined reference value.

9. An image analysis method for use in an image analysis apparatus which analyzes a captured image in which a tissue is captured, the image analysis method comprising the steps of:

(a) calculating, in a captured image (i) in which a tissue is captured and (ii) which has been binarized by use of a prescribed reference value as a threshold, a one-dimensional Betti number, which represents the number of spaces, each of which is surrounded by an outer edge(s) of a component(s) which is a graphic having a closed outer edge; and (b) determining, by comparing the one-dimensional Betti number, calculated in the step (a), with a predetermined reference value, whether or not an image of a cancer tissue is included in the captured image.

10. An image analysis apparatus comprising:

component and space number calculation means for calculating, in a captured image (i) in which a structure is captured and (ii) which has been caused to have a low resolution, (I) the number of connected components and (II) the number of spaces, each of the connected components being an aggregate of at least one component which is defined by connecting an outer edge(s) of the at least one component which is a graphic having a closed outer edge, each of the spaces being surrounded by an outer edge(s) of the at least one component;

comparison value calculation means for calculating a comparison value which indicates a difference between the number of connected components and the number of spaces, both of which have been calculated by the component and space number calculation means; and determination means for determining, by comparing the comparison value calculated by the comparison value calculation means with a predetermined reference value, a composition of the structure included in the captured image.

11. The image analysis apparatus as set forth in claim 10, wherein:

the component and space number calculation means calculates the number of components and the number of spaces, by processing the captured image having the low resolution by use of a combinational invariant measurement method which is one of mathematical methods employing a homological concept.

\* \* \* \* \*